US008135963B2

(12) United States Patent
Sato et al.

(10) Patent No.: US 8,135,963 B2
(45) Date of Patent: Mar. 13, 2012

(54) PROGRAM CONVERSION DEVICE AND PROGRAM EXECUTION DEVICE

(75) Inventors: Taichi Sato, Osaka (JP); Rieko Asai, Osaka (JP); Yoshikatsu Ito, Osaka (JP); Kouichi Kanemura, Osaka (JP); Hideki Matsushima, Osaka (JP)

(73) Assignee: Panasonic Corporation, Osaka (JP)

( * ) Notice: Subject to any disclaimer, the term of this patent is extended or adjusted under 35 U.S.C. 154(b) by 1068 days.

(21) Appl. No.: 11/884,147

(22) PCT Filed: Feb. 9, 2006

(86) PCT No.: PCT/JP2006/302273
§ 371 (c)(1),
(2), (4) Date: Aug. 10, 2007

(87) PCT Pub. No.: WO2006/085595
PCT Pub. Date: Aug. 17, 2006

(65) Prior Publication Data
US 2008/0162949 A1   Jul. 3, 2008

(30) Foreign Application Priority Data

Feb. 10, 2005  (JP) ................... 2005-034020

(51) Int. Cl.
*H04L 29/06* (2006.01)
*H04L 9/00* (2006.01)
*G06F 11/30* (2006.01)
*G06F 11/00* (2006.01)
*H04N 7/167* (2011.01)
(52) U.S. Cl. ........ 713/190; 713/152; 713/166; 713/187; 726/22; 380/206; 380/239; 380/268

(58) Field of Classification Search .................. 713/188, 713/152, 166, 187, 190, 194; 726/22; 380/206, 380/239, 268
See application file for complete search history.

(56) References Cited

U.S. PATENT DOCUMENTS

| 6,668,325 | B1* | 12/2003 | Collberg et al. | 713/194 |
| 7,007,025 | B1* | 2/2006 | Nason et al. | 1/1 |
| 7,346,160 | B2* | 3/2008 | Michaelsen | 380/28 |
| 2005/0002531 | A1* | 1/2005 | Michaelsen | 380/268 |
| 2005/0086666 | A1* | 4/2005 | Nason et al. | 719/321 |

FOREIGN PATENT DOCUMENTS

| JP | 9-6232 | 1/1997 |
| JP | 11-39156 | 2/1999 |
| JP | 11-110193 | 4/1999 |
| JP | 2002-514333 | 5/2002 |
| WO | 99/01815 | 1/1999 |

* cited by examiner

*Primary Examiner* — Mohammad Reza
(74) *Attorney, Agent, or Firm* — Wenderoth, Lind & Ponack, L.L.P.

(57) ABSTRACT

A program conversion device generates a program by obfuscating an original program, and generates and encrypts conversion parameters for inverse conversion of the obfuscated program. The program conversion device distributes the obfuscated program together with the encrypted conversion parameters. To execute the obfuscated program, a device having a high security level decrypts the encrypted parameters by using a decryption key stored in advance, applies inverse conversion to the obfuscated program by using the decrypted conversion parameters, and executes the program resulting from the inverse conversion. A device having a low security level executes the obfuscated program without any inverse conversion.

12 Claims, 44 Drawing Sheets

FIG. 3

Conversion Information Key Table

| Key Information ||
|---|---|
| Conversion Information Key ID | Conversion Information Key |
| 001 | 0x123456··· |
| 002 | 0x035b72··· |
| 003 | 0xbd084f5··· |
| ⋮ | ⋮ |

FIG. 5

Redundant Block

```
int temp1, temp2, temp3;
```
— 161

Redundant Block

```
temp1 = 1;
temp2 = temp1+2;
temp3 = temp1<<2;
```
— 162

Redundant Block

```
temp1 = 5;
temp2 = temp1+5;
temp3 = temp2<<2;
```
— 163

Redundant Block

```
temp1 = 7;
temp2 = temp1+4;
temp3 = temp1<<2;
```
— 164

Original Function Information Table — 140

| | | |
|---|---|---|
| Total Number of Original Functions | | — 141 |
| 142 — Original Function Information | Original Function Name | — 145 |
| | Start Position | — 146 |
| | End Position | — 147 |
| | Num of Process Blocks | — 148 |
| 143 — Original Function Information | Original Function Name | |
| | Start Position | |
| | End Position | |
| | Num of Process Blocks | |
| ⋮ | | |
| 144 — Original Function Information | Original Function Name | |
| | Start Position | |
| | End Position | |
| | Num of Process Blocks | |

FIG. 11

| | | | | |
|---|---|---|---|---|
| | Number of Conversion Information Blocks (2) | | | 551 |
| | Conversion Information Size (180) | | | 561 |
| | Conversion Information Type (1) | | | 562 |
| | Conversion Information Key ID (1) | | | 563 |
| Conversion Information Block [#1] | Integration Information [#1] | | Root Function Name (Method1) | 565 |
| | | | Root Function Size (20) | 566 |
| | | | Num of Pieces of Additional Information (3) | 567 |
| | | Additional Info [#1] | Additional Function Name (Method1_b0) | 571 |
| | | | Additional Function Size (20) | 572 |
| | | Additional Info [#2] | Additional Function Name (Method1_b1) | |
| | | | Additional Function Size (20) | |
| | | Additional Info [#3] | Additional Function Name (Method1_b2) | |
| | | | Additional Function Size (20) | |
| Conversion Information Block [#2] | | Conversion Information Size (140) | | |
| | | Conversion Information Type (1) | | |
| | | Conversion Information Key ID (1) | | |
| | Integration Information [#2] | | Root Function Name (Method2) | |
| | | | Root Function Size (20) | |
| | | | Num of Pieces of Additional Information (2) | |
| | | Additional Info [#1] | Additional Function Name (Method2_b0) | |
| | | | Additional Function Size (20) | |
| | | Additional Info [#2] | Additional Function Name (Method2_b1) | |
| | | | Additional Function Size (20) | |

Conversion Information Key Table

| Key Information ||
|---|---|
| Conversion Information Key ID | Conversion Information Key |
| 002 | 0x035b72··· |
| 003 | 0xbd084f5··· |

FIG. 42

Device Key Table ~701

| Device Key Information ||
|---|---|
| Device Key ID | Device Key |
| 1 | DK1 |
| 2 | DK2 |
| 3 | DK3 |
| ⋮ | ⋮ |
| 999 | DK999 |

FIG. 43

Device Key Correspondence Table ~711

| Device Key Correspondence Information ||
|---|---|
| Device Key ID | Conversion Information Key ID |
| 1 | 1 |
| 2 | 1 |
| 3 | 2 |
| 4 | 2 |
| 5 | 3 |
| 5 | 4 |
| ⋮ | ⋮ |

FIG. 44

| 721 — Encrypted Sub-Module Key Block | Enc (DK1, S_Key) |
| --- | --- |
| | Enc (DK2, S_Key) |
| | Enc (DK3, S_Key) |
| | Enc (DK4, S_Key) |
| | ⋮ |
| | Enc (DK999, S_Key) |

| 722 — Encrypted Conversion Information Key Block | Conversion Information Key Block | Conversion Information Key ID (1) |
| --- | --- | --- |
| | | Device Key ID (1) |
| | | Encrypted Conversion Information Key Enc (DK1, C_Key1) |
| | Conversion Information Key Block | Conversion Information Key ID (1) |
| | | Device Key ID (2) |
| | | Encrypted Conversion Information Key Enc (DK2, C_Key1) |
| | Conversion Information Key Block | Conversion Information Key ID (2) |
| | | Device Key ID (3) |
| | | Encrypted Conversion Information Key Enc (DK3, C_Key2) |
| | Conversion Information Key Block | Conversion Information Key ID (2) |
| | | Device Key ID (4) |
| | | Encrypted Conversion Information Key Enc (DK4, C_Key2) |
| | Conversion Information Key Block | Conversion Information Key ID (3) |
| | | Device Key ID (5) |
| | | Encrypted Conversion Information Key Enc (DK5, C_Key3) |
| | ⋮ | |

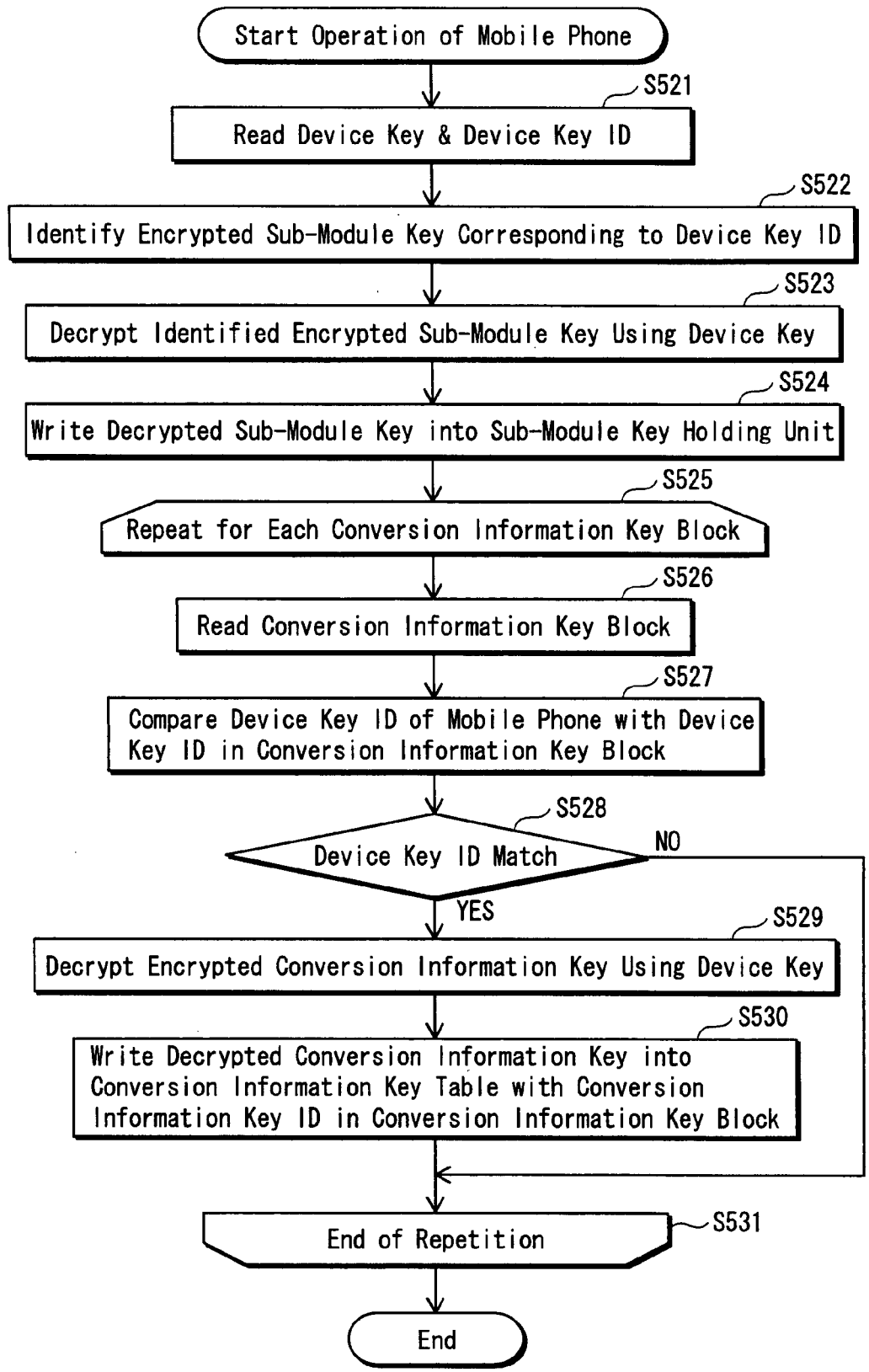

PROGRAM CONVERSION DEVICE AND PROGRAM EXECUTION DEVICE

BACKGROUND OF THE INVENTION

1. Technical Field

The present invention relates to techniques of obfuscating computer programs to protect the programs from unauthorized analysis and tampering. The present invention also relates to techniques of executing an obfuscated program while protecting the program.

2. Background Art

Various program obfuscation techniques have been disclosed in order to protect programs from unauthorized analysis and tampering.

With the aim of providing obfuscation techniques for enhancing software security, Patent document 1 listed below discloses a method for obfuscating computer code to be executed. The disclosed method includes selecting a subset of code, selecting an obfuscating transformation, and applying the selected transformation to the selected subset of code. The thus transformed code can be weakly equivalent to the untransformed code.

Patent document 2 also listed below discloses the following technique for use in a computer system having a DLL (dynamic link library). According to the disclosed technique, a link with a normal library is executed after authenticating the library, so that forgery of the library is prevented. To this end, a main program running on the computer system is provided with an authentication function that includes a data generation unit. The data generation unit inputs authentication data and key data to a data processing part of the program. The data generation unit also gives the same authentication data and key data to a data processing part that is included in an authentication function of the DLL. A data comparison part included in the program compares the $1^{st}$ and $2^{nd}$ sets of processing data obtained from the respective processing parts. When the two sets of processing data are in agreement with each other, the DLL is authenticated as a normal library.

Patent document 3 also listed below discloses the following technique with the aim of providing a system in which programs are efficiency encrypted and decrypted while preventing program tampering. According to the disclosed technique, an initial program IP running an information processing device causes encryption/decryption processing programs Pr1, Pr2, . . . to be transmitted in encrypted form from the information processing device to an IC card on condition that a password matches. The IC card decrypts these programs with a decryption key held by an authentic user and sends them back to the information processing device. The information processing device loads these programs into a work memory area PA to initiate the programs to carry out data encryption/decryption processing. Since these programs are normally in encrypted form, it is ensured that the programs are neither analyzed nor tampered with by a third party. After the authentic user has completed data processing, the programs decrypted into plaintext are erased. Since no programs in plaintext are left unerased after the processing, security of these programs is assured. With the above arrangement, the encryption/decryption processing can be carried out efficiency, because a user needs not to take a storage medium storing these programs out of a deposit place and to set it in the information processing device in each encryption/decryption processing.

Patent document 4 also listed below discloses the following technique with the aim of protecting encrypted data against a malicious attempt to use the data by altering a decryption support program. According to the disclosed technique, a decryption device temporarily suspends CPU operation upon receipt of a decoding request. An address detection part monitors memory access by the CPU and acquires a storage address Pr of an instruction code that has issued the decoding request. An encryption authentication part authenticates an encryption key. A decryption support program authentication part acquires an authentication range designation (pre and post) from the encryption key, calculates a message digest number by applying a one-way hash function to a range of Pr−pre to Pr+post, and compares the calculation result with the message digest number contained in the encryption key to authenticate the correctness of the decryption support program. When this authentication is successful, a data decoding part acquires a decryption key from the encryption key and decrypts the encoded data.

Patent Document 1
   JP Patent Application Publication No. 2002-514333
Patent Document 2
   JP Patent Application Publication No. 11-110193
Patent Document 3
   JP Patent Application Publication No. 9-6232
Patent Document 4
   JP Patent Application Publication No. 11-39156

SUMMARY OF THE INVENTION

As mentioned above, various program protection techniques have been suggested. Yet, devices that execute programs support different security capabilities and different security levels. For example, the capability of protecting memory from prying eyes and/or disabling an analysis tool, such as a debugger, differ from device to device. Due to such differences, in order to protect a program against unauthorized analysis and tampering, the program needs to be obfuscated in accordance with a specific security level of a specific device that will execute the program. Unfortunately, it is extremely troublesome to generate and manage a plurality of obfuscated programs for a plurality of devices having different security capabilities and different security levels.

In order to address the above problems, the present invention aims to provide a program generation device for generating one distribution program that is executable on a plurality of devices having different security capabilities and security levels, while providing an adequate level of security. The present invention also aims to provide a program execution device for executing the distribution program. The present invention also aims to provide a method, a computer program, and a recording medium for the program conversion device as well as for the program execution device.

In order to achieve the above aim, one aspect of the present invention provides a program conversion device for generating, from one original program, one distribution program that is executable on a plurality of program execution devices having different security levels. The program conversion device includes: a storage unit operable to store an original program composed of a plurality of computer instructions; an obfuscation unit operable to obfuscate the original program to generate an obfuscated program; a generating unit operable to generate conversion information that indicates conversion to be applied to the obfuscated program so as to weaken the obfuscation correspondingly to one of the security levels; and an output unit operable to output a distribution program that is composed of the obfuscated program and the conversion information. Another aspect of the present invention provides a program execution device that operates in accordance with a distribution program. The program execution device includes: a storage unit operable to store the distribution program generated by the program conversion device stated above; an acquiring unit operable to search the distribution program to acquire conversion information corresponding to a security level of the program execution device from the distribution program; a generating unit operable, if the conversion information is successfully acquired, to convert the obfuscated program that is included in the distribution program to weaken the obfuscation in accordance with the conversion information, so that a unique program that corresponds to the security level of the program execution device is generated; and a processor operable to execute the unique program.

EFFECTS OF THE INVENTION

With the above configuration, the distribution program includes an obfuscated program and conversion information for weakening the obfuscation of the program. Thus, the program generation device is required to generate only one distribution program. With the use of the conversion information and from the one distribution program, an execution device is enabled to generate and execute a unique program correspondingly to the specific security level of that execution device.

The original program stored in the storage unit of the program conversion device may include a sub-program composed of one or more instructions. The obfuscation unit may include: a dividing sub-unit operable to divide the sub-program into a plurality of partial programs; and an obfuscating sub-unit operable to obfuscate the plurality of partial programs to generate a plurality of obfuscated partial programs that together constitute the obfuscated program. The generating unit of the program conversion device may encrypt integration information so that the conversion information is generated. The integration information indicates which of the partial programs are to be integrated. The output unit may output the distribution program that includes the plurality of obfuscated partial programs and the encrypted integration information. The obfuscating sub-unit may encrypt the plurality of obfuscated partial programs, so that a plurality of encrypted partial programs are generated. The output unit may output the distribution program that includes the plurality of encrypted partial programs and the encrypted integration information.

The storage unit of the program execution device may store the distribution program generated by the program conversion device stated above. The acquiring unit may decrypt the encrypted integration information acquired as the conversion information. If the encrypted integration information is successfully decrypted, the generating unit of the program execution device may decrypt a plurality of encrypted programs indicated by the decrypted integration information, so that a plurality of partial programs of the unique program are generated. The processor may execute the plurality of partial programs generated.

With the above configuration, the program generation device encrypts integration information indicating which of the partial programs are to be integrated, so that encrypted integration information is generated. The program execution device decrypts the encrypted integration information to generate integration information. Once the integration information is generated, the program execution device can integrate the plurality of partial programs with reference to the integration information and execute the integrated program. Consequently, the number of decryption processes that the program execution device is required to carry out is reduced, so that the load imposed on the program execution device is reduced.

The generating unit of the program conversion device may encrypt the integration information by using a conversion information key.

The storage unit of the program execution device is operable to store the distribution program generated by the program conversion device of stated above. The acquiring unit may decrypt the encrypted integration information by using the conversion information key.

With the above configuration, the program generation device encrypts integration information with use of a conversion information key, and the program execution device decrypts the encrypted integration information with use of the conversion information key. Thus, it is ensured that the plurality of partial programs can be integrated only by the program execution device having the conversion information key.

The obfuscating sub-unit may encrypt each partial program by using a program key.

The storage unit of the program execution device may store the distribution program generated by the program conversion device stated above. The generating unit of the program execution device may decrypt the encrypted program by using the program key.

With the above configuration, the program generation device encrypts partial programs with use of a program key, and the program execution device decrypts the encrypted partial programs with use of the program key. Thus, it is ensured that each encrypted partial program is decryptable only by the program execution device having the program key.

The original program stored in the storage unit of the program conversion device may include a sub-program composed of one or more instructions. The obfuscation unit may include: a dividing sub-unit operable to divide the sub-program into a plurality of partial programs; and an encrypting sub-unit operable to encrypt the plurality of partial programs to generate a plurality of encrypted partial programs that together constitute the obfuscated program. The generating unit of the program conversion device may generate the conversion information by encrypting one or more pieces of integration information by using a security level key that corresponds to a security level. Each piece of integration information indicates which of the partial programs are to be integrated. The output unit may output the distribution program that includes the plurality of encrypted partial programs and the encrypted integration information.

The storage unit of the program execution device may store the distribution program generated by the program conversion device stated above. The acquiring unit may decrypt the encrypted integration information by using a security level key held by the program execution device. If the encrypted integration information is successfully decrypted, the generating unit of the program execution device may decrypt the plurality of encrypted partial programs indicated by the decrypted integration information, so that a plurality of partial programs are generated as parts of the unique program. The processor may execute the unique program that includes the plurality of partial programs generated.

With the above configuration, the program generation device encrypts integration information indicating which of a plurality of partial programs should be integrated, with use of a security level key corresponding to a specific security level. The program execution device attempts to decrypts the encrypted integration information with use of a security level key held therein to generate integration information. Once integration information is generated, the program execution device can integrate the plurality of partial programs with use of the generated integration information, and execute the integrated program. Thus the program execution device is required to carry out decryption a reduced number of times, so that the load imposed on the program execution device is reduced.

The obfuscation unit may insert a redundant block composed of one or more redundant instructions into the original program, so that the obfuscated program is generated. The generating unit of the program conversion device may encrypt position information so that encrypted position information is generated as the conversion information. The position information indicates apposition in the original program at which the redundant block is inserted. The output unit may output the distribution program that includes the encrypted position information and the obfuscated program into which the redundant block is inserted.

The storage device of the program execution device may store the distribution program generated by the program conversion device stated above. The acquiring unit may decrypt the encrypted position information acquired as the conversion information. If the encrypted position information is successfully decrypted, the generating unit of the program execution device may invalidate one or more instructions of the distribution program stored at a storage location indicated by the decrypted position information. The processor may execute the unique program that includes the one or more invalidated instructions.

With the above configuration, the program generation device inserts a redundant block and encrypts position information indicating a position into which the redundant block is inserted. The program execution device decrypts the encrypted position information to generate position information. Once the position information is generated, the program execution device can invalidate the redundant block with reference to the generated position information. Thus, the load imposed on the program execution device is reduced.

The generating unit of the program conversion device may encrypt the position information by using a conversion information key.

The storage unit of the program execution device may store the distribution program generated by the program conversion device stated above. The acquiring unit is operable to decrypt the encrypted position information by using the conversion information key.

With the above configuration, the program generation device encrypts the position information with use of a conversion information key. The program execution device decrypts the encrypted position information with use of the conversion information key. Thus, it is ensured that the position information is available only to the program execution device having the conversion information key.

The obfuscation unit may insert a check program for detecting any tampering with the original program into the original program, so that the obfuscated program is generated. The generating unit of the program conversion device may encrypt check information that includes position information and an invalidated program, so that the conversion information is generated. The position information indicates a position in the original program at which the check program is inserted. The invalidated program is an invalidated version of the check program causing no checking operation to be performed. The output unit may output the distribution program that includes the encrypted check information and the obfuscated program into which the check program is inserted.

The storage unit of the program execution device may store the distribution program generated by the program conversion device stated above. The acquiring unit may decrypt the encrypted check information acquired as the conversion information. If the encrypted check information is successfully decrypted, the generating unit of the program execution device may replace one or more instructions of the distribution program stored at a storage location indicated by the decrypted position information with the invalidated program included in the generated check information. The processor may execute the unique program that includes the invalidated program.

With the above configuration, the program generation device inserts a check program and encrypts check information that is composed of an invalidated program and position information indicating a position into which the check program is inserted. The program execution device decrypts the encrypted check information to generate position information and an invalidated program. Once the check information is decrypted, the program execution device replaces the check program with the invalidated program, with reference to the generated position information. Thus, the load imposed on the program execution device is reduced.

The generating unit of the program conversion device may encrypt the check information by using a conversion information key.

The storage unit of the program execution device may store the distribution program generated by the program conversion device stated above. The acquiring unit may decrypt the encrypted check information by using the conversion information key.

With the above configuration, the program generation device encrypts the check information with use of a conversion information key. The program execution device decrypts the encrypted check information with use of the conversion information key. Thus, it is ensured that the check information is available only to the program execution device having the conversion information key.

As has been described above, the program generation device and the program execution device according to the present invention allow one and the same program to be distributed to a plurality of program execution devices having different security levels. Each program execution device is allowed to use the conversion information so as to execute the distribution program at the obfuscation level adjusted correspondingly to the security level of the specific program execution device.

BRIEF DESCRIPTION OF THE DRAWINGS

FIG. 3 illustrates an exemplary data structure of a conversion information key table 121;

FIG. 5 illustrates exemplary data structures of redundant blocks 161, 162, 163, 164 . . . ;

FIG. 6 illustrates an exemplary data structure of an original function information table 140;

FIG. 11 illustrates an exemplary data structure of a conversion information 550 (continued to FIG. 12);

FIG. 20 illustrates an exemplary data structure of a conversion information key table 261;

FIG. 42 illustrates an exemplary data structure of a device key table 701;

FIG. 43 illustrates an exemplary data structure of a device key correspondence table 711;

FIG. 44 illustrates an exemplary data structure of an encrypted sub-module key block 721 and an encrypted conversion information key block 722;

FIG. 47 is a flowchart of operation of a mobile phone 200*ad* performed for decrypting the encrypted sub-module key and the encrypted conversion information key.

REFERENCE NUMERALS

10 Program Distribution System
20 Internet
30 Mobile Phone Network
100 Program Conversion Device
101 Information Storage Unit
102 Program Analysis Unit
103 Obfuscation Unit
104 Control Unit
105 Input Unit
106 Display Unit
107 Redundant Process Generating Unit
109 Sub-Module Key Holding Unit
110 Encryption Unit
111 Conversion Information Key Holding Unit
112 Communication Unit
200*a* Mobile Phone
200*b* DVD Player
200*c* Personal Computer
201 Sub-Module Key Holding Unit
202 Conversion Information Key Holding Unit
203 Function Information Holding Unit
203 Function Holding Unit
204 Pre-Processing Unit
205 Decryption Unit
206 Expansion Unit
207 Program Execution Unit
208 Integration Information Holding Unit
209 Function Information Holding Unit
210 Decryption State Management Unit
211 Information Storage Unit
212 Redundant Processing Unit
221 Speaker
222 Microphone
223 Display Unit
224 Input Unit
225 A/D Conversion Unit
226 Control Unit
227 Communication Control Unit
228 Communication Unit
229 Antenna

DETAILED DESCRIPTION OF THE INVENTION

1. Embodiment

The following describes a program distribution system 10 embodying the present invention.

1.1 Structure of Program Distribution System 10

Figure 1:
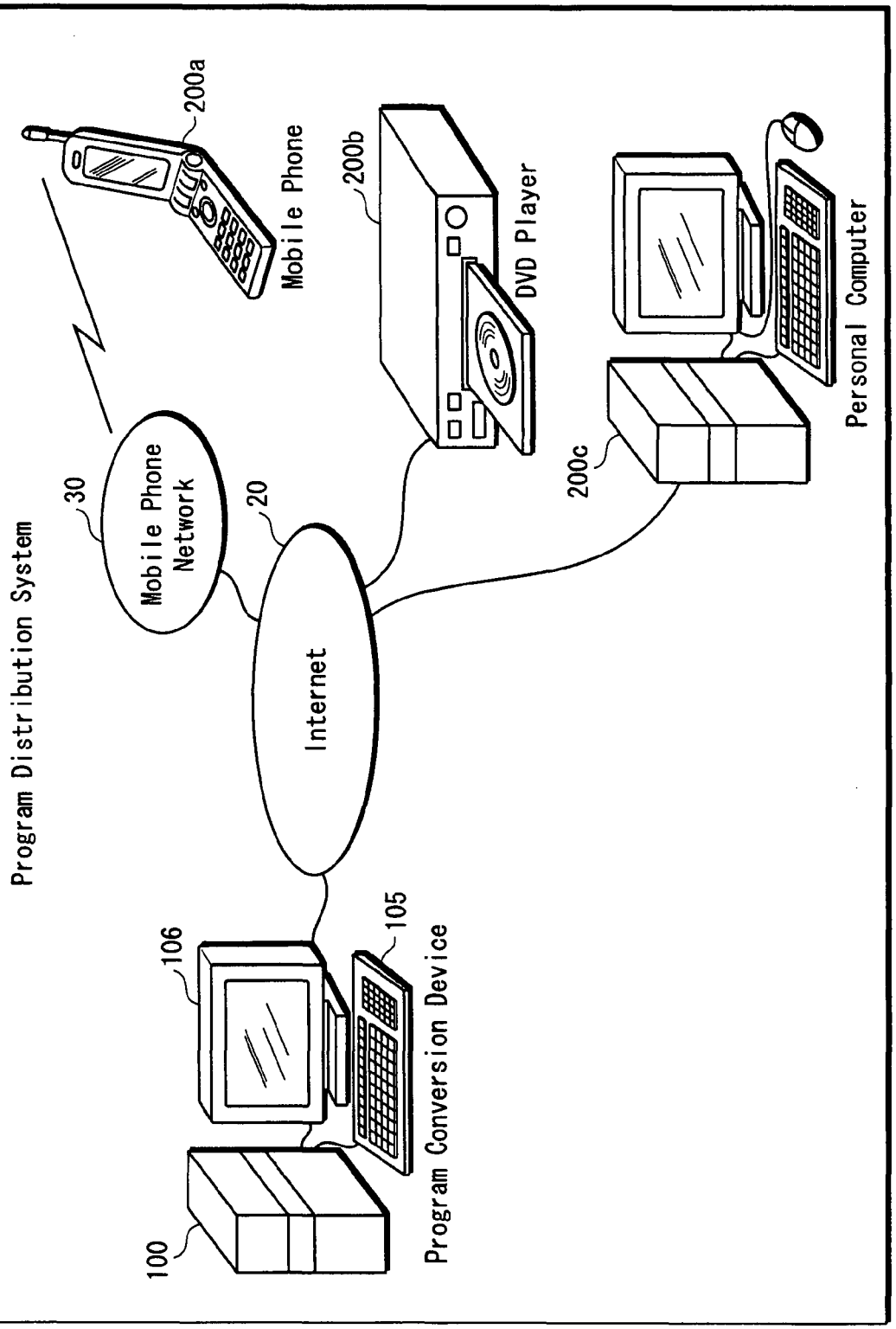
FIG. 1 is a diagram illustrating the system configuration of a program distribution system 10.

As illustrated in FIG. 1, the program distribution system 10 is generally composed of a program conversion device 100, a mobile phone 200a, a DVD player 200b, and a personal computer 200c.

The program conversion device 100, the DVD player 200b, and the personal computer 200c are each connected to the Internet 20. The mobile phone 200a is connected to the Internet 20 via a mobile telephone network 30.

The program conversion device 100 generates a distribution program by applying obfuscating conversion to an original program, such as a computer program for executing music playback. According to this embodiment, the obfuscation is carried out by dividing functions contained in the original program into sub-modules and encrypting the sub-modules. The program conversion device 100 transmits the generated distribution program to the mobile phone 200a via the Internet 20 and the mobile telephone network 30 and also to the DVD player 200b and the personal computer 200c via the Internet 20.

The mobile phone 200a, the DVD player 200b, and the personal computer 200c operate in accordance with the received distribution program, so that music playback is executed. When executing the distribution program, each of the three devices decrypts a limited number of sub-modules at a time and sequentially executes the decrypted sub-modules. Each decrypted sub-module is deleted from memory upon completion of execution. This cycle of decryption, execution, and deletion is repeated during the program execution.

Since the distribution program is obfuscated as described above, it is difficult to collect program codes in plaintext. Thus, it is difficult to analyze the distribution program.

It should be noted that the mobile phone 200a, the DVD player 200b, and the personal computer 200c are all different in security level. The mobile phone 200a, the DVD player 200b, and the personal computer 200c each execute the distribution program at obfuscation levels that correspond to the specific security levels of the respective devices. In this embodiment, it is supposed that the personal computer 200c has a high-performance CPU but has a lower security level, whereas the mobile phone 200a and the DVD player 200b have a low-performance CPU but have a higher security level.

1.2 Structure of Program Conversion Device 100

Figure 2:
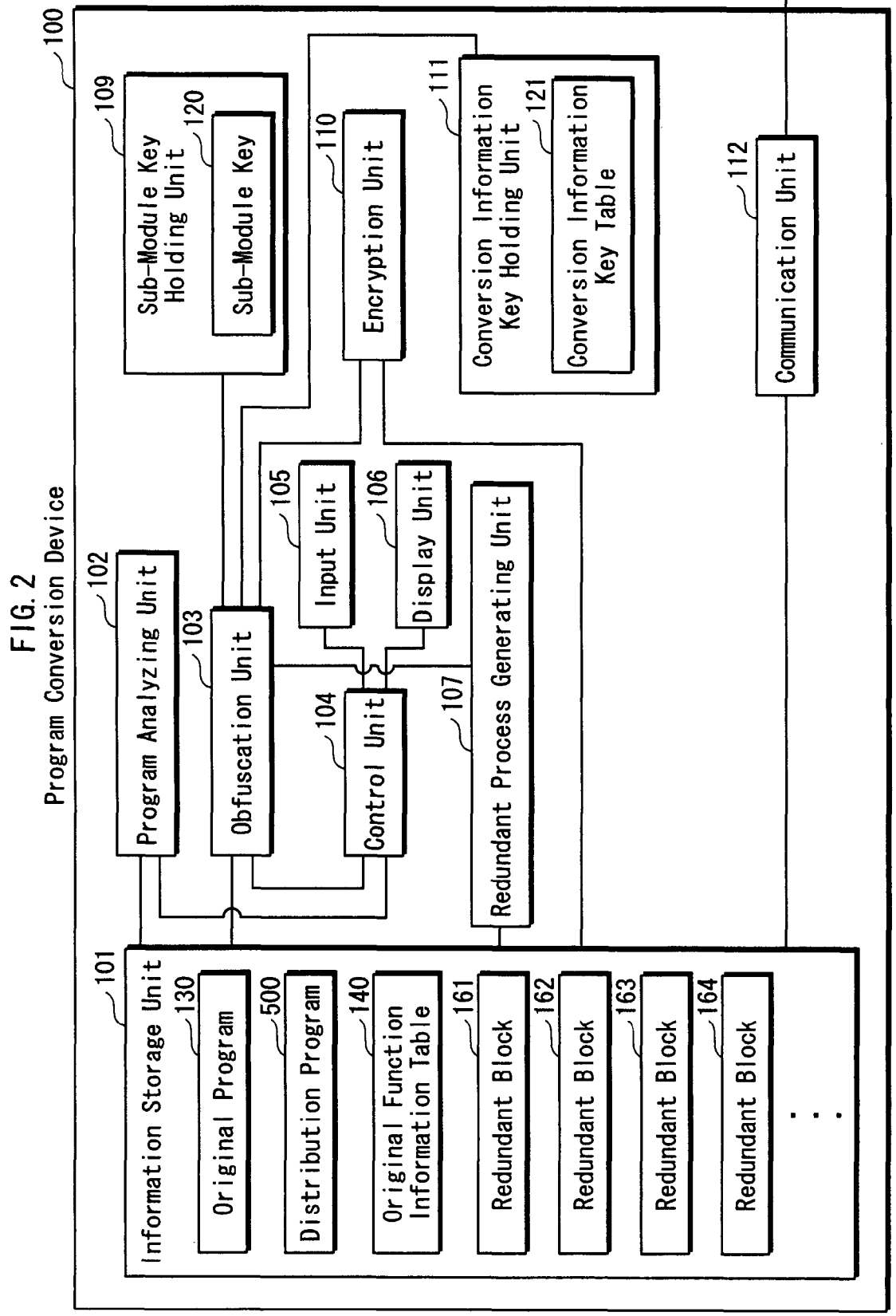
FIG. 2 is a block diagram illustrating the structure of a program conversion device 100.

As illustrated in FIG. 2, the program conversion device 100 is generally composed of an information storage unit 101, a program analyzing unit 102, an obfuscation unit 103, a control unit 104, an input unit 105, a display unit 106, a redundant process generating unit 107, a sub-module key holding unit 109, an encryption unit 110, a conversion information key holding unit 111, and a communication unit 112.

Physically, the program conversion device 100 is a computer system composed generally of a microprocessor, ROM, RAM, communication unit, hard disk unit, display unit, keyboard, and mouse. The RAM or hard disk unit stores a computer program. The microprocessor operates in accordance with the computer program, so that the functional units of the program conversion device 100 perform part of their functionalities.

(1) Sub-Module Key Holding Unit 109 & Conversion Information Key Holding Unit 111

The sub-module key holding unit 109 stores one sub-module key 120 in advance. The sub-module key 120 is a piece of 128-bit information used as an encryption key. The encryption is carried out in accordance, for example, with a secret key cryptography algorithm, such as AES (Advanced Encryption Standard).

The conversion information key holding unit 111 stores an exemplary conversion information key table 121 illustrated in FIG. 3. In this example, the conversion information key table 121 contains 100 pieces of key information. Each piece of key information is generally composed of a conversion information key ID and a conversion information key.

A conversion information key ID is information uniquely identifying a specific piece of key information that contains that conversion information key ID.

A conversion information key is a piece of 128-bit information used as an encryption key. The encryption is carried out in accordance with AES, for example.

In the example illustrated in FIG. 3, the conversion information key table 121 contains pieces of key information 122, 123, 124, . . . . For example, the key information 122 is composed of a conversion information key ID 125 holding the value "001" and a conversion information key 126 holding the value "0x1234546 . . . ".

Note that in the specification and the accompanying drawings, the value "0x1234546 . . . " represents that the numerals "123456 . . . " that follows "0x" are hexadecimal digits.

(2) Information Storage Unit 101

As illustrated in FIG. 2, the information storage unit 101 has areas for storing an original program 130, a distribution program 500, an original function information table 140, redundant blocks 161, 162, 163, 164 . . . and other computer programs and data. The information storage unit 101 store in advance the original program 130 and the redundant blocks 161, 162, 163, 164 . . . .

(a) Original Program 130

Figure 4:
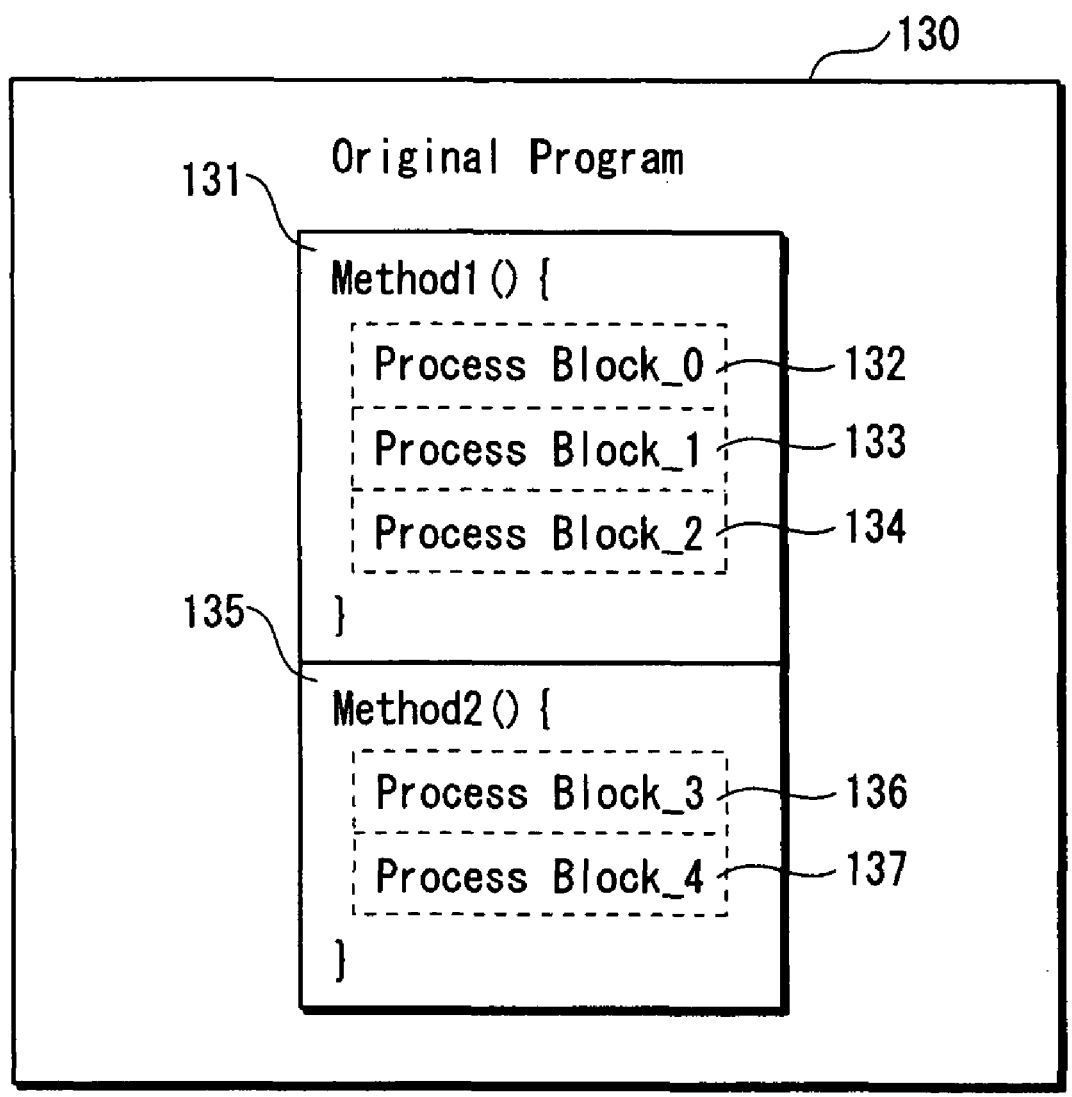
FIG. 4 illustrates an exemplary data structure of an original program 130.

As illustrated in FIG. 4, the original program 130 is a computer program for implementing the given overall functionality and includes functions 131 and 135. Each function is a sub-program for implementing part of the overall functionality. The function 131 is generally composed of process blocks 132, 133, and 134. The function 135 is generally composed of process blocks 136 and 137. Each process block is a section of a sub-program for implementing a smaller part of the overall functionality and is composed of one or more of instruction codes in combination.

Each function has a function name that is unique to the function.

(b) Redundant Blocks 161, 162, 163, 164 . . . .

FIG. 5 illustrates examples of the redundant blocks 161, 162, 163, 164 . . . .

Each redundant block is inserted in process blocks constituting the original program 130.

Each of the redundant blocks 161, 162, 163, 164 . . . is composed of one or more instruction codes in combination. Even if a redundant block is inserted in a process block of the original program 130, no instruction code contained in the redundant block imposes any substantial effect on arithmetic operations to be performed through execution of the process block.

Such a process block of the original program having a redundant block inserted therein is difficult to analyze, since the resulting process block includes one or more instruction codes that are irrelevant to the arithmetic operations.

As illustrated in FIG. 5, the redundant block 161 is composed of an instruction code for declaring an integer type variable. More specifically, three variables "temp 1", "temp 2", and "temp 3" are declared. As described herein, the redundant block 161 declares special variable names that are not expected to be used in the original program 130.

The redundant block 162 defines arithmetic operations that use the variables "temp 1", "temp 2", and "temp 3" and is composed of three arithmetic expressions. In the redundant block 162, no variables other than the variables "temp 1", "temp 2", and "temp 3" are used. Consequently, the arithmetic operations defined in the redundant block 162 impose no substantial effect on the arithmetic operations performed through execution of the process block into which the redundant block 162 is inserted.

Similarly to the redundant block 162, the redundant block 163 defines arithmetic operations that use the variables "temp 1", "temp 2", and "temp 3" and is composed of three arithmetic expressions. The arithmetic operations defined in the redundant block 163 are different from the arithmetic operations defined in the redundant block 162.

Similarly to the redundant block 162, the redundant block 164 defines arithmetic operations that use the variables "temp 1", "temp 2", and "temp 3" and is composed of three arithmetic expressions. The arithmetic operations defined in the redundant block 164 are different from the arithmetic operations defined in the redundant blocks 163 and 164.

The redundant block 161 is composed only of a variable declaration statement, whereas the redundant blocks 162, 163, and 164 do not include any variable declaration statements. Thus, for example, possible combinations of redundant blocks to be together inserted into a process block is a combination of the redundant blocks 161 and 162, a combination of the redundant blocks 161 and 163, and a combination of the redundant blocks 161 and 164.

(c) Original Function Information Table 140

The original function information table 140 is generated by the program analyzing unit 102 through analysis of the original program 130 and contains information regarding the functions contained in the original program 130.

As illustrated in FIG. 6, the exemplary original function information table 140 contains a total original function number 141, along with as may pieces of original function information 142, 143 . . . 144 as the total original function number 141.

The total original function number 141 indicates how many functions are contained in total in the original program 130.

The pieces of original function information 142, 143 . . . 144 are in a one-to-one correspondence with functions contained in the original program 130.

Each piece of original function information is composed of an original function name, a start position, an end position and a process block number.

An original function name is an identifier of a function that corresponds to a piece of original function information containing that original function name.

A start position indicates a position in the original program 130 that is the start address of a function corresponding to a piece of original function information containing that start position.

An end position indicates a position in the original program 130 that is the end address of a function corresponding to a piece of original function information containing that start position.

A process block number indicates how many process blocks are contained in a function that corresponds to a piece of original function information containing that process block number.

(d) Distribution Program 500

The distribution program 500 is a computer program composed of a plurality of instruction codes in combination, for implementing the given functionality. Each instruction code represents a directive to a computer. The distribution program 500 is generated by applying obfuscation conversation, which will be described later, to the original program 130.

Figure 7:
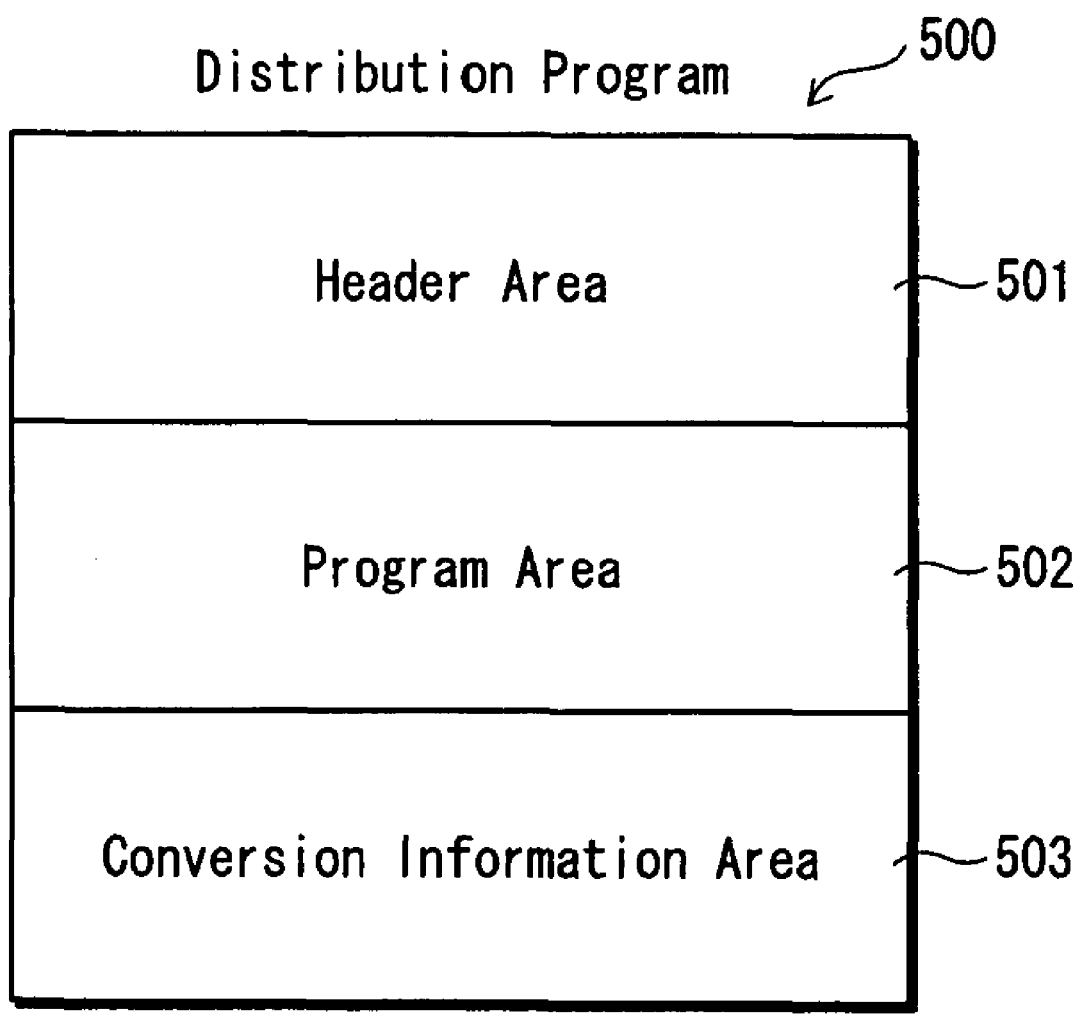
FIG. 7 illustrates an exemplary data structure of a distribution program 500.
Figure 8:
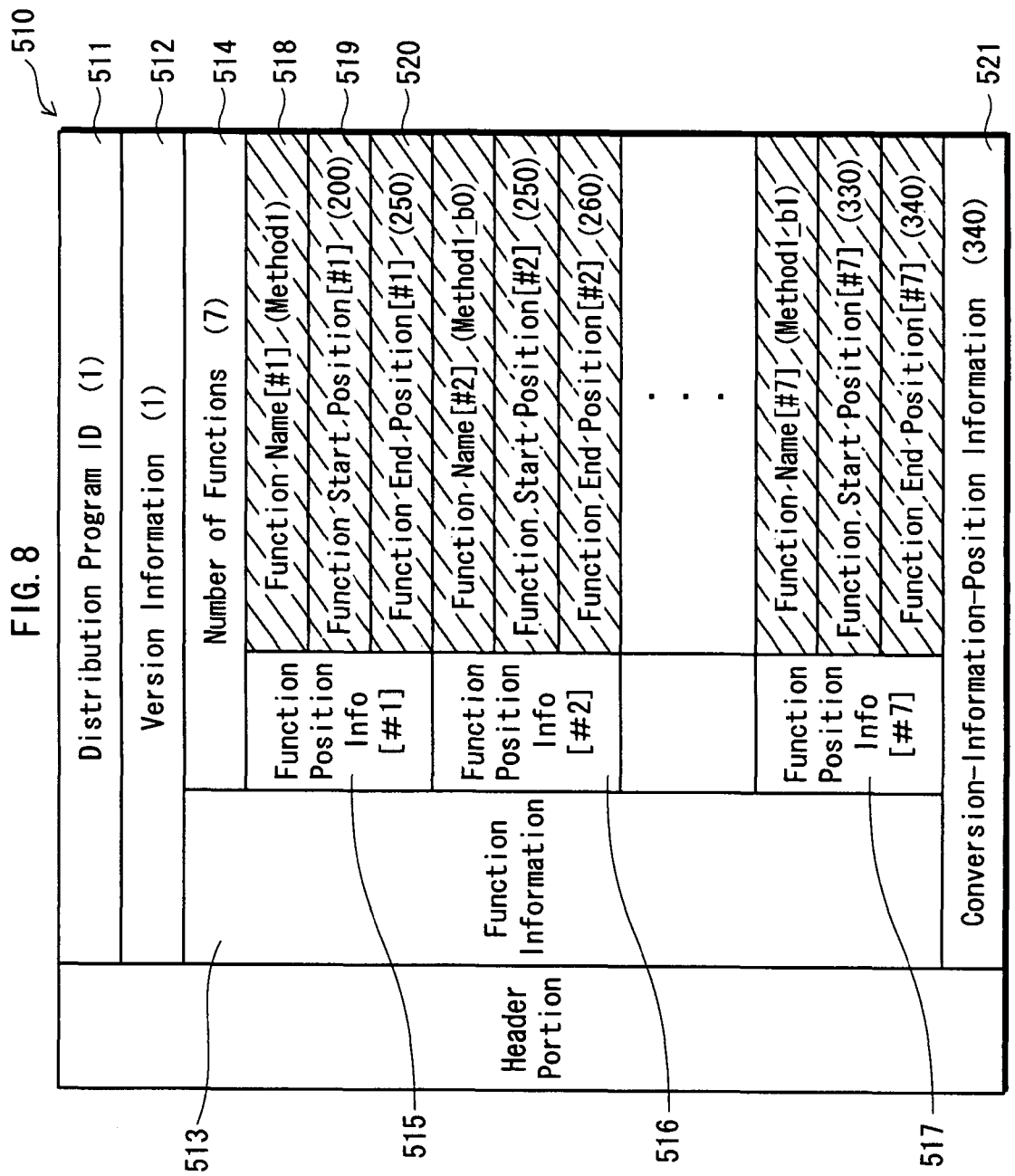
FIG. 8 illustrates an exemplary data structure of a header portion 510.
Figure 9:
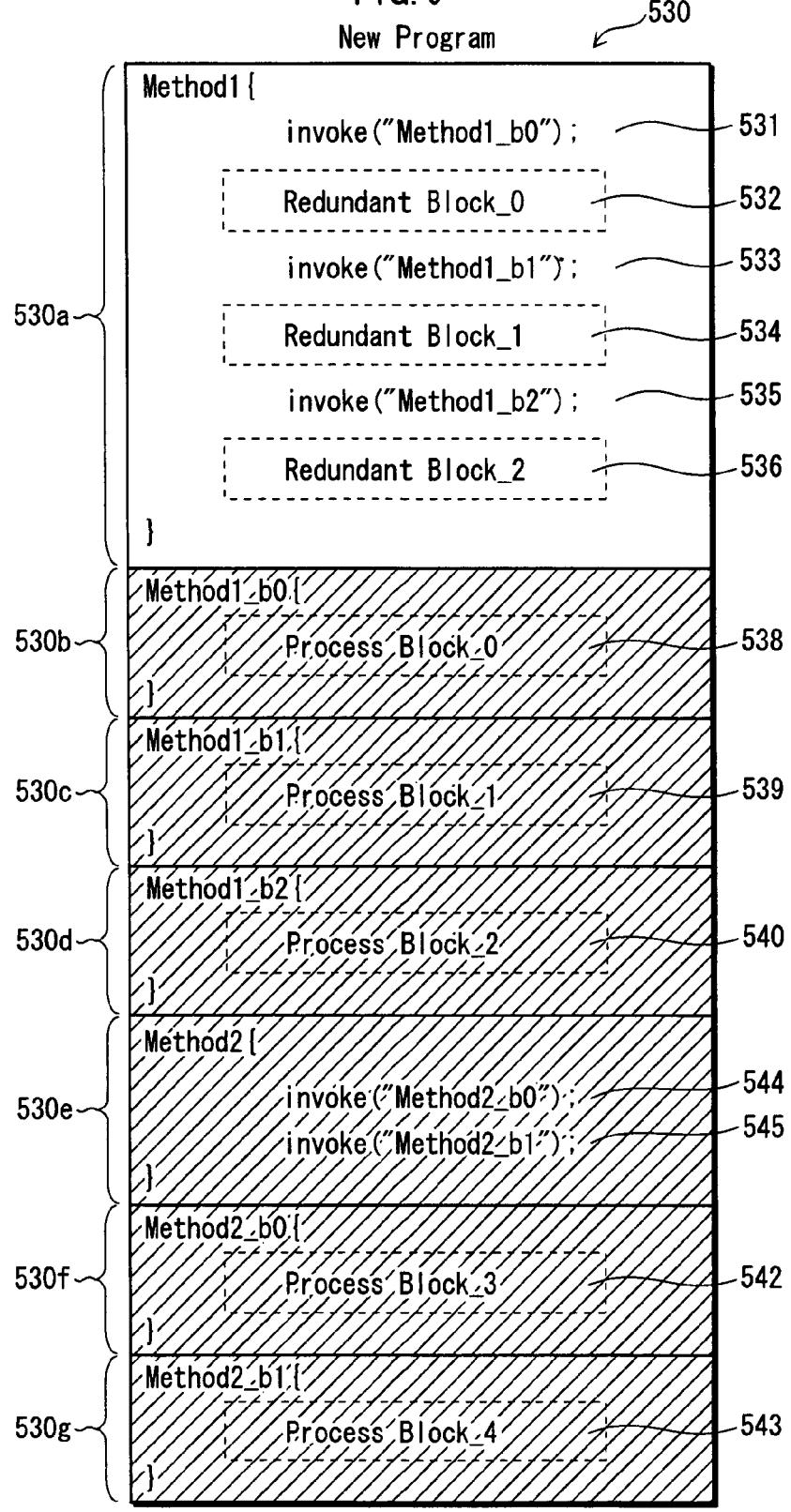
FIG. 9 illustrates an exemplary data structure of a new program 530.
Figure 12:
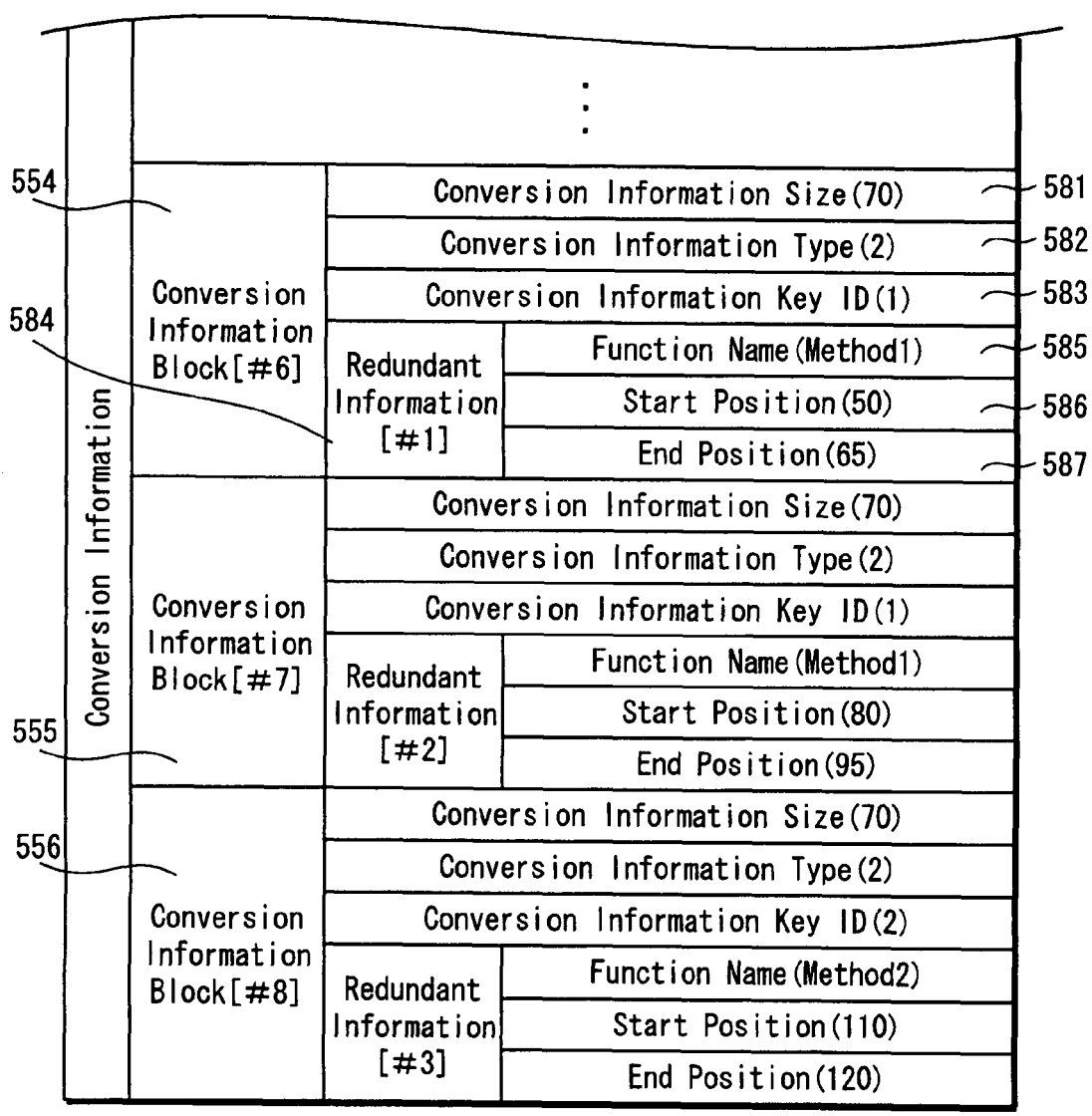
FIG. 12 illustrates the data structure of the conversion information 550 (continued from FIG. 11)
Figure 13:
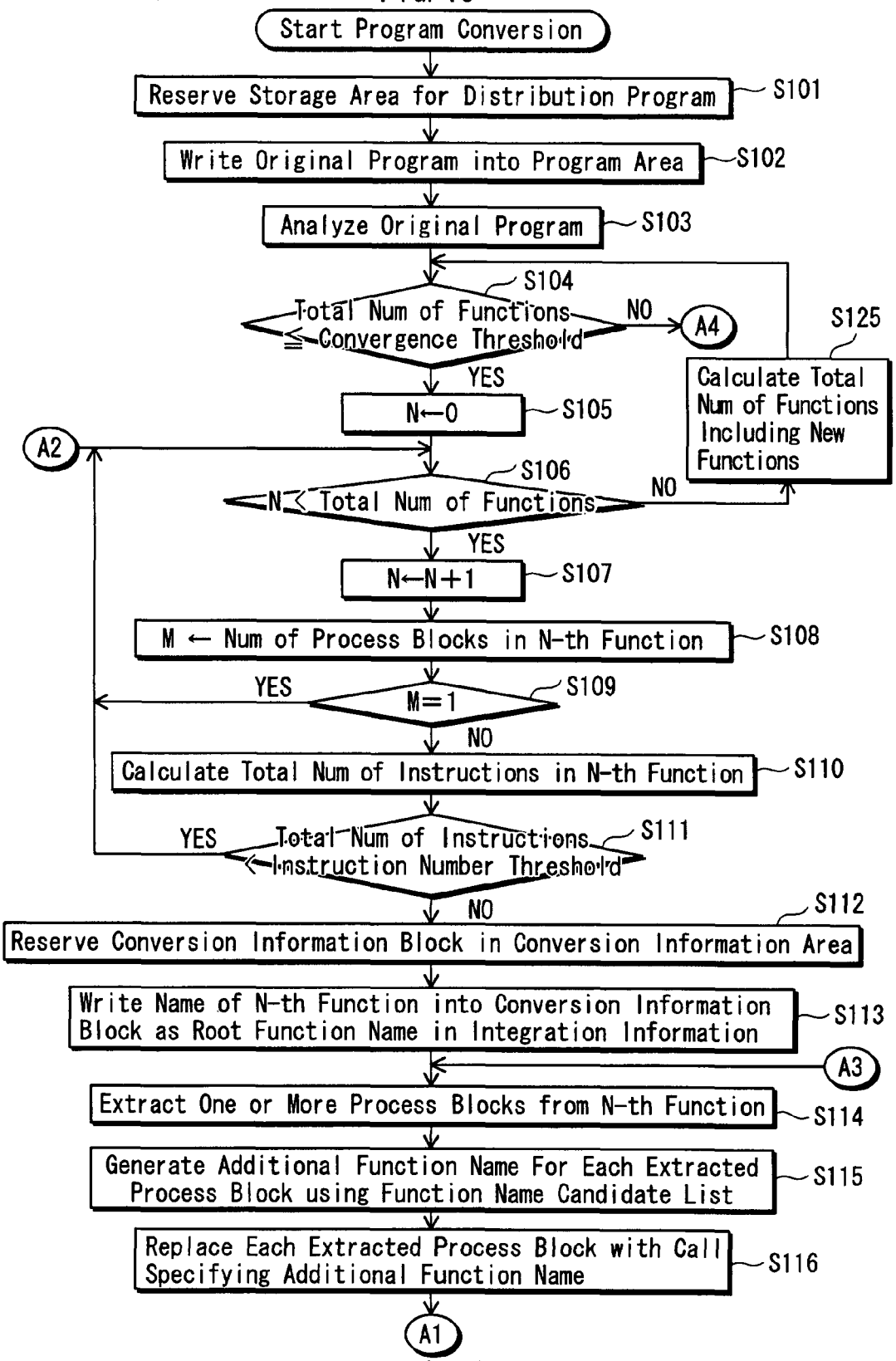
FIG. 13 is a flowchart of operation of the program conversion device 100 (continued to FIG. 14)
Figure 14:
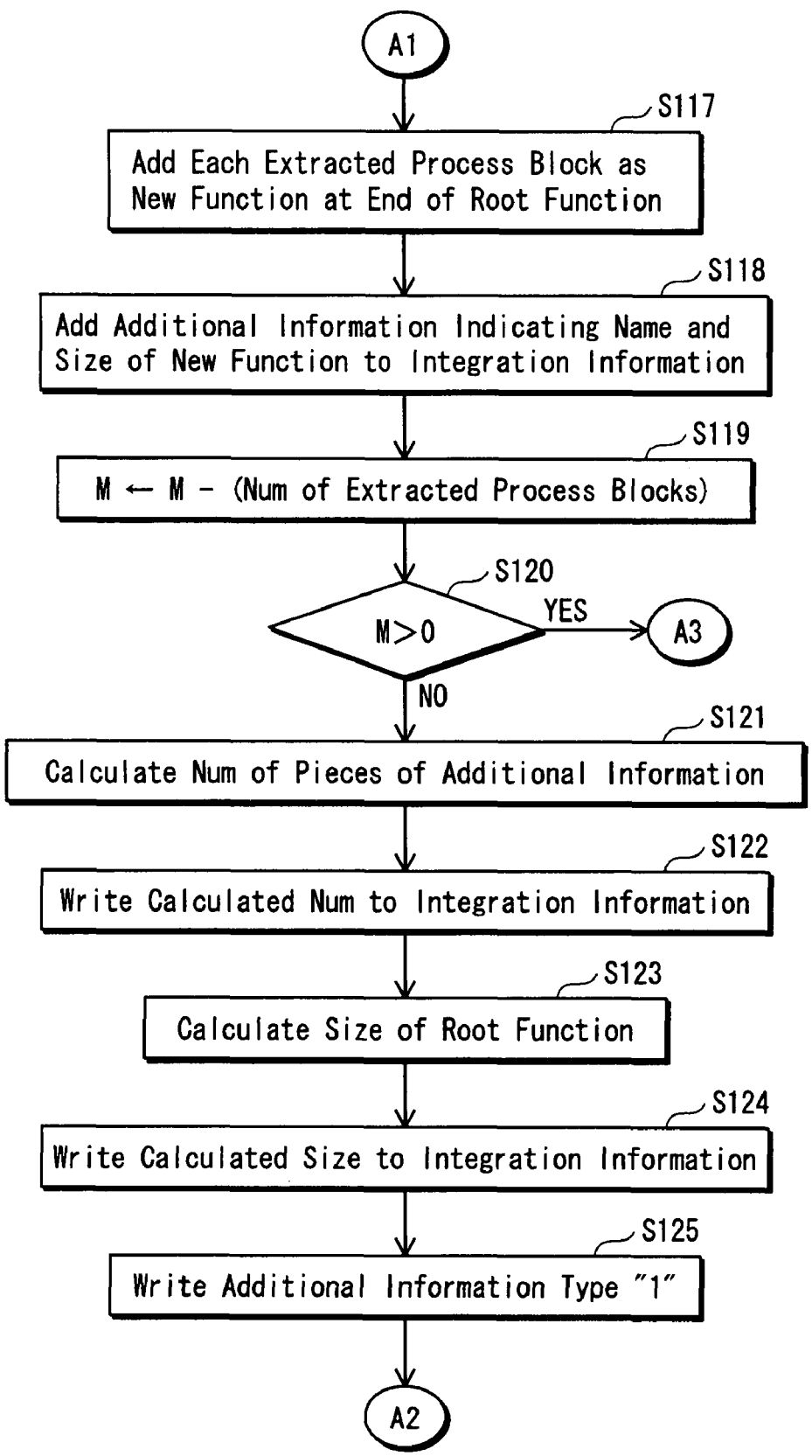
FIG. 14 is the flowchart of operation of the program conversion device 100 (continued to FIG. 15)
Figure 15:
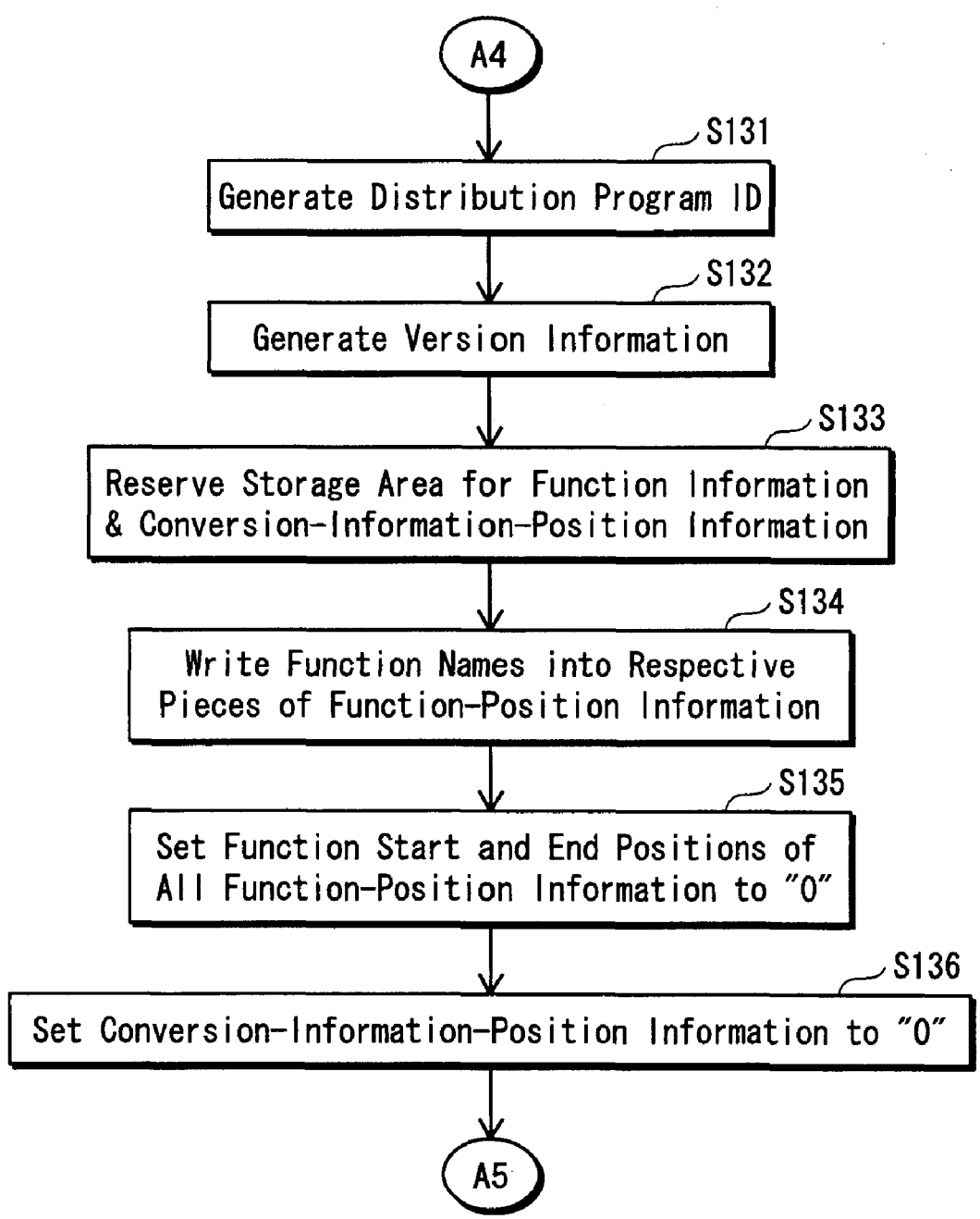
FIG. 15 is the flowchart of operation of the program conversion device 100 (continued to FIG. 16)
Figure 16:
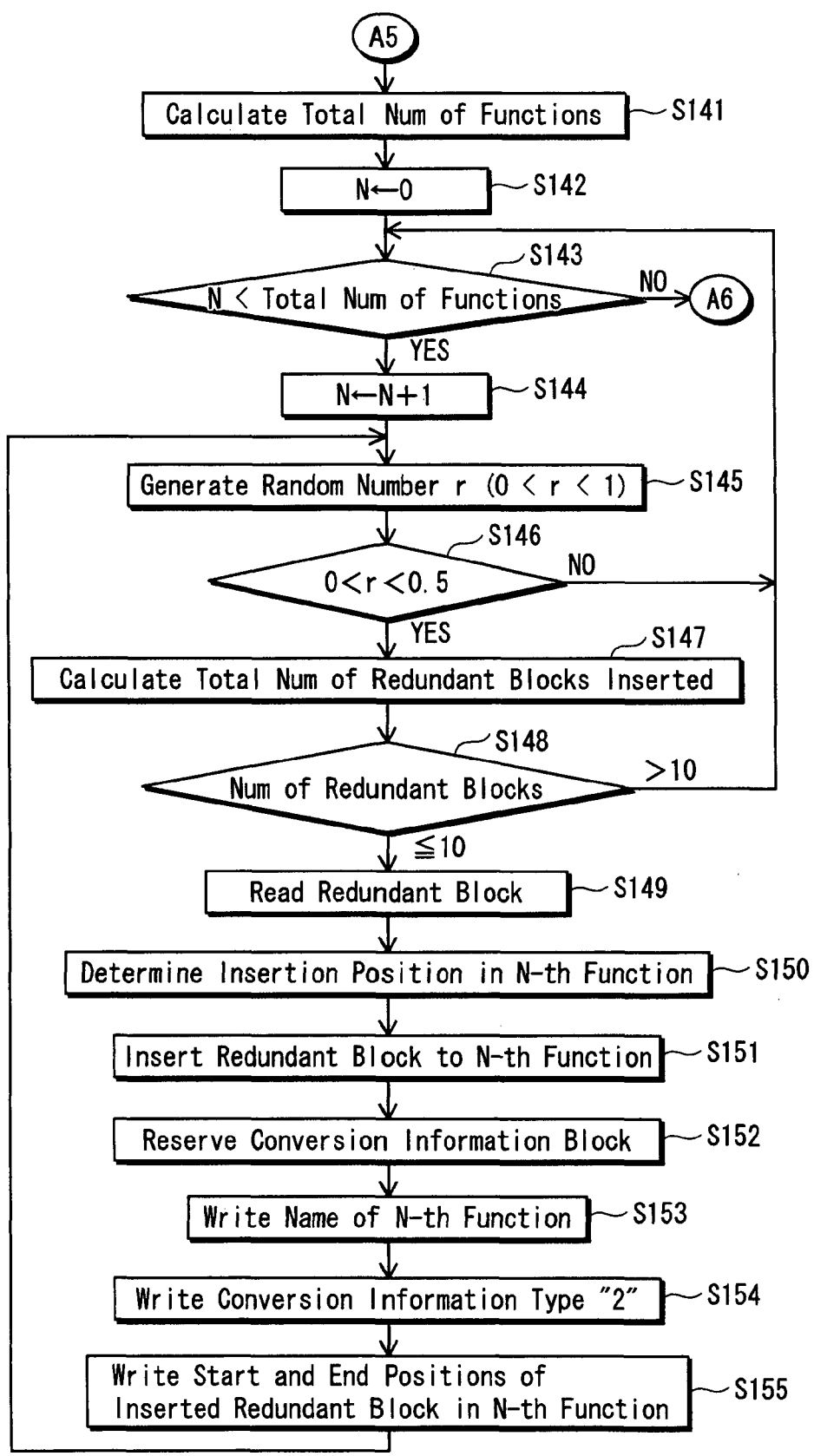
FIG. 16 is the flowchart of operation of the program conversion device 100 (continued to FIG. 17)
Figure 17:
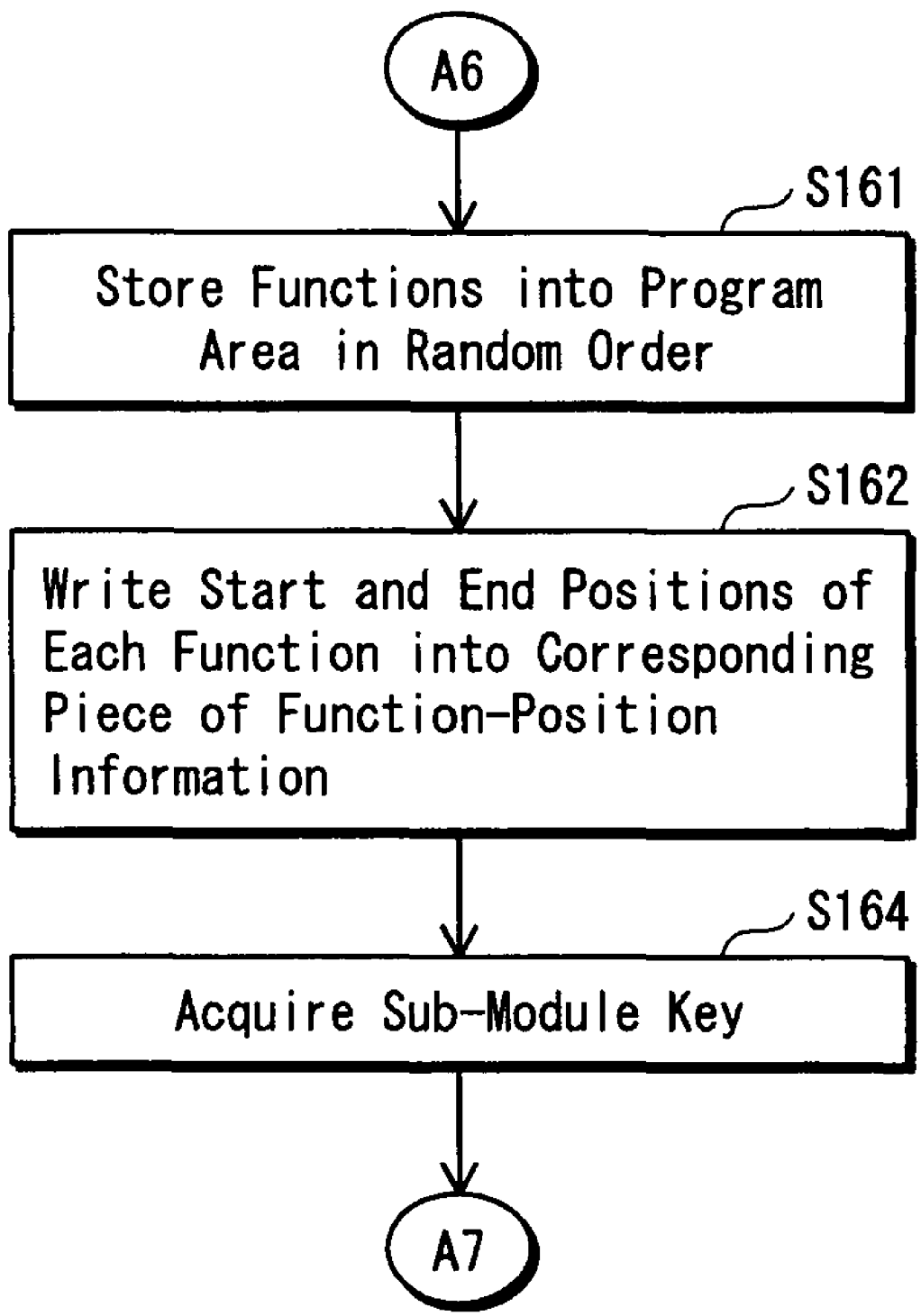
FIG. 17 is the flowchart of operation of the program conversion device 100 (continued to FIG. 18)
Figure 18:
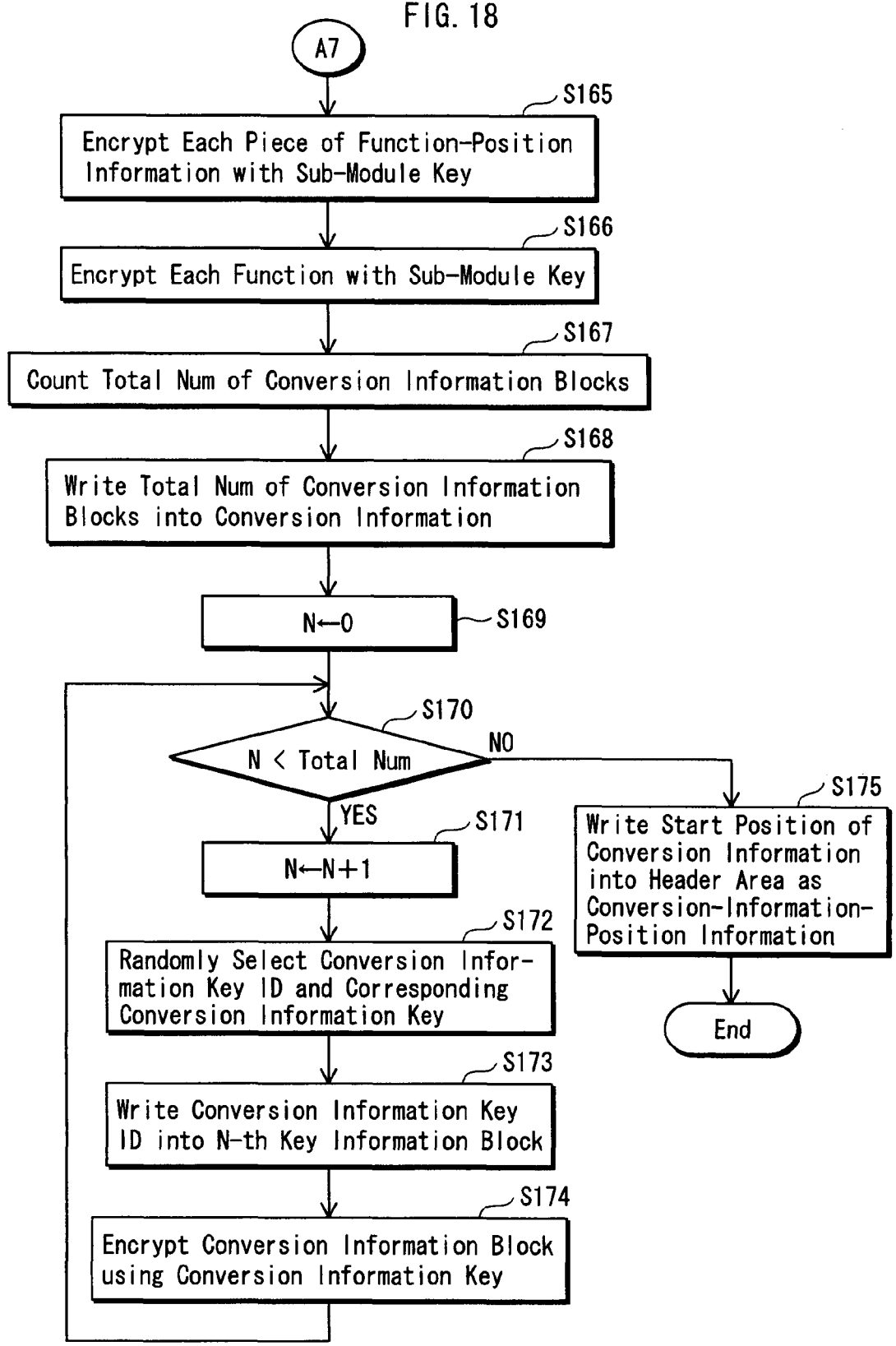
FIG. 18 is the flowchart of operation of the program conversion device 100 (continued from FIG. 17)

As illustrated in FIG. 7, the distribution program 500 is composed generally of a header area 501, a program area 502, and a conversion information area 503. The header area 501 stores a header portion 510 of which one example is illustrated in FIG. 8. The program area 502 stores a new program 530 of which one example is illustrated in FIG. 9. The conversion information area 503 stores conversion information 550 of which one example is illustrated in FIGS. 11 and 12.

Figure 10:
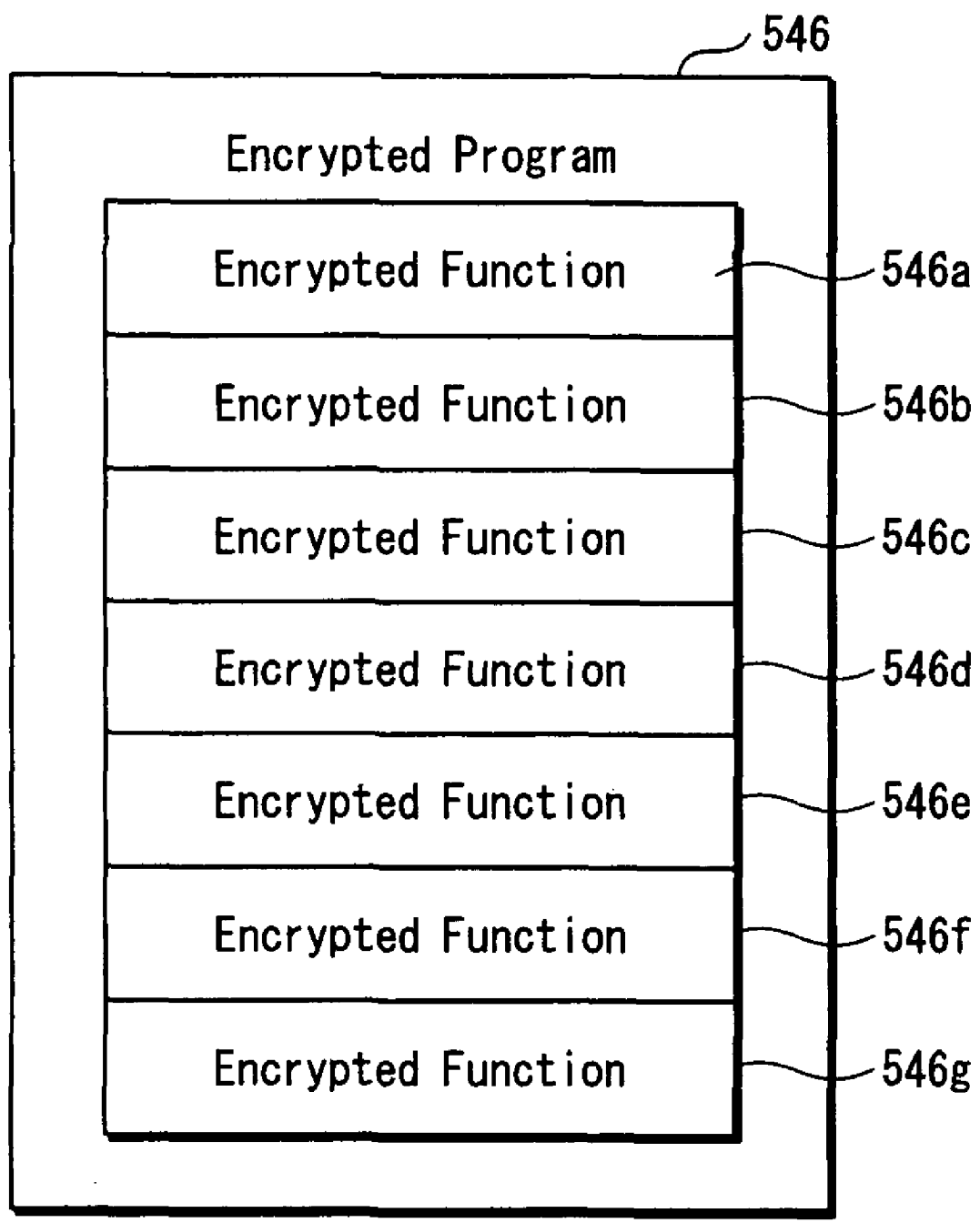
FIG. 10 illustrates an exemplary data structure of an encrypted program 546.

Note that once the later described obfuscation conversion completes, part of the header portion 510, the entire new program 530, part of the conversion information 550 will be in encrypted form. For example, all functions contained in the new program 530 are encrypted as illustrated in FIG. 10. Thus, the program area 502 stores, instead of the new program 530, an encrypted program 546 composed of a plurality of encrypted functions. Encrypted parts of the header portion 510 and of the conversion information 550 will be described later in detail.

(Data Structure of Header Portion 510)

As illustrated in FIG. 8, the header portion 510 is composed generally of a distribution program ID 511, version information 512, function information 513, and conversion-information-position information 521. The function information 513 is composed of a function number 514 and a plurality of pieces of function-position information 515, 516 . . . and 517. Each piece of function-position information is composed of a function name, and start and end positions of a corresponding function.

In FIG. 8, the reference numerals enclosed within brackets "[ ]" are illustrated merely for the illustrative purpose and not part of the data structure. For example, the reference numeral "#1" following the function-position information indicates that the piece of function-position information is the first in the plurality of pieces of function-position information. In FIG. 8, in addition, each description enclosed within parentheses "( )" indicates a concrete example of that item. For example, the reference numeral "(1)" following the distribution program ID 511 indicates that the data content of the distribution program ID 511 is "1". The reference numeral "(1)" following the version information 512 indicates that the data content of the version information 512 is "1". The above explanation regarding FIG. 8 may also apply to other figures illustrating data structures.

The distribution program ID 511 is information uniquely identifying the distribution program 500. The version information 512 is information indicating the generation of the distribution program 500 reflecting updates having been made to the distribution program.

The function number 514 indicates how many functions are contained in the new program 530 that is stored in the program area 502 of the distribution program 500.

The function information 513 includes as many pieces of function-position information as the function number 514. The pieces of function-position information 515, 516 . . . and 517 are in a one-to-one correspondence with the plurality of functions included in the new program 530.

A function name included in a piece of function-position information is an identifier of a function corresponding to that piece of function-position information.

A function start position included in a piece of function-position information indicates a position in the distribution program 500 that is the start address of a function corresponding to that piece of function-position information. A position in the distribution program 500 is expressed with an address relative to the address "0" at which the distribution program 500 starts. The same explanation holds below.

The function end position included in a piece of function-position information is an end address, in the distribution program 500, of the function corresponding to that piece of function-position information.

In the example illustrated in FIG. 8, the function number 514 holds the value "7", which indicates that the distribution program 500 includes seven functions.

Also in the example illustrated in FIG. 8, the function-position information 515 includes a function name 518 holding the value "Method1", a function start position 519 holding the value "200", a function end position 520 holding the value "250". This means that the function corresponding to the function-position information 515 is identified by the function name "Method 1" and the function resides at the position in the distribution program 500 starting at the address "200" and ends at the address "250".

The conversion-information-position information 521 indicates the start address the conversion information area 503 in the distribution program 500.

(Data Structure of New Program 530)

In an example illustrated in FIG. 9, the new program 530 is composed of functions 530a, 530b, 530c, 530d, 530e, 530f, and 530g.

As illustrated in FIG. 9, the function 530a includes a function call instruction 531, a redundant block 532, a function call instruction 533, a redundant block 534, a function call instruction 535, and a redundant block 536.

A function call instruction is an instruction code for execution of the function identified by a function name that is listed in the function call instruction.

As described above, a redundant block includes a set of instruction codes that would impose no substantial influence on the arithmetic operations carried out through execution of the function 530a.

The function 530b includes a process block 538. The process block 538 includes a set of instruction codes for implementing predetermined functionality.

The functions 530c and 530d include a process block 539 and a process block 540, respectively. The process blocks 539 and 540 each include a set of instruction codes for implementing predetermined functionality.

The function 530e includes function call instructions 544 and 545.

The functions 530f and 530g include process blocks 542 and 543, respectively. The process blocks 542 and 543 each include a set of instruction codes for implementing predetermined functionality.

(Data Structure of Encrypted Program 546)

In the example illustrated in FIG. 10, the encrypted program 546 includes encrypted functions 546a, 546b, 546c, 546d, 546e, 546f, and 546g.

The encrypted functions 546a, 546b, 546c, 546d, 546e, 546f, and 546g correspond respectively to the functions 530a, 530b, 530c, 530d, 530e, 530f, and 530g shown in FIG. 9. More specifically, the encrypted functions are generated by applying AES to the functions 530a, 530b, 530c, 530d, 530e, 530f, and 530g with use of the sub-module key 120 stored in the sub-module key holding unit 109.

Generally, in the case of AES, the resulting ciphertext is equal in bit length to plaintext from which the ciphertext is generated. Thus, the encrypted functions 546a, 546b, 546c, 546d, 546e, 546f, and 546g are equal in bit length to the function 530a, 530b, 530c, 530d, 530e, 530f, and 530g, respectively.

Since AES is a bock cipher, it is naturally appreciated that each function is divided into blocks of a predetermined length, 128-bit blocks in this example, and encryption is applied block by block.

(Data Structure of Conversion Information 550)

As illustrated in FIGS. 11 and 12, the conversion information 550 is generally composed of a conversion information block number 551, conversion information blocks 552, 553, 554, 555, and 556.

The conversion information block number 551 indicates how many conversion information blocks are contained in the conversion information 550.

The conversion information blocks are of two types. The conversion information blocks 552 and 553 are of a first type, whereas the conversion information blocks 554, 555, and 556 are of a second type. A conversion information block of the first type inculcates information regarding how the functions contained in the original program 130 are divided. A conversion information block of the second type includes information regarding a redundant block added to the original program 130.

<First Type Conversion Information Block>

A conversion information block of the first type corresponds to a function that is contained in the original program 130 and divided into a plurality of functions through obfuscation conversion, which will be described later.

The conversion information block 552 is generally composed of a conversion information size 561, a conversion information type 562, a conversion information key ID 563, and integration information 564. The conversion information block 553 is identical to the conversion information block 552, in data structure. Thus, no further detail of the conversion information block 553 is given here.

The conversion information size 561 indicates the length of the conversion information block 552, which includes the conversion information size 561.

The conversion information type 562 indicates that the conversion information block 552, which includes the conversion information type 562, is of the first type. More specifically, the conversion information type 562 is set to the value "1" as illustrated in FIG. 11.

The conversion information key ID 563 identifies a conversion information key used for encrypting the integration information included in the conversion information block 552, which includes the conversion information key ID 563.

The integration information 564 corresponds to the conversion information block that contains the integration information 564. The integration information 564 includes information about an original function that is used as a root function and also includes additional functions that are newly generate by dividing the root function.

The integration information 564 includes a root function name 565, a root function size 566, an additional information number 567, and pieces of additional information 568, 569, and 570. The pieces of additional information 568, 569, and 570 are in a one-to-one correspondence with the plurality of additional functions generated by dividing the root function.

The root function name 565 is an identifier of the root function from which the new functions are divided.

The root function size 566 indicates the size of the root function after subjected to the dividing.

The additional information number 567 indicates how many pieces of additional information are included in the integration information 564. That is to say, the additional information number is equal to the number of additional functions newly generated by dividing the root function.

The additional information 568 includes an additional function name 571 and an additional function size 572. Similarly, the pieces of additional information 569 and 570 each include an additional function name and an additional function size.

An additional function name is an identifier of an additional function that corresponds to the additional information containing the additional function name.

An additional function size indicates the size of an additional function that corresponds to the additional information containing the additional function size.

(Second Type Conversion Information Block)

A conversion information block of the second type corresponds to a redundant block added to the original program 130.

The conversion information block 554 is composed of a conversion information size 581, a conversion information type 582, a conversion information key ID 583, and redundant information 584.

The conversion information blocks 555 and 556 are identical to the conversion information block 554 in data structure. Thus, no detailed description of the conversion information blocks 555 and 556 is given here.

The conversion information size 581 indicates the length of the conversion information block 554, which contains the conversion information size 581.

The conversion information type 582 indicates that the conversion information block 554, which the conversion information type 582, is of the second type. More specifically, the conversion information type 582 is set to the value "2", as illustrated in FIG. 12.

The conversion information key ID 583 identifies a conversion information key used for encrypting the redundant information included in the conversion information block 554, which includes the conversion information key ID 583.

The redundant information 584 includes information about a redundant block that corresponds to the conversion information block 554, which contains the redundant information 584, and that is added to the original program 130. The redundant information 584 is composed of a function name 585 a start position 586, and an end position 587.

The function name 585 is an identifier of a function into which the redundant block is inserted.

The start position 586 indicates a start address of the inserted redundant block in the function identified by the function name 585.

The end position 587 indicates an end address of the inserted redundant block in the function identified by the function name 585.

(3) Program Analyzing Unit 102

The program analyzing unit 102 receives from the control unit 104 a directive for analysis of the original program 130.

Upon receipt of the analysis directive, the program analyzing unit 102 reserves an area of the information storage unit 101 for storing the original function information table 140.

Next, the program analyzing unit 102 sequentially reads and decodes instruction codes of the original program 130 from the information storage unit 101 to find the start and end positions of any function, thereby sequentially locating each function included in the original program 130. Regarding each function located, the program analyzing unit 102 extracts the function name of the function, specifies each process block contained in the function, and counts the number of process blocks contained.

For a function located, the program analyzing unit 102 generates a piece of original function information. The original function information is composed of the original function name of the function, the start and end positions of the function, and the process block number indicating how many process blocks are contained in the function. The program analyzing unit 102 then writes the thus generated piece of original function information into the original function information table 140.

For each function located, the program analyzing unit 102 repeats the process of generating a piece of original function information and writing the generated piece original function information to the original function information table 140.

Upon completion of the generation and writing of original function information for each function located, the program analyzing unit 102 counts the number of pieces of original function information having been generated and writes the number, as the total original function number, into the original function information table 140.

Next, the program analyzing unit 102 outputs information indicative of completion of the analysis to the control unit 104.

(4) Obfuscation Unit 103

The obfuscation unit 103 receives from the control unit 104 a directive for obfuscation.

(END Judgment of Function Dividing)

Upon receipt of the obfuscation directive, the obfuscation unit 103 judges whether the total number of functions stored in the program area 502 of the distribution program 500 is equal to or less than a predetermined convergence threshold.

If it is immediately after the analysis by the program analyzing unit 102, i.e., the program stored in the program area 502 of the distribution program 500 is exactly identical to the original program 130, the obfuscation unit 103 reads the total original function number from the original function information table 140 and uses the read number as the total number of functions. As will be later described, if the program stored in the program area 502 of the distribution program 500 has been updated, the obfuscation unit 103 calculates the total number of functions contained in the program stored in the program area 502 of the distribution program 500 and uses the thus calculated number instead of the read total original function number.

The obfuscation unit 103 also stores the convergence threshold in advance. The convergence threshold maybe determined depending, for example, on the size of the original program 130. In one example, the standard size of a function after dividing is determined to be 100 instruction codes or so. Thus, when the original program 130 is the size of 1,000 instruction codes, the convergence threshold is set to "10". The convergence threshold may be calculated by using the following equation.

Convergence Threshold=Original Program Size/Standard Size of Function

The END judgment of the function dividing is made by using the convergence threshold, so that it is expected that each of a plurality of functions will uniformly has the size of about 100 instruction codes or so.

The standard size of each function after the dividing may be determined depending on the processor or memory size of a program execution device that executes the distribution program.

If the total number of the functions is not larger than the convergence threshold, the obfuscation unit 103 divides the functions contained in the program stored in the program area 502 of the distribution program 500. If the number of functions resulting from the division becomes larger than the convergence threshold, the obfuscation unit 103 terminates the dividing.

Note that the dividing of functions may be recursively carried out, especially when the convergence threshold is relatively large. More specifically, if the total number of functions after dividing each function is still not larger than the convergence threshold, the functions newly generated by the dividing may be subjected to another dividing to further increase the number of functions.
(Processing after Function Dividing)

The obfuscation unit 103 performs the following processes (i)-(vii) on each of the plurality of functions included in the program stored in the program area 502 of the distribution program 500. In the following description, a function currently being processed is referred to as a root function.

(i) The obfuscation unit 103 calculates the number of process blocks contained in the root function and assigns the calculated process block number to a variable M.

(ii) The obfuscation unit 103 judges whether the variable M is equal to "1". If the variable M is equal to "1.", it is judged that the root function is not dividable any further. Thus, the dividing processing is terminated.

(iii) If the variable M is not equal to "1", the obfuscation unit 103 calculates the total number of instruction codes included in the root function. The obfuscation unit 103 stores an instruction number threshold in advance and compares the total number of instruction codes with the instruction number threshold. If the total number is smaller than the instruction number threshold, it is judged that the root function is not dividable any further and the dividing processing is terminated. On the other hand, if the total number is not smaller than the instruction number threshold, the following process is performed.

(iv) The obfuscation unit 103 reserves a conversion information block in the conversion information area 503 of the distribution program 500 and writes the name of the root function, as the root function name, into integration information in the conversion information block.

(v) The obfuscation unit 103 repeats the following steps (v-1)-(v-5) on each process block in the root function until no more process block left unprocessed.

(v-1) The obfuscation unit 103 extracts one or more process blocks from the root function.

(v-2) The obfuscation unit 103 generates an additional function name with reference to a function name candidate list stored in the obfuscation unit 103 in advance. The function name candidate list contains a plurality of candidate names for additional function names. If one process block is extracted in (Step v-1), one additional function name is generated. If a plurality of process blocks are extracted, as many additional function names as the number of extracted process blocks are generated.

(v-3) The obfuscation unit 103 replaces each extracted process block with a function call instruction containing the function name generated for the process block. If one process block is extracted in (Step v-1), that process block is replaced with one function call instruction containing the one function name generated. If a plurality of process blocks are extracted, each of the plurality of process blocks is replaced with a function call instruction containing one function name generated for the process block.

(v-4) The obfuscation unit 103 additionally writes the extracted process block at the end of the root function as a new function having the thus generated function name.

(v-5) The obfuscation unit 103 additionally writes, as additional information, the function name generated in (Step v-2) along with the size of the new function into the integration information. [END]

(vi) The obfuscation unit 103 counts the number of pieces of additional information added to the integration information and additionally writes, as the additional information number, the count into the integration information.

(vii) The obfuscation unit 103 computes the size of the root function and writes the determined size, as the root function size, into the integration information. The obfuscation unit 103 then sets the conversion information type to "1". [END]
(Generation of Header Portion 510)

The obfuscation unit 103 generates a distribution program ID and writes, as the distribution program ID 511, the generated distribution program ID into the header portion 510. Next, the obfuscation unit 103 generates version information and write it as the version information 512 into the header portion 510.

Next, the obfuscation unit 103 reserves an area for storing function information and conversion-information-position information in the header portion 510 and writes the function names into the respective pieces of function information. In addition, the obfuscation unit 103 sets the function start and end positions of each piece of function-position information to "0" and also sets the conversion-information-position information to "0".
(Insertion of Redundant Block)

The obfuscation unit 103 outputs to the redundant process generating unit 107 a directive for generation of redundant process. In response, the obfuscation unit 103 receives from the redundant process generating unit 107 END information indicating that the generation of redundant process has been completed.
(Function Relocation)

Next, the obfuscation unit 103 relocates all the functions stored in the program area 502 of the distribution program 500 into a random order.

The obfuscation unit 103 writes the start and end positions of each function contained in the program area 502 of the distribution program 500 into a corresponding piece of function-position information in the header area 501.
(Encryption)

Next, the obfuscation unit 103 acquires the sub-module key 120 from the sub-module key holding unit 109 and fives a directive instructing the encryption unit 110 to encrypt each piece of function-position information in the header area 501, by using the sub-module key 120.

The obfuscation unit 103 also gives, a directive instructing the encryption unit 110 to encrypt each function stored in the program area 502, by using the sub-module key.
(Update of Conversion Information)

Next, the obfuscation unit 103 counts the total numbers of conversion information blocks contained in the conversion information 550 stored in the conversion information area 503 and writes, as the conversion information block number, the counted number into the conversion information 550.

Next, the obfuscation unit 103 performs the following processes (i)-(iii) on each conversion information block contained in the conversion information 550.

(i) With reference to the conversion information key table 121, the obfuscation unit 103 randomly selects a conversion information key ID, along with a conversion information key associated with the conversion information Key ID.

(ii) The obfuscation unit 103 writes the thus selected conversion information key ID into the conversion information block currently processed.

(iii) The obfuscation unit 103 outputs the conversion information key to the encryption unit 110 and gives a directive instructing the encryption unit 110 to encrypt the conversion information block by using the conversion information key.
[END]

Next, the obfuscation unit 103 writes, as the conversion-information-position information, the start address of the conversion information into the header portion 510 in the header area 501.

Next, the obfuscation unit 103 outputs, to the control unit 104, completion information indicating that generation of the distribution program 500 has been completed.

(5) Redundant Process Generating Unit 107

The redundant process generating unit 107 receives from the obfuscation unit 103 a directive for generation of a redundant process. Upon receipt of the redundant process generation directive, the redundant process generating unit 107 calculates the total number of functions contained in the program stored in the program area 502 of the distribution program 500.

Next, the redundant process generating unit 107 repeats the following processes (i)-(iv) on each function contained in the program.

(i) The redundant process generating unit 107 randomly determines whether to insert a redundant block into the function currently being processed. More specifically, the redundant process generating unit 107 generates a random number r that satisfies 0<r<1 and then judges whether 0<r<0.5 is true. If 0.5≦r<1, the redundant process generating unit 107 determines not to insert any redundant block and terminate the process on the current function.

(ii) On the other hand, if 0<random number r<0.5, the redundant process generating unit 107 calculates the number of redundant blocks having been inserted into the current block and judges whether the thus calculated number of redundant blocks is larger than a predetermined threshold, for example "10". If the redundant block number is larger than "10", it is determined to insert no more redundant blocks and terminate the process on the current function. If the redundant block number is not larger than "10", it is determined to insert a redundant block. The redundant process generating unit 107 then reads a redundant block selected at random from all the redundant blocks stored in the information storage unit 101.

(iii) The redundant process generating unit 107 determines a position in the function and inserts the read redundant block into the function at the thus determined position.

(iv) The redundant process generating unit 107 reserves a conversion information block in the conversion information 550, writes the name of the function into the conversion information block, and sets the conversion information type to "2". In addition, the redundant process generating unit 107 writes, as the start and end positions, the start and end positions of where the redundant block is inserted into the function.
[END]

When completing the above processes (i)-(iv) on each function contained in the program, the redundant process generating unit 107 outputs to the obfuscation unit 103 a redundant process END information indicating that the redundant process has been generated.

As has been described above, according to this embodiment of the present invention, a distribution program is obfuscated by adding one or more redundant blocks that would have no substantial influence on the output results of the distribution program. When executing the distribution program containing redundant blocks, the program execution device executes redundant blocks along with process blocks that are originally contained.

A distribution program obfuscated as above is difficult to analyze since a malicious third party attempting to analyze the program is forced to deal with a larger amount of data.

(6) Encryption Unit 110

The encryption unit 110 receives the sub-module key 120 from the obfuscation unit 103 and encrypts, with use of the received sub-module key, each piece of function-position information stored in the header area 501. Each piece of encrypted function-position information is written back into the header area 501.

The encryption unit 110 also encrypts, by using the sub-module key, each function stored in the program area 502 and writes the thus encrypted function back into the program area 502.

The encryption unit 110 receives a conversion information key from the obfuscation unit 103 and encrypts, by using the conversion information key received, a specified conversion information block and writes the thus encrypted conversion information block back into the conversion information 550.

The encryption mentioned above is carried out by using AES.

(7) Control Unit 104

The control unit 104 receives from the input unit 105 a directive instructing to generate the distribution program 500 by applying obfuscation conversion to the original program 130. Upon receipt of the generation directive, the control unit 104 reserves an area of the information storage unit 101 for storing the distribution program 500. The control unit 104 then reads the original program 130 from the information storage unit 101 and writes the read original program into the program area 502 of the distribution program 500.

Next, the control unit 104 outputs a directive instructing the program analyzing unit 102 to analyze the original program 130. In response, the control unit 104 receives, from the program analyzing unit 102, analysis END information indicating that analysis of the original program 130 has been completed.

Next, the control unit 104 outputs, to the obfuscation unit 103, a directive for obfuscation of the distribution program. In response, the control unit 104 receives, from the obfuscation unit 103, completion information indicating that generation of the distribution program 500 has been completed.

Upon receipt of the completion information, the control unit 104 gives a directive instructing the communication unit 112 to transmit the distribution program 500 to each of the mobile phone 200*a*, the DVD player 200*b*, and the personal computer 200*c*.

Note that the control unit 104 may transmit the distribution program on demand, to the mobile phone 200*a*, the DVD player 200*b*, and the personal computer 200*c* in response to a transmission request from the respective device.

(8) Input Unit 105 & Display Unit 106

The input unit 105 receives, from an operator of the program conversion device 100, a request to generate the distribution program 500 by applying obfuscation conversion to the original program 130. Upon receipt of the generation request, the input unit 105 passes the received generation directive to the control unit 104.

The display unit 106 displays various information under control by the control unit 104.

(9) Communication Unit 112

The communication unit 112 receives from the control unit 104 a directive instructing to transmit the distribution program 500. Upon receipt of the transmission directive, the communication unit 112 reads the distribution program 500 from the information storage unit 101 and transmits the read distribution program to the mobile phone 200*a* via the Internet 20 and the mobile telephone network 30 and also to the DVD player 200b and the personal computer 200c via the Internet 20.

1.3 Operation of Program Conversion Device 100

The following describes operation of the program conversion device 100, with reference to the flowcharts shown in FIGS. 13-18.

The control unit 104 reserves an area of the information storage unit 101 for storing the distribution program 500 (Step S101) and writes the original program 130 into the program area 502 of the distribution program 500 (Step S102).

The program analyzing unit 102 analyzes the original program 130 (Step S103).

The obfuscation unit 103 judges whether or not the number of functions stored in the program area 502 of the distribution program 500 (hereinafter, the number is referred to as the total function number) is equal to or smaller than the predetermined convergence threshold. If the total function number is larger than the convergence threshold (Step S104: NO), the processing moves onto Step S131.

On the other hand, if the total function number is equal to smaller than the convergence threshold (Step S104: YES), the obfuscation unit 103 assigns "0" to a variable N (Step S105), compares the variable N with the total function number. If the variable N is larger than the total function number (Step S106: NO), the obfuscation unit 103 again calculates the total function number resulting from the dividing (Step S125) and goes back to Step S104 to repeat the above processing steps.

On the other hand, if the variable N is smaller than the total function number (Step S106: YES), the obfuscation unit 103 increments the variable N by "1" (Step S107) and assigns the number of process blocks contained in the N-th function to the variable M (Step S108).

Next, the obfuscation unit 103 judges whether or not the variable M is equal to "1". If the variable M is "1" (Step S109: YES), it is judged that the root function is no longer dividable. Thus, Step S106 is perfumed again to repeat the above processing steps.

On the other hand, if the variable M is not equal to "1" (Step S109: NO), the obfuscation unit 103 calculates the number of instruction codes contained in the root function, which is the N-th function, (Step S110) to compare the total instruction number with the instruction number threshold. If the total instruction number is smaller than the instruction number threshold (Step S111: YES), it is judged that the root function is not dividable any further. Thus, Step S106 is performed again to repeat the above processing steps.

On the other hand, if the total instruction number is equal to or larger than the instruction number threshold (Step S111: NO), the obfuscation unit 103 reserves a conversion information block into the conversion information area 503 of the distribution program 500 (Step S112) and writes the name of the N-th function, as the root function name, into the integration information of the conversion information block (Step S113).

Next, the obfuscation unit 103 extracts one or more process blocks from the N-th function (Step S114), generates as many additional function name as the extracted process blocks, with reference to the function name candidate list stored in advance in the obfuscation unit 103 (Step S115), replaces each of the extracted process blocks with a function call instruction specifying a different one of the function names newly generated (Step S116), additionally writes each extracted process block at the end of the root function as a new function having the newly generated function name (Step S117). The obfuscation unit 103 then writes, into the integration information, additional information indicating the name and size of the new function generated in Step v-2 (Step S118) and calculates the variable M=the variable M −(the number of process blocks extracted) (Step S119). Next, the obfuscation unit 103 judges whether or not the variable M is larger than "0". If the variable M is larger than "0" (Step S120: YES), Step S114 is performed again to repeat the above processing steps. On the other hand, if the variable M is not larger than "0" (Step S120: NO), the obfuscation unit 103 counts the number of pieces of additional information having been added to the integration information (Step S121), additionally writes the count as the additional information number into the integration information (Step S122), computes the size of the root function (Step S123), and additionally writes the result of computation as the root function size into the integration information (Step S124). The obfuscation unit 103 then sets the conversion information type to "1" (Step S125) and goes back to Step S106 to repeat the above processing steps.

Next, the obfuscation unit 103 generates a distribution program ID and writes the generated distribution program ID as the distribution program ID 511 into the header portion 510 (Step S131), generates and writes the version information 512 into the header portion 510 (Step S132), reserves an area of the header portion 510 for storing function information and conversion-information-position information (Step S133), writes the function names into the respective pieces of function-position information (Step S134), sets the function start and end positions of each piece of function-position information to "0" (Step S135), and sets each piece of conversion-information-position information to "0" (Step S136).

The redundant process generating unit 107 calculates the total number of functions contained in the program area 502 of the distribution program 500 (Step S141) and assigns "0" to the variable N (Step S142). Next, the redundant process generating unit 107 compares the variable N with the total function number. If the variable N is not smaller than the total function number (Step S143: NO), Step S161 is performed next.

On the other hand, if the variable N is smaller than the total function number (Step S143: YES), the redundant process generating unit 107 increments the variable N by "1" (Step S144).

Next, the redundant process generating unit 107 generates the random number r that satisfies 0<r<1 (Step S145) and judges whether 0<r<0.5 it true or not. If 0.5≦r<1 is true (Step S146: NO), the redundant process generating unit 107 determines not to insert any redundant blocks and terminates the processing on the current function. Then, Step S143 is performed next.

On the other hand, if 0<r<0.5 (Step, S146: YES), the redundant process generating unit 107 calculates the number of redundant blocks having been inserted in the current function (Step S147) and judges whether or not the calculate number of redundant blocks is larger than "10". If the number of redundant blocks is larger than "10" (Step S148), it is determined not to insert any more redundant blocks and the processing goes back to Step S143.

On the other hand, if the number of redundant blocks is not larger than "10" (Step S148), it is determined to additionally insert a redundant block. Thus, the redundant process generating unit 107 randomly selects and reads a redundant block from the information storage unit 101 (Step S149), determines a position in the N-th function at which the read redundant block is to be inserted (Step S150), and inserts the read redundant block into the N-th function at the determined position (Step S151). In addition, the redundant process generating unit 107 secures a conversion information block in the conversion information 550 (Step S152), writes the name of the N-th function into the secured conversion information block (Step S153), sets the conversion information type to "2" (Step S154), and writes the start and end positions, which are the start and end positions of the redundant block inserted in the N-th function, into the conversion information block (Step S155). The processing then goes back to Step. S145 to repeat the above processing steps.

Next, the obfuscation unit 103 randomly relocates all the functions contained in the program area 502 of the distribution program 500 into a different order (Step S161) and writes the start and end positions of each relocated function into a corresponding piece of function-position information stored in the header area 501 (Step S162).

Next, the obfuscation unit 103 acquires the sub-module key 120 from the sub-module key holding unit 109 (Step S164). Then, the encryption unit 110 encrypts each piece of function-position information stored in the header area 501, by using the sub-module key (Step S165) and also encrypts each function contained in the program area 502, by using the sub-module key (Step S166).

Next, the obfuscation unit 103 counts the total number of conversion information blocks contained in the conversion information 550 in the conversion information area 503 (Step S167) and writes, as the conversion information block number, the thus acquired total number into the conversion information 550 (Step S168).

Next, the obfuscation unit 103 assigns "0" to the variable N (Step S169), compares the variable N with the total number of blocks. If the variable N is not smaller than the total number (Step S170: NO), the obfuscation unit 103 writes the start position of the conversion information, as the conversion-information-position information, into the header portion 510 stored in the header area 501 (Step S175) and then terminates the processing.

On the other hand if the variable N is smaller than the total number (Step S170: YES), the obfuscation unit 103 increments the variable N by "1" (Step S171), randomly selects from the conversion information key table 121 a conversion information key ID and a corresponding conversion information key (Step S172), and writes the thus selected conversion information key ID into the conversion information block (Step S173). The encryption unit 110 encrypts the conversion information block by using the selected conversion information key (Step S174). Then, Step S170 is performed again to repeat the above processing steps.

1.4 Structure of Mobile Phone 200a

Figure 19:
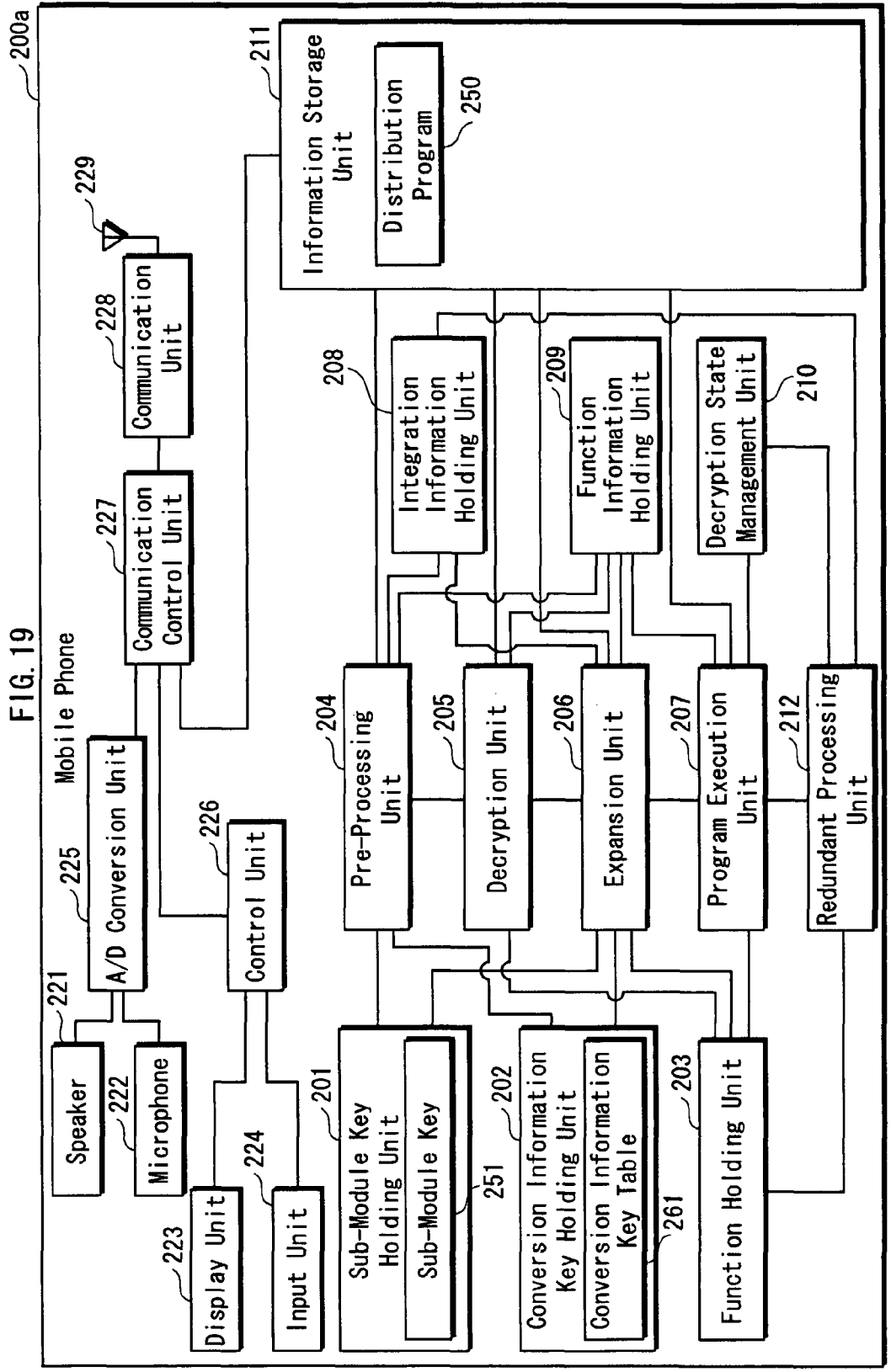
FIG. 19 is a block diagram illustrating the structure of a mobile phone 200*a*.

As illustrated in FIG. 19, the mobile phone 200a is generally composed of a sub-module key holding unit 201, a conversion information key holding unit 202, a function holding unit 203, a pre-processing unit 204, a decryption unit 205, an expansion unit 206, a program execution unit 207, an integration information holding unit 208, a function information holding unit 209, a decryption state management unit 210, an information storage unit 211, a redundant processing unit 212, a speaker 221 for producing audio output, a microphone 222 for converting voice input to an electronic signal, a display unit 223 for displaying various information, an input unit 224 including, for example, a ten-key pad for receiving user input, an A-D conversion unit 225 for digital-to-analog conversion as well as analog-to-digital conversion of audio signals, a control unit 226, a communication control unit 227, a communication unit 228, and an antenna 229.

Physically, the mobile phone 200a is a computer system composed generally of a microprocessor, digital signal processor, ROM, and RAM. The RAM stores a computer program. The microprocessor and the digital signal processor operate in accordance with the computer program, so that the functional units of the mobile phone 200a part of their functionality.

Preferably, the conversion information key holding unit 202, the function holding unit 203, the integration information holding unit 208, the function information holding unit 209, the decryption state management unit 210 reside on memory having a high security level, such as LSI and secured in area that are not readily accessible directly by users.

(1) Sub-Module Key Holding Unit 201 & Conversion Information Key Holding Unit 202.

The sub-module key holding unit 201 stores a sub-module key 251 in advance. The sub-module key 251 is a piece of 128-bit information used as a decryption key. The sub-module key 251 is identical to the sub-module key 120 held by the program conversion device 100.

The conversion information key holding unit 202 stores a conversion information key table 261 in advance. FIG. 20 illustrates one example of the conversion information key table 261. In this example, the conversion information key table 261 includes two pieces of key information 262 and 263. Each piece of key information is generally composed of a conversion information key ID and a conversion information key.

A conversion information key ID is information uniquely identifying a specific piece of key information that contains to the conversion information key ID.

A conversion information key is a piece of 128-bit information used as a decryption key.

The pieces of key information 262 and 263 are respectively identical to the pieces of key information 123 and 124 held by the program conversion device 100.

As described above, the conversion information key holding unit 202 stores some of the 100 pieces of key information held by the program conversion device 100.

(2) Information Storage Unit 211

The information storage unit 211 stores a distribution program 250.

The distribution program 250 is generated by the program conversion device 100 and received from the program conversion device 100 via the Internet 20 and the mobile telephone network 30.

(3) Function Information Holding Unit 209

Figure 21:
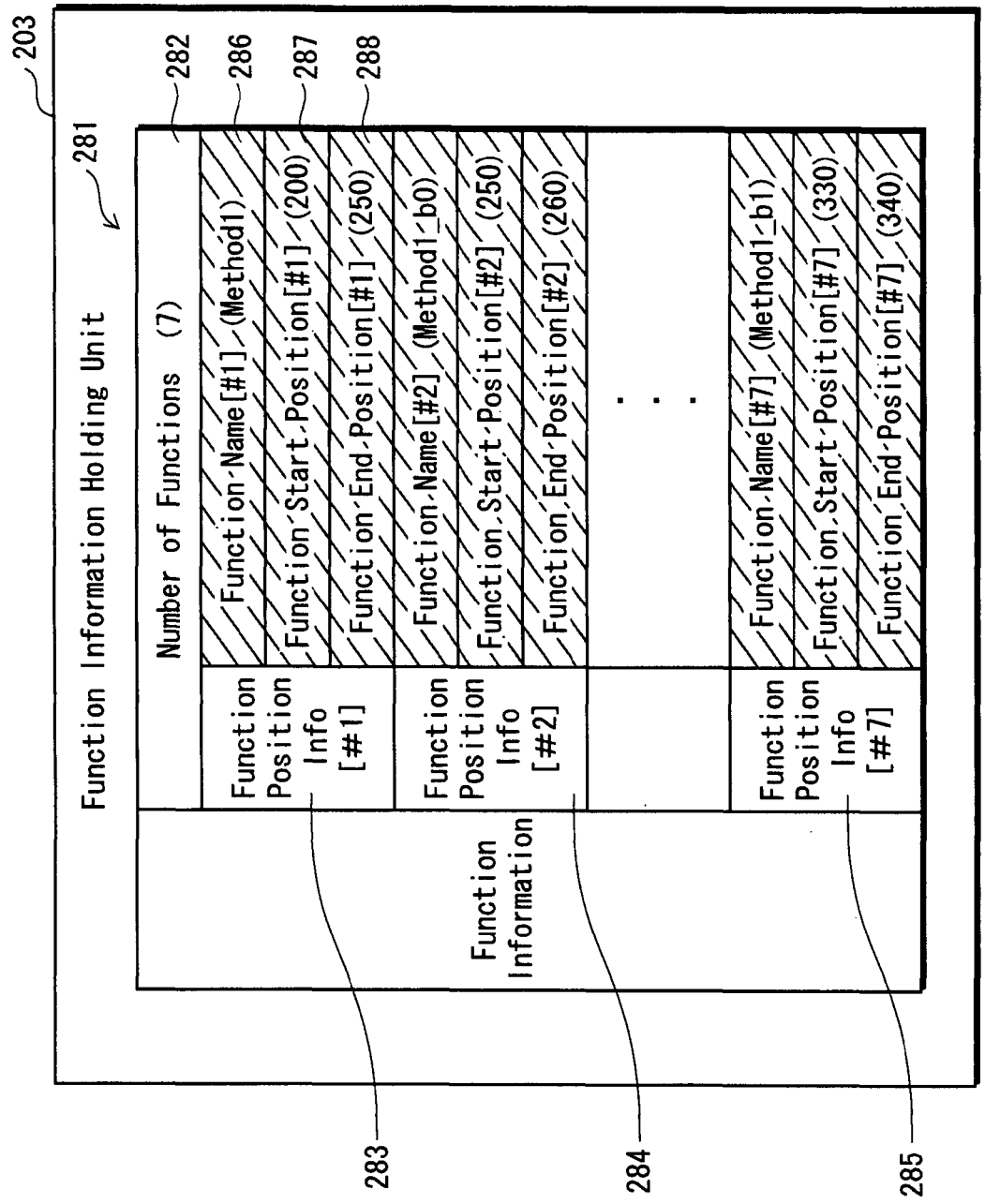
FIG. 21 illustrates an exemplary data structure of function information 281.

The function information holding unit 209 has a memory area for storing function information 281, as illustrated in FIG. 21.

The function information 281 is generally composed of a function number 282 and pieces of function-position information 283, 284, . . . 285. The piece of function-position information 283 includes a function name 286, a function start position 287, and a function end position 288. Similarly to the function-position information 283, the other pieces of the function-position information 284 . . . 285 includes a function name, a function start position, and a function end position.

The function information 281 is identical to the function information 513 illustrated in FIG. 8. Thus, no further description is given.

(4) Integration Information Holding Unit 208

Figure 22:
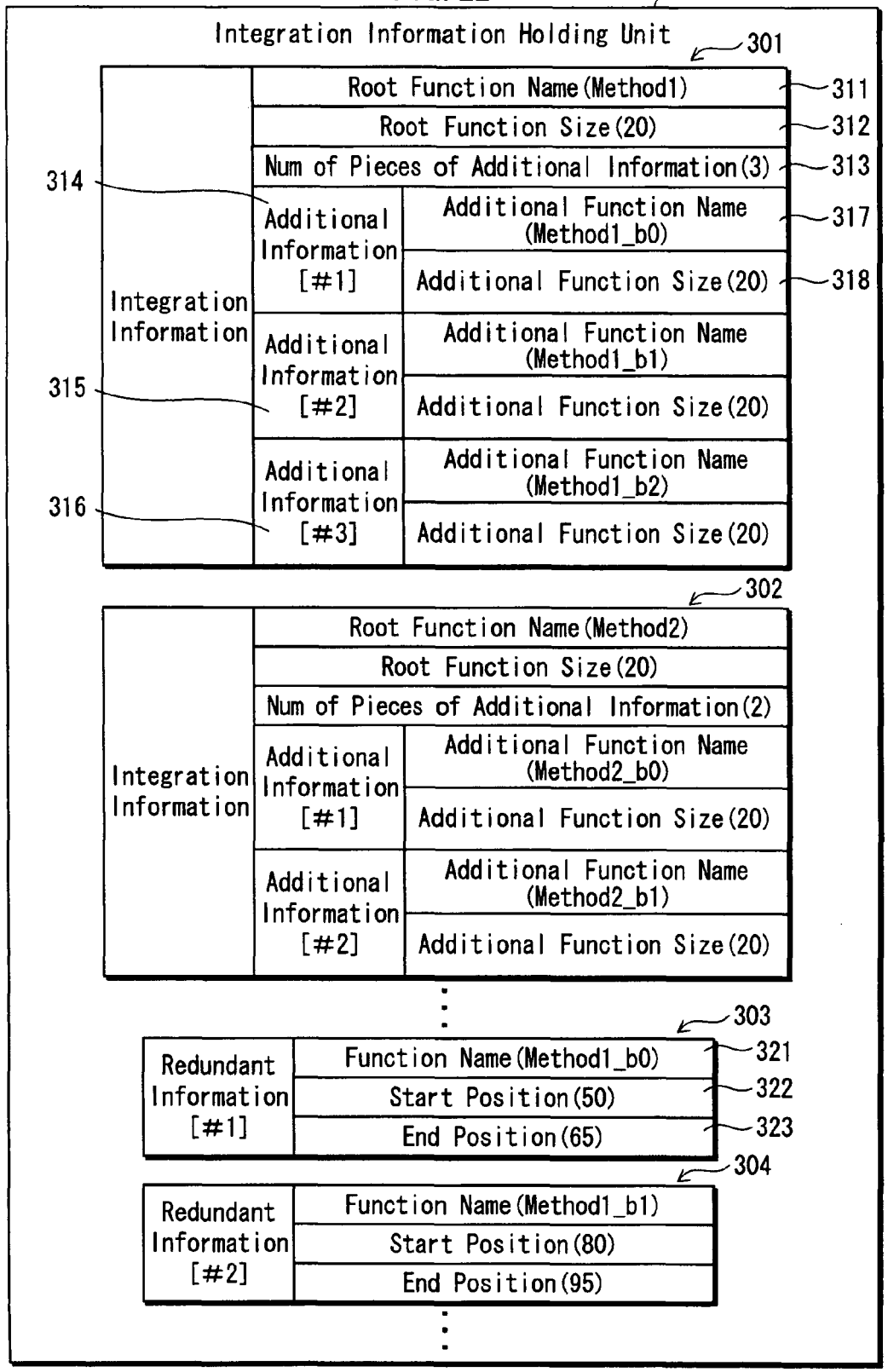
FIG. 22 illustrates the data structures of pieces of integration information 301, 302 . . . and pieces of redundant information 304, 305 . . .

The integration information holding unit 208 has a memory area for storing, as illustrated in FIG. 22, pieces of integration information 301, 302 . . . and pieces of redundant information 303, 304 . . . , for example.

The piece of integration information 301 is composed of a root function name 311, a root function size 312, an additional information number 313, and pieces of additional information 314, 315, and 316. The piece of additional information 314 includes an additional function name 317 and an additional function size 318. Similarly to the additional information 314, the other pieces of additional information 315 and 316 each include an additional function name and an additional function size.

Also, the integration information 302 is identical in data structure to the integration information 301.

The integration information 301 is identical to the integration information 564 illustrated in FIG. 11. Similarly, the integration information 302 is identical to the integration information contained in the conversion information block 553 illustrated in FIG. 11. Thus, no further description of such integration information is given here.

The redundant information 303 is generally composed of a function name 321, a start position 322, and an end position 323. Similarly to the redundant information 303, the redundant information 304 is generally composed of a function name and start and end positions.

The redundant information 303 is identical to the redundant information that is contained in the conversion information block 554 illustrated in FIG. 12. Similarly, the redundant information 304 is identical to the redundant information that is contained in the conversion information block 555 also illustrated in FIG. 12. Thus, no further description of such redundant information is given here.

(5) Function Holding Unit 203

The function holding unit 203 has a function area for storing one or more functions.

Figure 23:
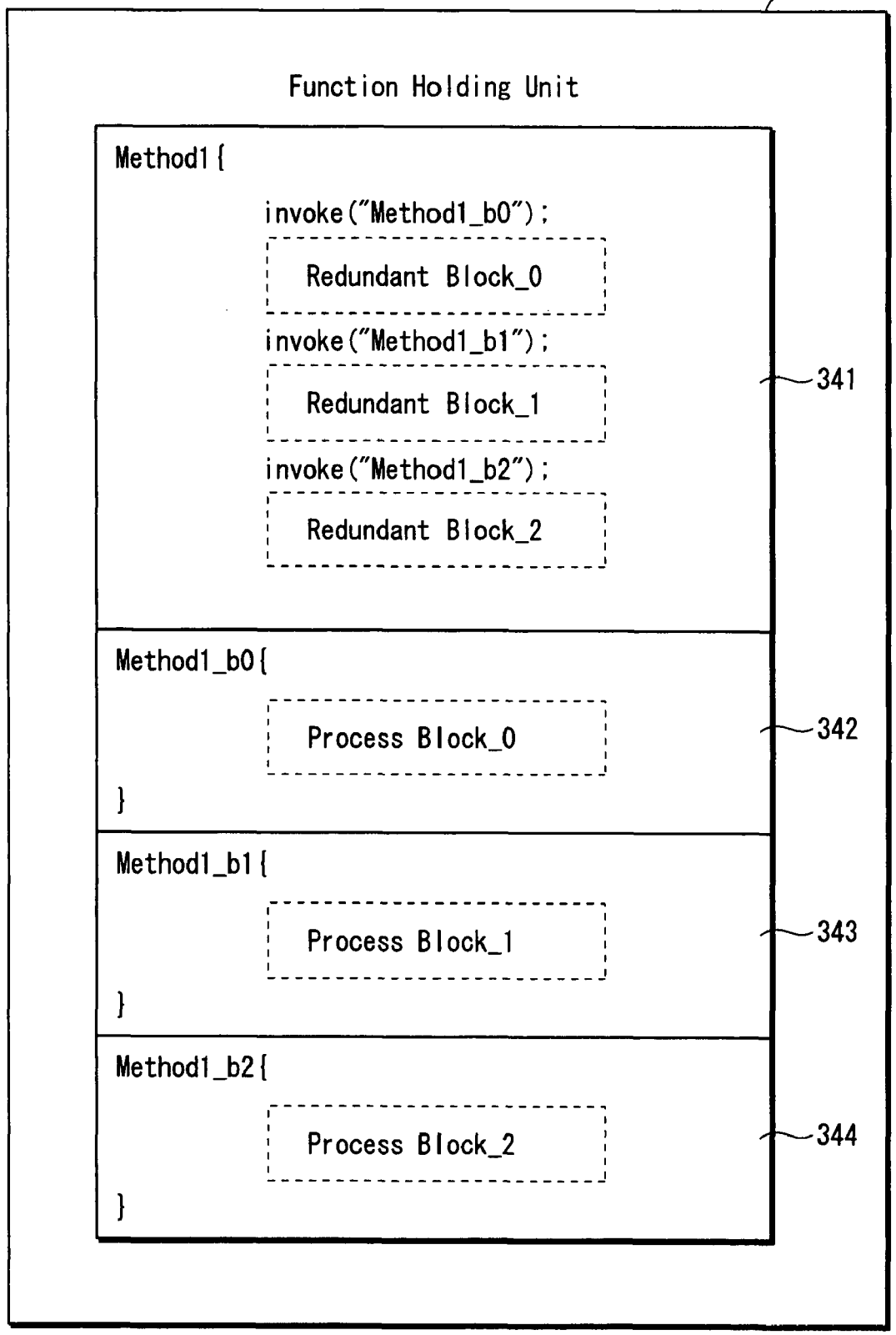
FIG. 23 illustrates the data structures of functions 341, 342, 343, and 344 held by a function holding unit 203.

As illustrated in FIG. 23, the function holding unit 203 stores, for example, functions 341, 342, 343, and 344. The functions 341, 342, 343, and 344 are respectively identical to functions 530a, 530b, 530c, and 530d illustrated in FIG. 9.

(6) Decryption State Management Unit 210

The decryption state management unit 210 stores a decryption state table 361.

The decryption state table 361 contains information regarding each function stored in the function holding unit 203.

Figure 24:
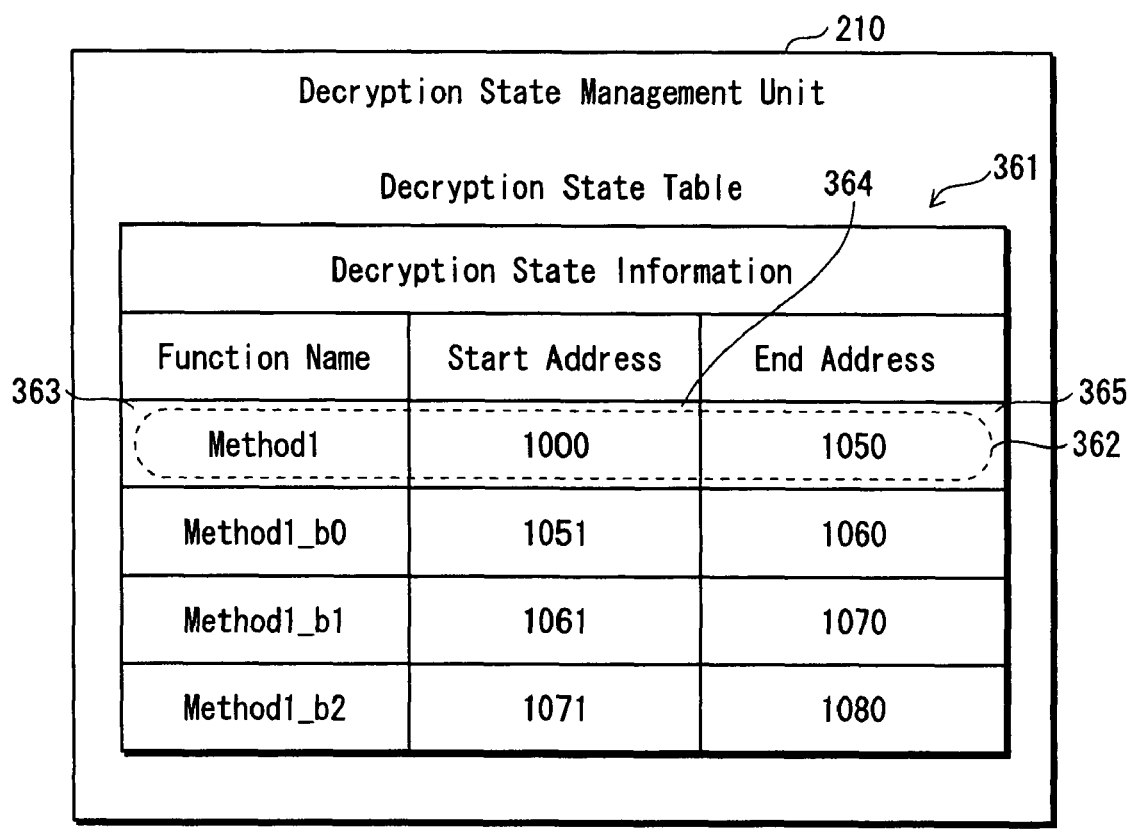
FIG. 24 illustrates an exemplarily data structure of a decryption state table 361.

As illustrated in FIG. 24, the decryption state table 361 stores one or more pieces of decryption state information that are in a one-to-one correspondence with the functions stored in the function holding unit 203.

Each piece of decryption state information includes a function name and start and end addresses.

A function name is an identifier of a function corresponding to the piece of decryption state information containing that function name.

A start address specifies the start position of a function that is stored in the function area of the function holding unit 203 and that corresponds to the piece of decryption state information containing that start address.

An end address specifies the end position of a function that is stored in the function area of the function holding unit 203 and that corresponds to the piece of decryption state information containing that end address.

As illustrated in FIG. 24, the decryption state table 361 includes, in one example, decryption state information 362 composed generally of a function name 363 "Method1", a start address 364 "1000", and an end address 365 "1050".

That is, the piece of decryption state information 362 indicates that the function identified by the function name 363 "Method1" is stored in the function area of the function holding unit 203 and the function resides at a location starting at the at the start address 364 "1000" and ends at the end address 365 "1050".

(7) Pre-Processing Unit 204

The pre-processing unit 204 receives a directive that instructs to process the distribution program 250, from the control unit 226. Upon receipt of the directive, the pre-processing unit 204 reads the function information from the header portion in the header area of the distribution program 250 stored in the information storage unit 211. The pre-processing unit 204 then writes, as the function information 281 the read function information into the function information holding unit 209, as illustrated in FIG. 21.

Next, the pre-processing unit 204 reads the sub-module key 251 from the sub-module key holding unit 201 and outputs the read sub-module key to the decryption unit 205. The pre-processing unit 204 then gives a directive instructing the decryption unit 205 to decrypt the encrypted function name as well as the encrypted function start and end positions contained in each and every piece of function information stored in the function information holding unit 209.

The pre-processing unit 204 repeats the following processing (i)-(iii) on each conversion information block contained in the conversion information of distribution program 250.

(i) The pre-processing unit 204 reads one of the conversion information blocks from the conversion information of the distribution program 250 and extracts a conversion information key ID from the read conversion information block.

(ii) The pre-processing unit 204 searches the conversion information key table 261 stored in the conversion information key holding unit 202, for a conversion information key ID that matches the read conversion information key ID.

(iii) If no matching conversion information key ID is found in the conversion information key table 261, the pre-processing unit 204 terminates the processing on the current conversion information block.

On the other hand, if a matching conversion information key ID is found in the conversion information key table 261, the pre-processing unit 204 reads the conversion information key identified by the extracted conversion information key ID from the conversion information key table 261, and outputs the read conversion information key to the decryption unit 205. The pre-processing unit 204 then gives a directive instructing the decryption unit 205 to decrypt the encrypted integration information contained in the read conversion information block.

[END]

Upon completion of the above processing on each conversion information block contained in the conversion information of the distribution program 250, the pre-processing unit 204 outputs END information to the control unit 226. The END information indicates that pre-processing has been completed.

(8) Decryption Unit 205

The decryption unit 205 receives a sub-module key from the pre-processing unit 204 and also receives a directive instructing the decryption unit 205 to decrypt the encrypted function name as well as the encrypted function start and end positions included in each piece of encrypted function-position information held by the function information holding unit 209. Upon receipt of the sub-module key and the directive, the decryption unit 205 decrypts the encrypted function name as well as the encrypted function start and end positions included in each piece of encrypted function-position information held by the function information holding unit 209, by using the received sub-module key as decryption key. As a result, the function names and function start and end positions are obtained in plaintext. The decryption unit 205 then overwrites the encrypted function name and encrypted function start and end positions with the corresponding information items in plaintext.

The decryption unit 205 receives a conversion information key from the pre-processing unit 204. The decryption unit 205 also receives a specification of one of the pieces of integration information contained in the conversion information block, along with a directive that instructs the decryption unit 205 to decrypt the specified piece of integration information. Upon receipt of the conversion information key, the specification, and the directive, the decryption unit 205 decrypts the specified piece of encrypted integration information, by using the received conversion information key. As a result, integration information is generated in plaintext. The decryption unit 205 then overwrites the encrypted integration information with the integration information in plaintext.

The decryption unit 205 receives, from the expansion unit 206, a decryption directive, a sub-module key, the start and end positions of a function in the distribution program 250, and a storage location in the function holding unit 203. Upon receipt, the decryption unit 205 decrypts a portion of the distribution program located from the function start to end positions, by using the read sub-module key to obtain a function in plaintext. The decryption unit 205 then writes the thus function to the storage location of the function holding unit 203 specified by the expansion unit 206. Upon completion of the writing, the decryption unit 205 outputs, to the expansion unit 206, the start and end positions of the location where the function is now stored.

(9) Expansion Unit 206

The expansion unit 206 receives from the program execution unit 207 a directive instructing the expansion unit to expand a specified function, along with the name specifying the function.

Upon receipt of the expansion directive, the expansion unit 206 acquires the end address of the last function in sequence stored in the function holding unit 203, from the decryption state table 361 held by the decryption state management unit 210. That is, the expansion unit 206 extracts a piece of decryption state information containing the largest end address from among all the pieces of decryption state information stored in the decryption state table 361 and outputs the end address contained in the thus extracted piece of decryption state information.

Next, the expansion unit 206 reads the sub-module key 251 from the sub-module key holding unit 201.

The expansion unit 206 also reads a piece of function-position information that contains the specified function name from the function information 281 held by the function information holding unit 209 and extracts the function start and end positions from the read piece of function-position information.

Next, the expansion unit 206 outputs a decryption directive, the sub-module key, and the function start and end positions in the distribution program 250, and a storage location in the function holding unit 203 (i.e., the position specified by the extracted end address) to the decryption unit 205. In response, the expansion unit 206 receives the start and end addresses of the storage location of the decrypted function from the decryption unit 205 and writes a piece of decryption state information that is composed of the specified function name and the received start and end addresses into the decryption state table 361.

Next, the expansion unit 206 searches the integration information holding unit 208 for a piece of integration information that includes a root function name matching the specified function name. If such integration information is not found, the expansion unit 206 outputs END information indicating an end of the expansion processing to the program execution unit 207 and terminates the expansion processing.

On the other hand, if such integration information is found, the expansion unit 206 extracts an additional function name from each piece of additional information included in the integration information and sequentially performs expansion processing by specifying the additional function names one by one.

(10) Program Execution Unit 207

The program execution unit 207 includes a program counter PC holding a value indicating the storage location of an instruction code.

The program execution unit 207 fetches an instruction code stored at the location indicated by the value of the program counter PC and decodes the instruction code to judge whether the instruction code is (i) an external function call, (ii) an invoke instruction or a function call, (iii) an END instruction, or (iv) another instruction.

(i) If the instruction code is an external function call, the program execution unit 207 sets the program counter PC to the value specifying the start address of that external function.

(ii) If the instruction code is an invoke instruction or a function call, the program execution unit 207 searches the decryption state table 361 held by the decryption state management unit 210 for the name of the function specified by the invoke instruction or the function call. If the function name is found in the decryption state table 361, the program execution unit 207 attempts to acquire the start address indicating the storage location of the specified function. If the start address is successfully acquired, the program execution unit 207 sets the program counter PC to the value of the thus acquired start address.

On the other hand, if such a start address is not acquired, i.e., the decryption state table 361 does not include a piece of decryption state information that contains the name of the specified function, the program execution unit 207 erases all the functions from the function holding unit 203 and gives a directive instructing the expansion unit 206 to expand the specified function. In response, the program execution unit 207 receives, from the expansion unit 206, END information indicating that the expansion processing has been completed. Upon receipt of the END information, the program execution unit 207 instructs the redundant processing unit 212 to process redundant blocks. In response, the program execution unit receives, from the redundant processing unit 212, END information indicating that the redundant blocks have been processed. Upon receipt of the END information, the program execution unit 207 sets the program counter PC to the value indicating the start address of the specified function.

(iii) If the instruction code is an END instruction, the program execution unit 207 erases all the stored contents of the function holding unit 203, the integration information holding unit 208, the function information holding unit 209, and the decryption state management unit 210. The program execution unit 207 then sets the value indicating the address of an instruction code of another program to the program counter PC.

(iv) If the instruction code is an instruction code other than (i)-(iii), the program execution unit 207 executes processing according to the decoded instruction code and increments the program counter PC by "1".

Next, the program execution unit 207 goes back to the step of fetching an instruction code to repeat the above processing steps.

(11) Redundant Processing Unit 212

The redundant processing unit 212 receives a directive instructing to process redundant blocks from the program execution unit 207. Upon receipt of the directive, the redundant processing unit 212 attempts to read redundant information from the integration information holding unit 208.

When reading of all the pieces of redundant information from the integration information holding unit 208 completes or the integration information holding unit 208 stores no redundant information, the redundant processing unit 212 outputs END information indicating the end of redundant block processing to the program execution unit 207 and terminate the redundant block processing.

Upon reading a piece of redundant information from the integration information holding unit 208, the redundant processing unit 212 extracts the function name from the read piece of redundant information, and searches the decryption state table 361 held by the decryption state management unit 210 for a piece of decryption state information that contains the function name matching the extracted function name. If the decryption state table 361 does not store any piece of decryption state information that contains the matching function name, the redundant processing unit 212 goes back to the step of reading another piece of redundant information from the integration information holding unit 208 to repeat the processing steps performed thereafter.

On the other hand, if a piece of decryption state information containing the extracted function name is found in the decryption state table 361, the redundant processing unit 212 extracts the start and end addresses of the function identified by the function name from the piece of decryption state information. The redundant processing unit 212 also extracts the start and end positions from the read piece of redundant information and specifies the function stored at the acquired start and end addresses in the function holding unit 203. The redundant processing unit 212 then replaces all the instruction codes contained in the specified function with NOP instructions.

Note that an NOP instruction commands no processing step to be performed. Thus, execution of an NOP instruction takes substantially no time.

Next, the redundant processing unit 212 goes back to the step of reading a next piece of redundant information from the integration information holding unit 208 to repeat the above processing steps.

As has been described, redundant block instructions are replaced with NOP instructions. This arrangement substantially eliminates the processing time that would otherwise been taken for execution of redundant processing. As a result, it is ensured that the program is executed at a higher speed.

(12) Antenna 229, Communication Unit 228, Communication Control Unit 227

The communication unit 228 amplifies a radio frequency signal received by the antenna 229, converts the output signal to an IF signal, amplifies the IF signal, and demodulates the amplified IF signal to a base band signal. In addition, the communication unit 228 modulates a base band signal to a high-frequency signal, converts the resulting signal to a radio frequency signal, amplifies the radio frequency signal, and outputs the amplified signal to the antenna 229. The communication control unit 227 generates a base band signal and outputs the base band signal to the communication unit 228. In addition, the communication control unit 227 receives a base band signal from the communication unit 228.

In the manner described above, the communication control unit 227, the communication unit 228, and the antenna 229 operate to carry out information transmission to and from the program conversion device 100 that is connected thereto via the mobile telephone network 30 and the Internet 20.

More specifically, the communication control unit 227, the communication unit 228, and the antenna 229 operate to receive a distribution program from the program conversion device 100 connected via the mobile telephone network 30 and the Internet 20 and to write the received distribution program as the distribution program 250 into the information storage unit 211.

(13) Control Unit 226

The control unit 226 receives a user operation requesting execution of the distribution program 250 from a user of the mobile phone 200a via the input unit 224. Upon receipt of the user operation, the control unit 226 outputs a directive instructing the pre-processing unit 204 to process the distribution program 250.

The control unit 226 receives, from the pre-processing unit 204, END information indicating completion of the pre-processing. Upon receipt of the END information, the control unit 226 sets the program counter PC of the program execution unit 207 to the value indicating the address of a function call to "Method1", which is a main function of the distribution program 250. As a result, the program execution unit 207 initiates execution of the distribution program 250.

Note that the function call to "Method1", which is a main function of the distribution program 250 is included in a call program for calling the distribution program. The call program is stored in the information storage unit 211 in advance.

1.5 Execution of Distribution Program by Mobile Phone 200a

The following describes operation of the mobile phone 200a performed to execute the distribution program.

(1) Execution of Distribution Program by Mobile Phone 200a

Figure 25:
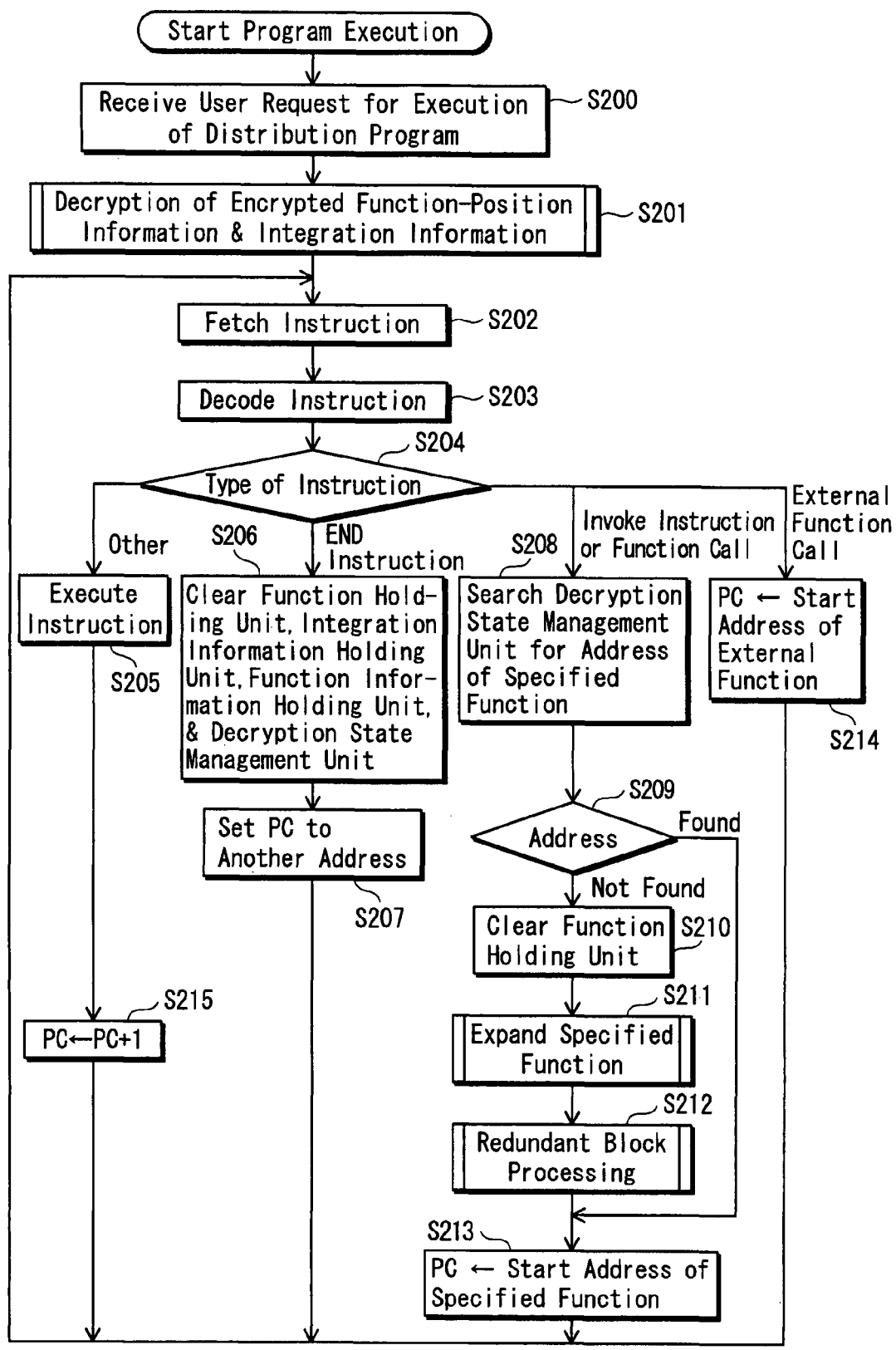
FIG. 25 is a flowchart of operation of the mobile phone 200*a* performed for executing the distribution program.

The following describes operation of the mobile phone 200a to execute the distribution program, with reference to FIG. 25.

The control unit 226 receives a user operation requesting execution of the distribution program 250 from a user of the mobile phone 200a via the input unit 224 (Step S200). The pre-processing unit 204 decrypts the encrypted function-position information and integration information included in the distribution program 250 (Step S201).

The program execution unit 207 fetches an instruction code from the storage location specified by the value held by the program counter PC (Step S202) and decodes the fetched instruction code (Step S203) to judge whether the fetched instruction code is an external function call, an invoke instruction or function call, an END instruction, or an instruction other than any of the foregoing (Step S204).

If the fetched instruction code is an external function call (Step S204), the program execution unit 207 sets the program counter PC to the value indicating the start address of the external function (Step S214) and goes back to Step S202 to repeat the processing steps.

If the fetched instruction code is an invoke instruction or a function call (Step S204), the program execution unit 207 searches the decryption state table 361 held by the decryption state management unit 210 for a function name that matches the function name specified by the invoke instruction or function call and retrieves, if a matching function name is found, the start address of the specified function (Step S208). If the start address is successfully retrieved (Step S209), the program execution unit 207 sets the program counter PC to the thus retrieved address value (Step S213) and goes back to Step S202 to repeat the processing steps.

On the other hand, when failing to retrieved the start address (Step S209), the program execution unit 207 erases all the functions from the function holding unit 203 (Step S210). In addition, the expansion unit 206 expands the specified function (Step S211). The redundant processing unit 212 processes redundant blocks (Step S212) and sets the program counter PC to the value indicating the start address of the specified function (Step S213). Then, Step S202 is performed again to repeat the processing steps.

If the fetched instruction code is an END instruction (Step S204), the program execution unit 207 erases all the stored contents of the function holding unit 203, the integration information holding unit 208, the function information holding unit 209, and the decryption state management unit 210 (Step S206) and sets the program counter PC to the value indicating the storage location of an instruction code of another program (Step S207). Then, Step S202 is performed again to repeat the processing steps.

If the fetched instruction code is none of the above (Step S204), the program execution unit 207 executes the decoded instruction code (Step S205) and increments the program counter PC by "1" (Step S215). Then, Step S202 is performed again to repeat the processing steps.

(2) Operation of Pre-Processing Unit 204 & Decryption Unit 205

Figure 26:
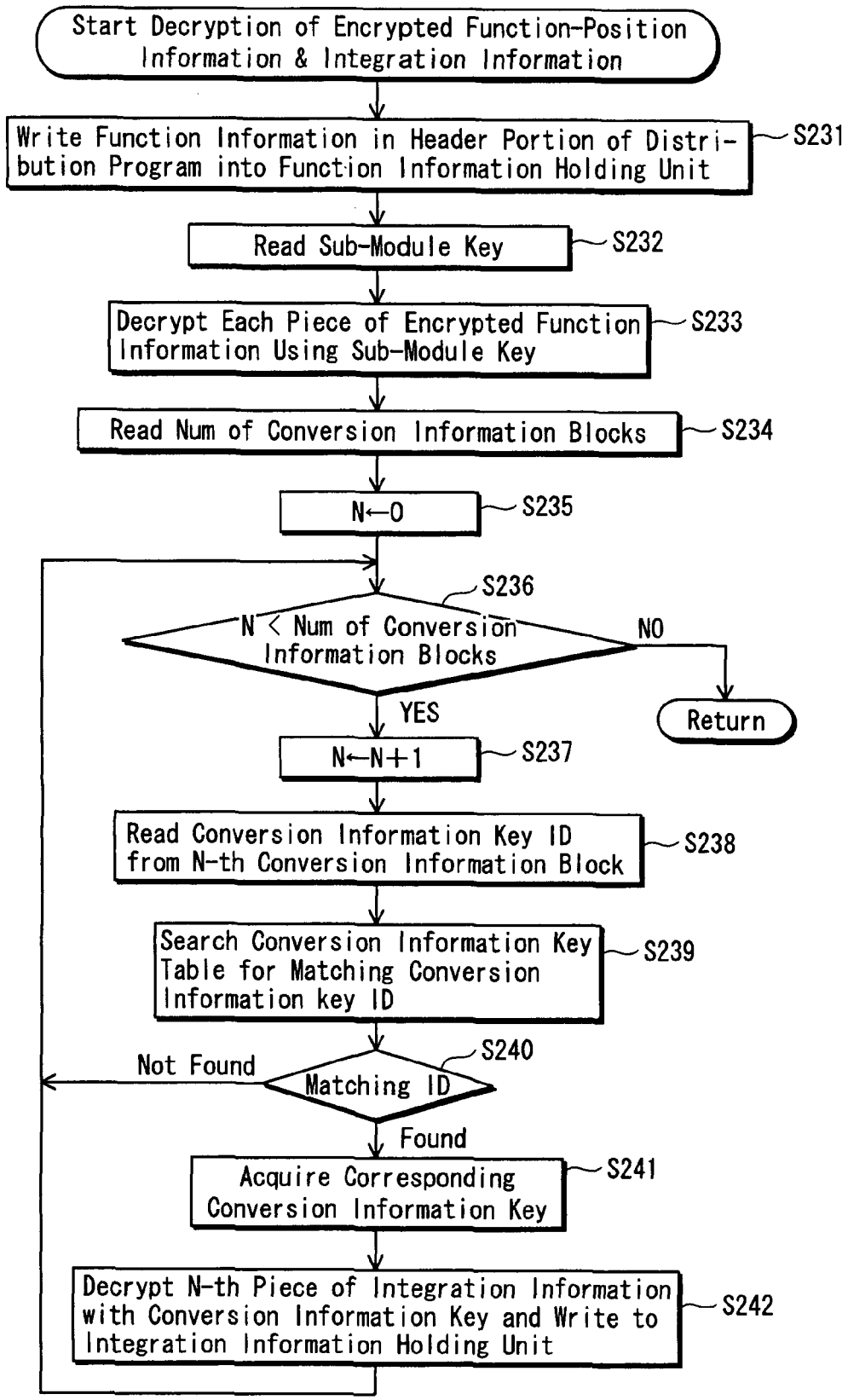
FIG. 26 is a flowchart of operation of a pre-processing unit 204 and a decryption unit 205 performed for decrypting encrypted function-position information and encrypted integration information.

The following describes operation of the pre-processing unit 204 and the decryption unit 205 to decrypt the encrypted function-position information and the encrypted integration information, with reference to the flowchart illustrated in FIG. 26.

Upon receipt of a directive instructing execution of the distribution program 250 from the control unit 226, the pre-processing unit 204 access the information storage unit 211 to read function information from the header portion stored in the header area of the distribution program 250 and writes the read function information as the function information 281 into the function information holding unit 209 (Step S231).

Next, the pre-processing unit 204 reads the sub-module key 251 from the sub-module key holding unit 201 (Step S232). With use of the read sub-module key, the decryption unit 205 decrypts the encrypted function names, encrypted function start and end positions contained in the respective pieces of function-position information stored in the function information holding unit 209. As a result of the decryption, function names and function start and end positions are generated in plaintext for all the pieces of function-position information. The pre-processing unit 204 then overwrites the encrypted function names and function start and end positions contained in the originally stored in the function information holding unit 209 with the corresponding function names and function start and end positions in plaintext (Step S233).

Next, the pre-processing unit 204 reads the conversion information block number from the conversion information of the distribution program 250 (Step S234) and assigns "0" to the variable N (Step S235).

Next, the pre-processing unit 204 compares the variable N with the conversion information block number. If the variable N is not smaller than the conversion information block number (Step S236: NO), the pre-processing unit 204 terminates the processing.

On the other hand, if the variable N is smaller than the conversion information block number (Step S236: YES), the pre-processing unit 204 increments the variable N by "1" (Step S237) and reads the N-th conversion information block in the conversion information of the distribution program 250, extracts a conversion information key ID from the read conversion information block (Step S238), searches the conversion information key table 261 held by the conversion information key holding unit 202 for a conversion information key ID that matches the extracted conversion information key ID (Step S239).

If a matching conversion information key ID is not found in the conversion information key table 261 (Step S240), Step S236 is performed again to repeat the above processing steps. On the other hand, if a matching conversion information key ID is found in the conversion information key table 261 (Step S240), the pre-processing unit 204 reads the conversion information key identified by the matching conversion information key ID from the conversion information key table 261 (Step S241) and outputs the read N-th conversion information key to the decryption unit 205. In response, the decryption unit 205 decrypts the specified piece of encrypted integration information by using the received conversion information key to generate integration information in plaintext and overwrites the encrypted integration information with the integration information in plaintext (Step S242). Next, Step S236 is performed again to repeat the above processing steps.

(3) Operation of Redundant Processing Unit 212

Figure 27:
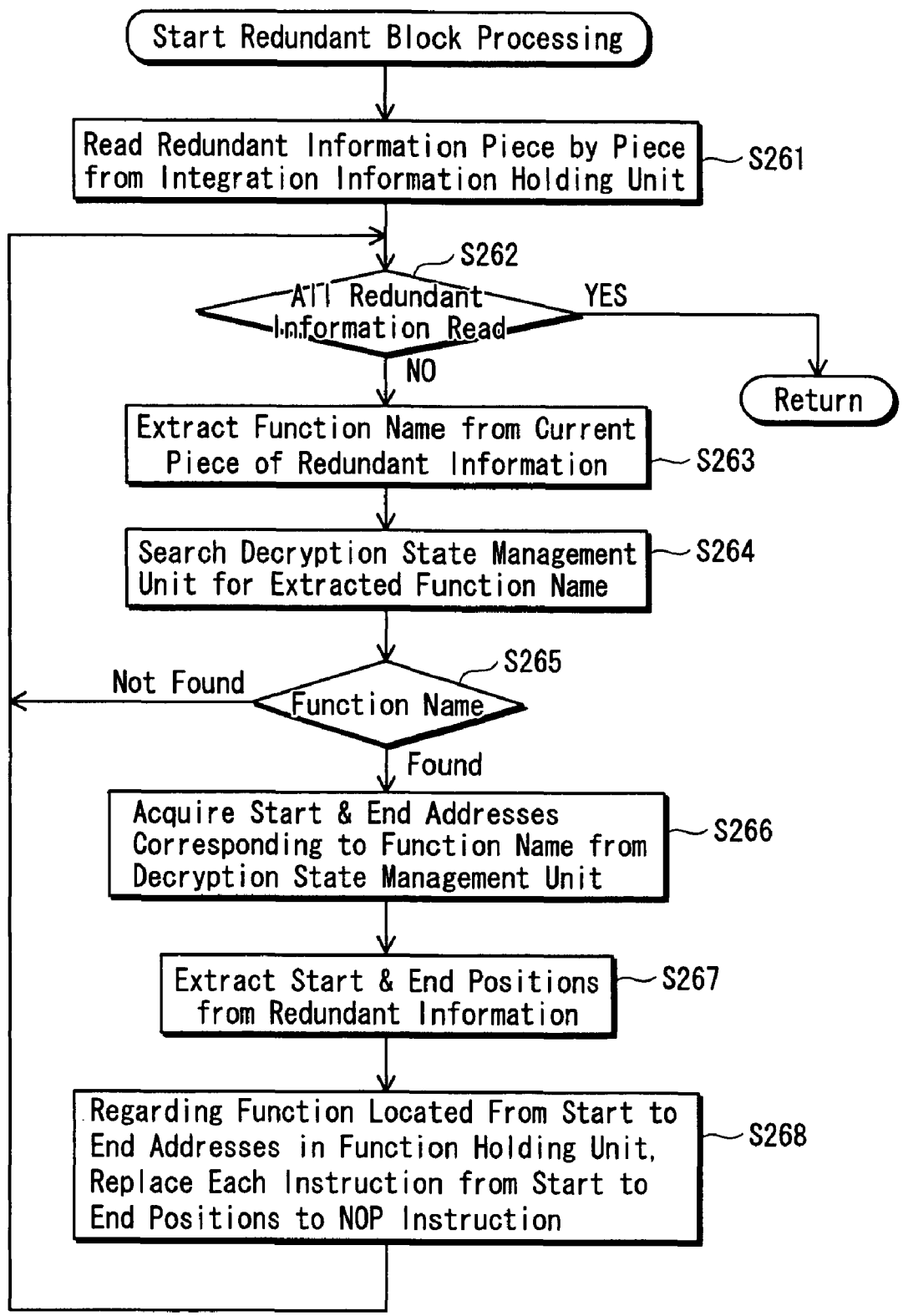
FIG. 27 is a flowchart of operation of a redundant processing unit 212.

The following describes operation of the redundant processing unit 212, with reference to a flowchart illustrated in FIG. 27.

When a directive instructing to process redundant blocks is received from the program execution unit 207, the redundant processing unit 212 attempts to read redundant information from the integration information holding unit 208 (Step S261).

Upon completion of reading of all the pieces of redundant information from the integration information holding unit 208 or no redundant information is stored in the integration information holding unit 208 (Step S262: YES), the redundant processing unit 212 outputs, to the program execution unit 207, END information indicating that the processing of the redundant blocks has been completed and terminates the processing.

Upon reading a piece of redundant information from the integration information holding unit 208 (Step S262: NO), the redundant processing unit 212 extracts a function name from the read redundant information (Step S263) and searches the decryption state table 361 stored in the decryption state management unit 210 for a piece of decryption state information containing the extracted function name (Step S264). If no decryption state information containing the extracted function name is found in the decryption state table 361 (Step S265), Step S262 is performed again to repeat the processing.

On the other hand, if a piece of decryption state information containing the extracted function name is found in the decryption state table 361 (Step S265), the redundant processing unit 212 retrieves the start and end addresses from the piece of decryption state information containing of the extracted function name (Step S266). In addition, the redundant processing unit 212 extracts the start and end positions from the read piece of redundant information (Step S267). The redundant processing unit 212 then processes the function stored at a storage location in the function holding unit 203 from the start to end positions that are retrieved from the decryption state information table 321, by replacing each instruction from the start and end positions that are extracted from the read piece of redundant information to an NOP (Step S268). Then, Step S262 is performed again to repeat the above processing steps.

In the above description, instruction codes contained in a redundant block are replaced with NOP instructions. Alternatively, however, it is applicable to delete all instruction codes contained in a redundant block.

With the processing steps described above, redundant blocks are invalidated. That is, when a program execution device having a high security level but a low-speed CPU executes a distribution program, the distribution program is converted to invalidate redundant blocks. Since execution of redundant blocks are avoided, the processing time is reduced and the processing is carried out in a manner suitable to each device.

(4) Operation of Expansion Unit 206

Figure 28:
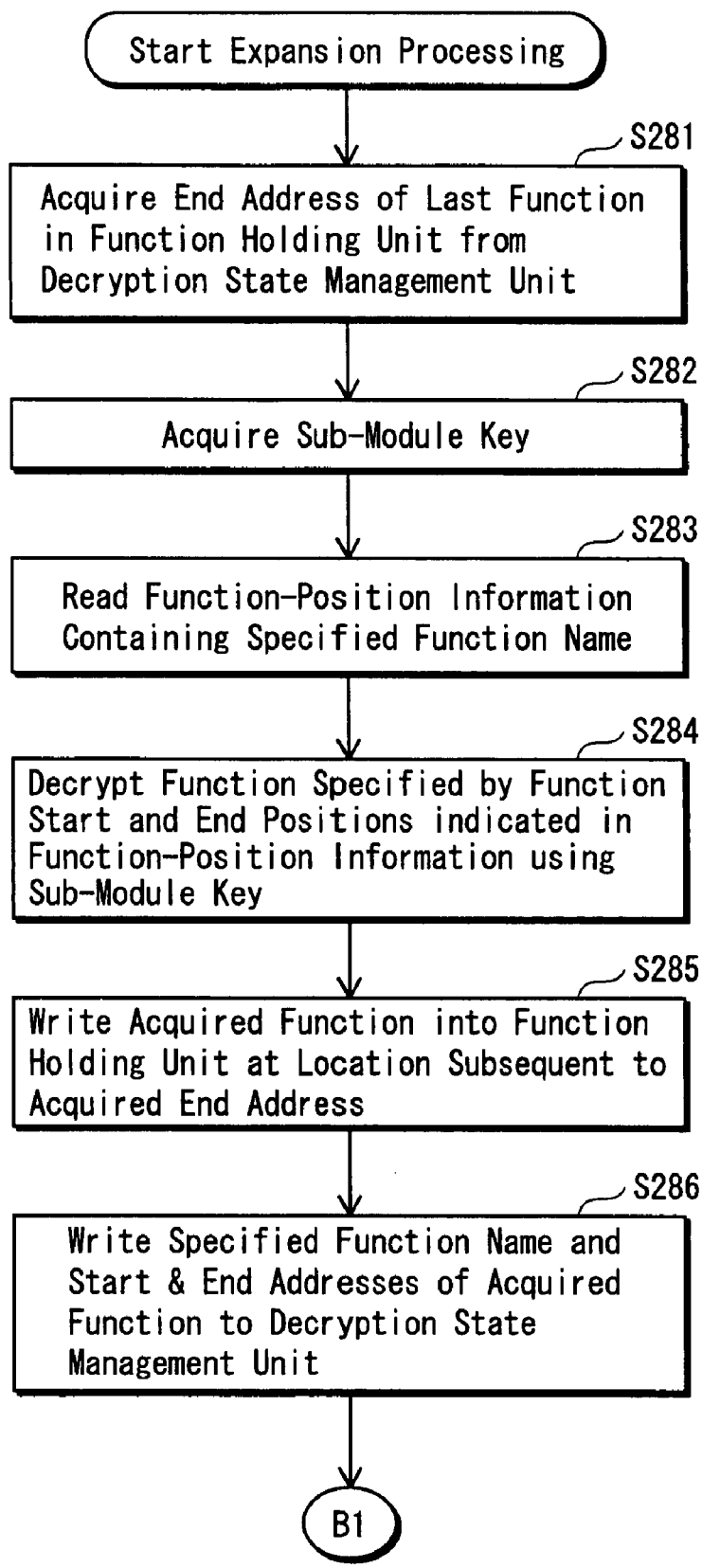
FIG. 28 is a flowchart of operation of an expansion unit 206 (continued to FIG. 29)
Figure 29:
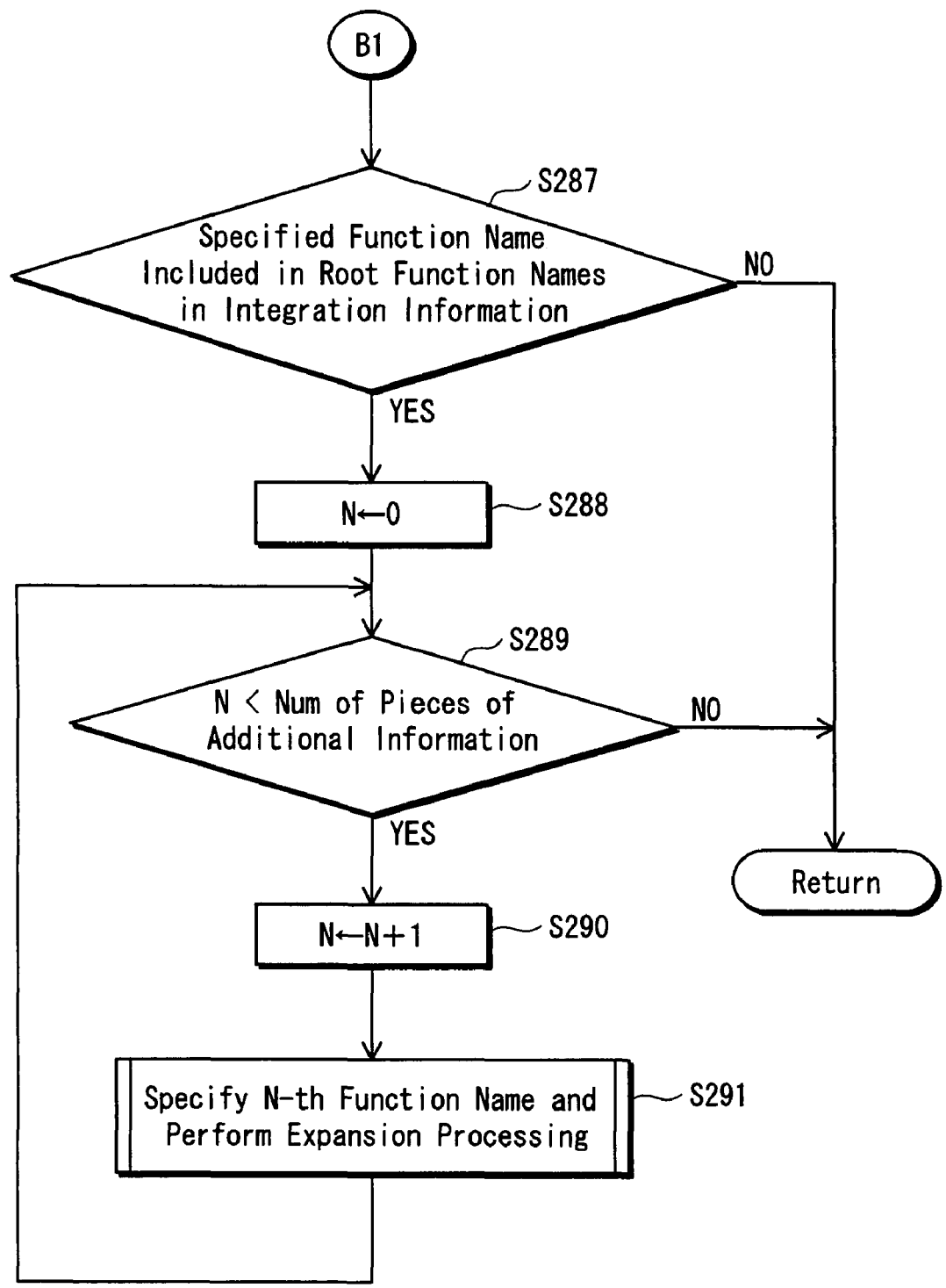
FIG. 29 is the flowchart of operation of the expansion unit 206 (continued from FIG. 28)

The following describes operation of the expansion unit 206, with reference to a flowchart illustrated in FIGS. 28 and 29.

When a directive instructing to expand a function is received from the program execution unit 207 along with the name specifying the function to be expanded, the expansion unit 206 acquires the end address of the last function held by the function holding unit 203, with reference to the decryption state table 361 held by the decryption state management unit 210 (Step S281). In addition, the expansion unit 206 reads the sub-module key 251 from the sub-module key holding unit 201 (Step S282), reads a piece of function-position information containing the specified function name from the function information 281 held by the function information holding unit 209, and extracts the function start and end positions from the read piece of function-position information (Step S283).

Next, the decryption unit 205 decrypts a portion of the distribution program 250 located from the function start to end positions by using the read sub-module key (Step S284) to obtain a function in plaintext, and writes thus obtained function into a storage location of the function holding unit 203 that is specified by the expansion unit 206 (Step S285).

Next, the expansion unit 206 writes, into the decryption state table 361, a new piece of decryption state information composed of the specified function name and the received start and end addresses (Step S286).

Next, the expansion unit 206 searches the integration information holding unit 208 for a piece of integration information containing a root function name matching the specified function name. If such integration information is not found (Step S287: NO), the expansion unit 206 terminates the processing.

On the other hand, if such integration information is found (Step S287: YES), the expansion unit 206 assigns "0" to the variable N (Step S288) and compares the variable N with the additional information number contained in the integration information. If the variable N is not smaller than the additional information number (Step S289: NO), the expansion unit 206 terminates the processing.

On the other hand, if the variable N is smaller than the additional information number (Step S289: YES), the expansion unit 206 increments the variable N by "1" (Step S290) and extracts an additional function name from the N-th piece of additional information contained in the integration information found in Step S287. The expansion unit 206 then reclusively expands the function specified by the thus extracted additional function name (Step S291). Then, Step S289 is performed again to repeat the above processing steps.

As described above, the function obtained in Step S284 and one or more functions obtained through Step S288-S291 are stored into the function holding unit 203. Those functions are calling and called functions and all temporarily reside in the function holding unit 203 at the same time. Thus, when one of the functions is called, it is highly likely that another of the functions is subsequently called. In view of this, by decrypting those functions at once, decryption of functions are required less frequently, which is advantageous in processing performance.

1.6 DVD Player 200b & Personal Computer 200c (1) DVD player 200b

Figure 30:
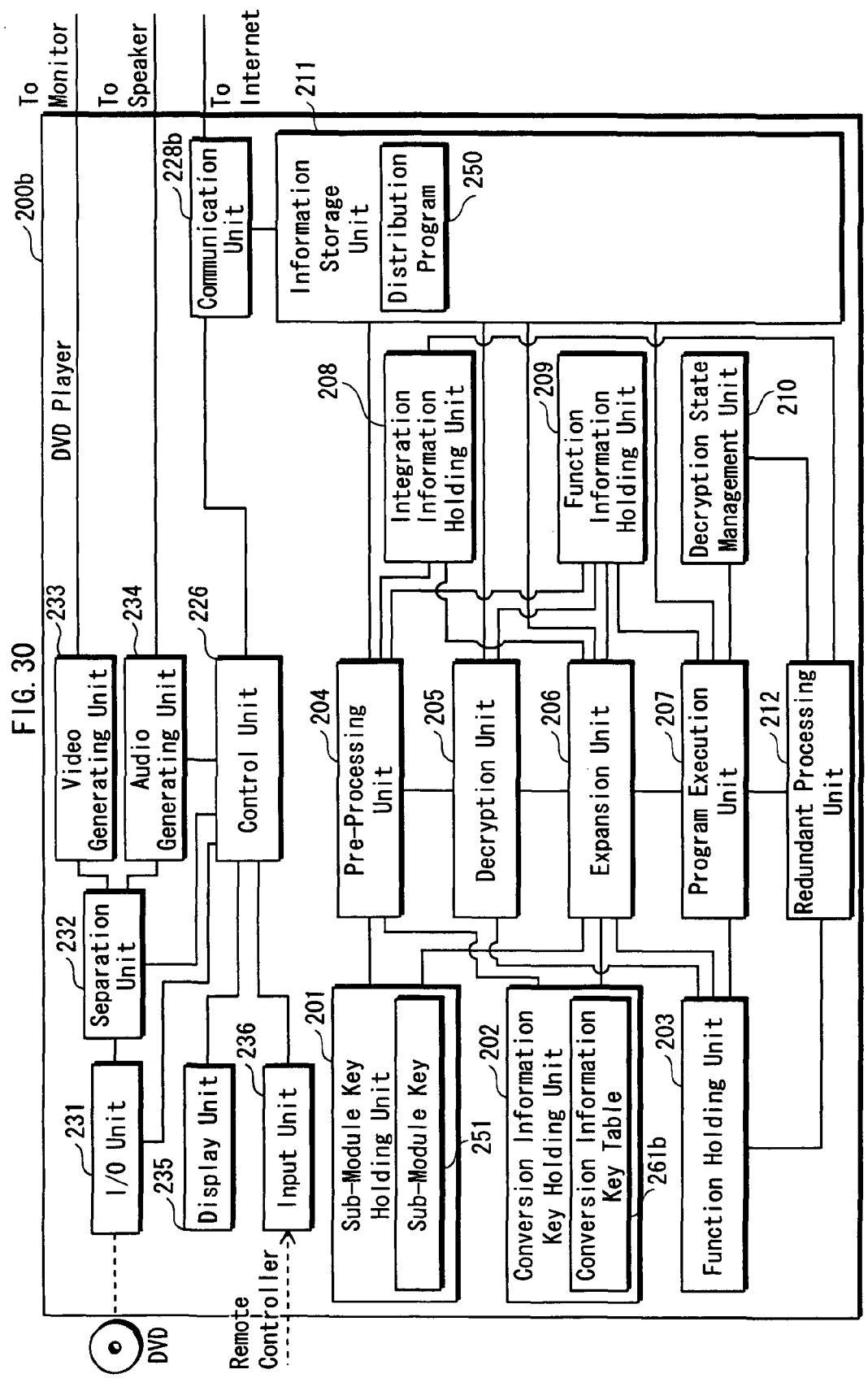
FIG. 30 is a block diagram illustrating the data structure of a DVD player 200*b*.

As illustrated in FIG. 30, the DVD player 200b is generally composed of the sub-module key holding unit 201, the conversion information key holding unit 202, the function holding unit 203, the pre-processing unit 204, the decryption unit 205, the expansion unit 206, the program execution unit 207, the integration information holding unit 208, the function information holding unit 209, the decryption state management unit 210, the information storage unit 211, the redundant processing unit 212, an I/O unit 231 for reading audio visual information from a DVD, a separation unit 232 for separating the read audio and visual information into video information and audio information, a video generating unit 233 for generating a video signal from the video information and outputting the resulting video signal to a monitor, an audio generating unit 234 for generating an audio signal from the audio information and outputting the resulting audio signal to a speaker, an input unit 236 for receiving user input made on a remote controller, the control unit 226, a communication unit 228b for receiving a distribution program from the program conversion device 100 via the Internet 20 and writes the received distribution program into the information storage unit 211.

Similarly to the mobile phone 200a, the DVD player 200b physically is a computer system composed generally of a microprocessor, ROM, and RAM. The RAM stores a computer program and the microprocessor operates according to the computer program, so that the functional units of the DVD player 200b perform part of their functions.

The functional units of the DVD player 200b, namely, the sub-module key holding unit 201, the conversion information key holding unit 202, the function holding unit 203, the pre-processing unit 204, the decryption unit 205, the expansion unit 206, the program execution unit 207, the integration information holding unit 208, the function information holding unit 209, the decryption state management unit 210, the information storage unit 211, the redundant processing unit 212 are basically identical to the functional units of the mobile phone 200a bearing the same reference numerals, except the following differences.

The conversion information key holding unit 202 stores a conversion information key table 261b instead of the conversion information key table 261 held by the mobile phone 200a. The conversion information key table 261b contains three pieces of key information that are identical to the pieces of key information 122, 123, and 124 illustrated in FIG. 3.

As above, the conversion information key table 261b held by the DVD player 200b differs from the conversion information key table 261 held by the mobile phone 200a in the contents of the respective pieces of key information as well as in the number of pieces of key information contained.

(2) Personal Computer 200c

Figure 31:
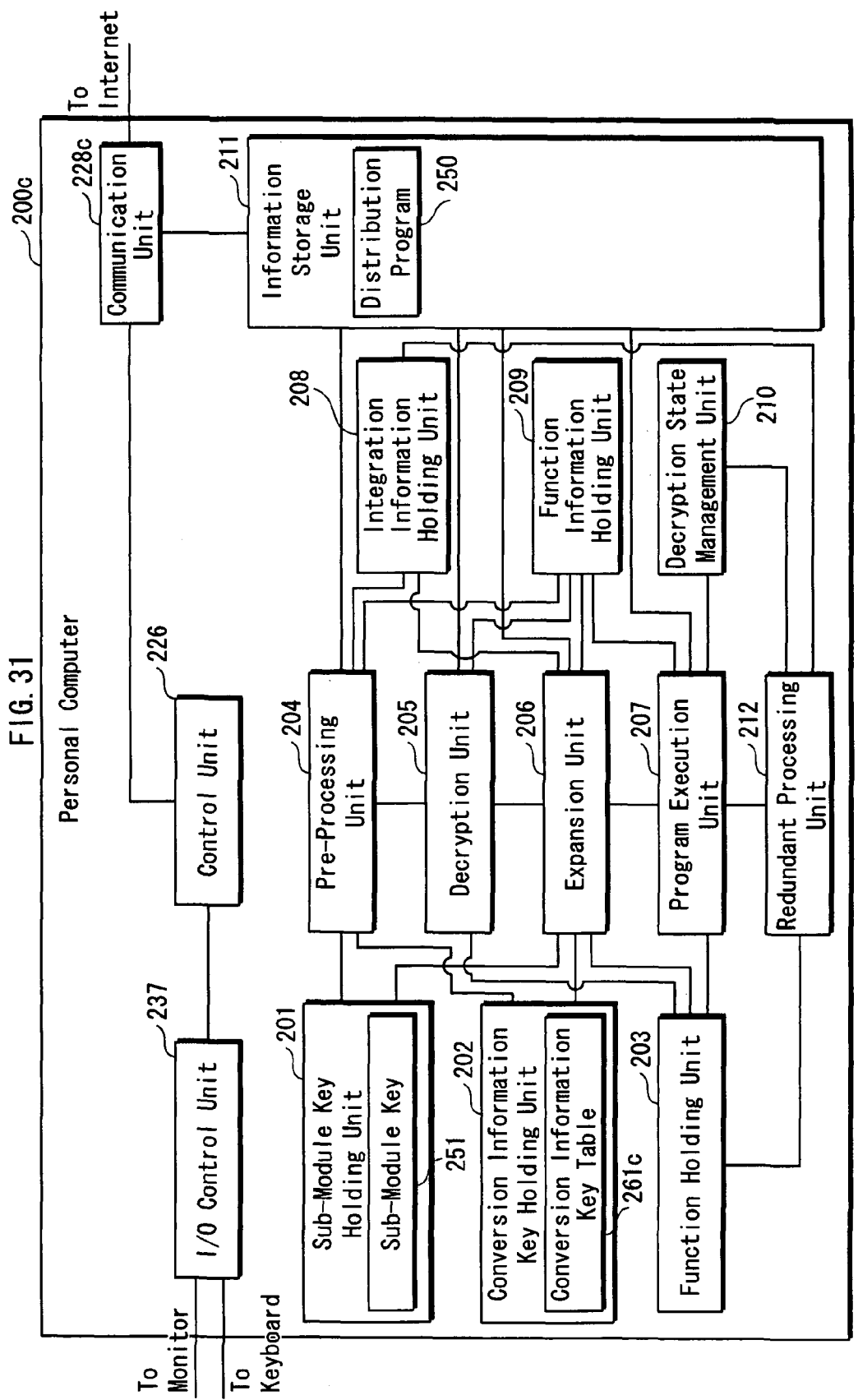
FIG. 31 is a block diagram illustrating the data structure of a personal computer 200*c*.

As illustrated in FIG. 31, the personal computer 200c is composed of the sub-module key holding unit 201, the conversion information key holding unit 202, the function holding unit 203, the pre-processing unit 204, the decryption unit 205, the expansion unit 206, the program execution unit 207, the integration information holding unit 208, the function information holding unit 209, the decryption state management unit 210, the information storage unit 211, the redundant processing unit 212, an I/O control unit 237 for controlling information transmitted to or from a monitor and a keyboard, the control unit 226, a communication unit 228c for receiving a distribution program from the program conversion device 100 via the Internet 20 and writes the received distribution program into the information storage unit 211.

Similarly to the mobile phone 200a, the personal computer 200c physically is a computer system composed generally of a microprocessor, ROM, and RAM. The RAM stores a computer program and the microprocessor operates in accordance with the computer program, so that the functional units of the personal computer 200c perform part of their functions.

The functional units of the personal computer 200c, namely, the sub-module key holding unit 201, the conversion information key holding unit 202, the function holding unit 203, the pre-processing unit 204, the decryption unit 205, the expansion unit 206, the program execution unit 207, the integration information holding unit 208, the function information holding unit 209, the decryption state management unit 210, the information storage unit 211, and the redundant processing unit 212 are basically identical to the functional units of the mobile phone 200a bearing the same reference numerals, except for the following differences.

The conversion information key holding unit 202 stores a conversion information key table 261c, instead of the conversion information key table 261 held by the mobile phone 200a. The conversion information key table 261c includes one piece of key information that is identical to the piece of key information 122 illustrated in FIG. 3.

As above, the conversion information key table 261c held by the personal computer 200c differs from the conversion information key table 261 held by the mobile phone 200a in the contents of the piece of key information as well as in the number of pieces of key information contained.

(3) Recapitulation

As described above, the mobile phone 200a, the DVD player 200b, and the personal computer 200c store, in advance, one or more of the plurality of pieces of key information held by the program conversion device 100. However, for example, the personal computer 200c may have none of the pieces of key information held by the program conversion device 100.

The personal computer 200c is an example of a device having a high-performance CPU and relatively vulnerable to tampering of information stored therein, such as a program. Such a device has a fewer number of pieces of key information as compared with the mobile phone 200a and the DVD player 200b.

On the other hand, the mobile phone 200a and the DVD player 200b are examples of devices each of which has a lower-performance CPU and not susceptible to tampering of information stored therein, such as a program. Each of such devices has a larger number of pieces of key information as compared with the personal computer 200c.

As described above, each device holds different number of pieces of key information. Each piece of integration information contained in the distribution program is encrypted by using a conversion information key contained in a piece of key information. Thus, the number of pieces of integration information that can be decrypted differs from device to device. Thus, the number of functions that are collectively decrypted also differs from device to device.

For example, the mobile phone 200a and the DVD player 200b decrypt a larger number of functions collectively at a time, whereas the personal computer 200c decrypts a smaller number of functions collectively at a time.

As above, the mobile phone 200a and the DVD player 200b having a lower-performance CPU collectively decrypt a larger number of functions at a time, so that decryption and erasing of such functions is required less frequently. This reduces the load imposed on the CPU at the time of decrypting and erasing such functions.

On the other hand the personal computer 200c having a high-performance CPU collectively decrypts a smaller number of functions at a time and thus it is required to perform decryption and erasing of such functions more often. Yet, in view of the high CPU performance, it does not cause any substantial influence.

As described above, the above embodiment achieves a significant advantage of allowing one program to be executed by different devices through different processes in accordance with the performance levels of the respective CPUs and with the security levels against tampering of information stored.

2. Modification (1)

The following describes a program distribution system 10b, which is a modification of the program distribution system 10. Similarly to the program distribution system 10, the program distribution system 10b is generally composed of a program conversion device 100b, a mobile phone 200ab, a DVD player 200bb, and a personal computer 200cb.

The program conversion device 100b is identical in structure to the program conversion device 100 of the program distribution system 10 consistent with the embodiment. In addition, the mobile phone 200ab, the DVD player 200bb, and the personal computer 200cb are identical in structure to the corresponding devices of the program distribution system 10, namely the mobile phone 200a, the DVD player 200b, and the personal computer 200c.

A description of the mobile phone 200ab is given below, focusing on differences with the mobile phone 200a. Note that no description is given of the DVD player 200bb and the personal computer 200cb, since they are identical to the mobile phone 200ab.

(1) Operation of Receiving Distribution Program

Figure 32:
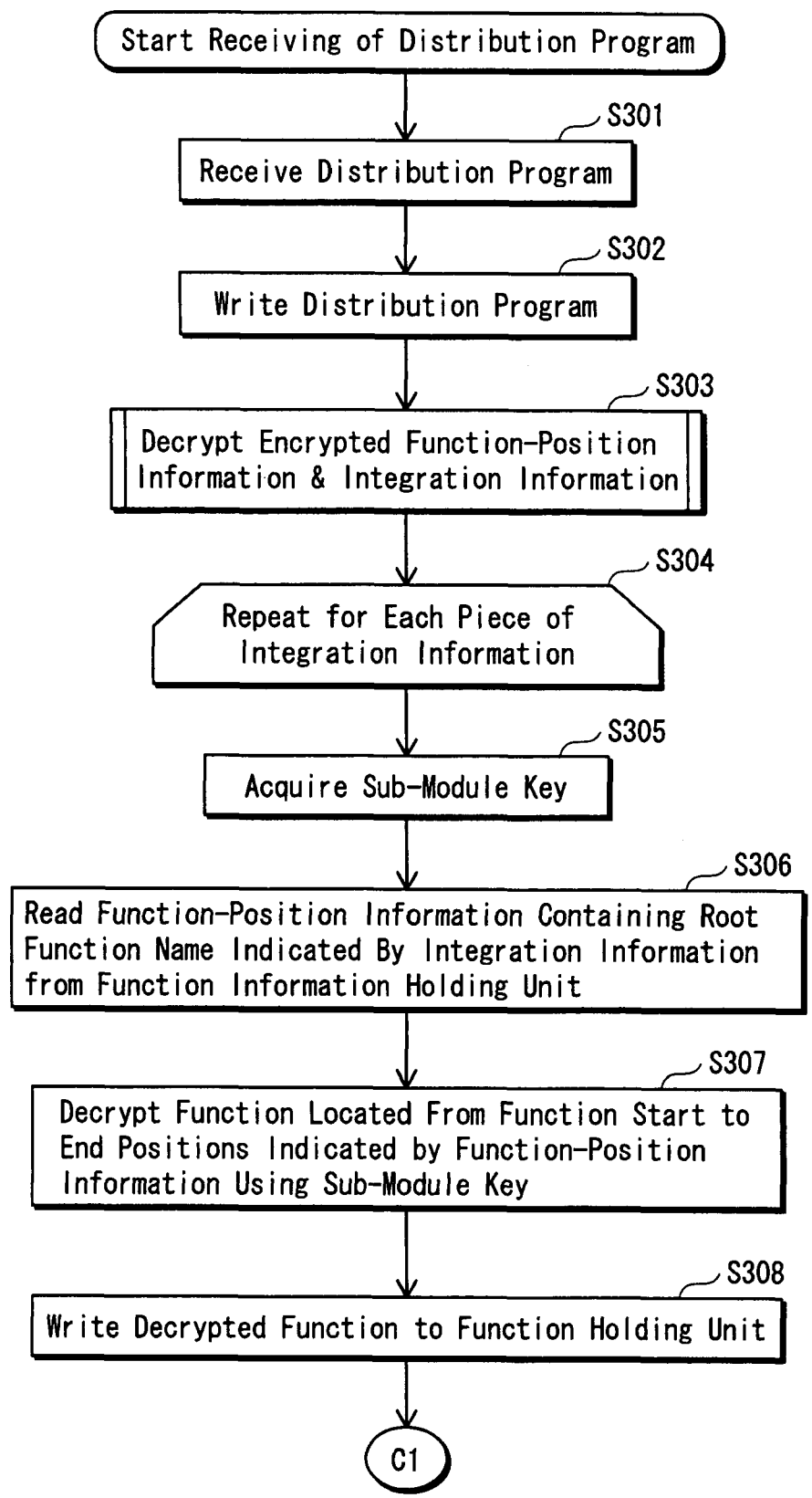
FIG. 32 is a flowchart of operation of a mobile phone 200*ab* performed for receiving the distribution program (continued to FIG. 33)
Figure 33:
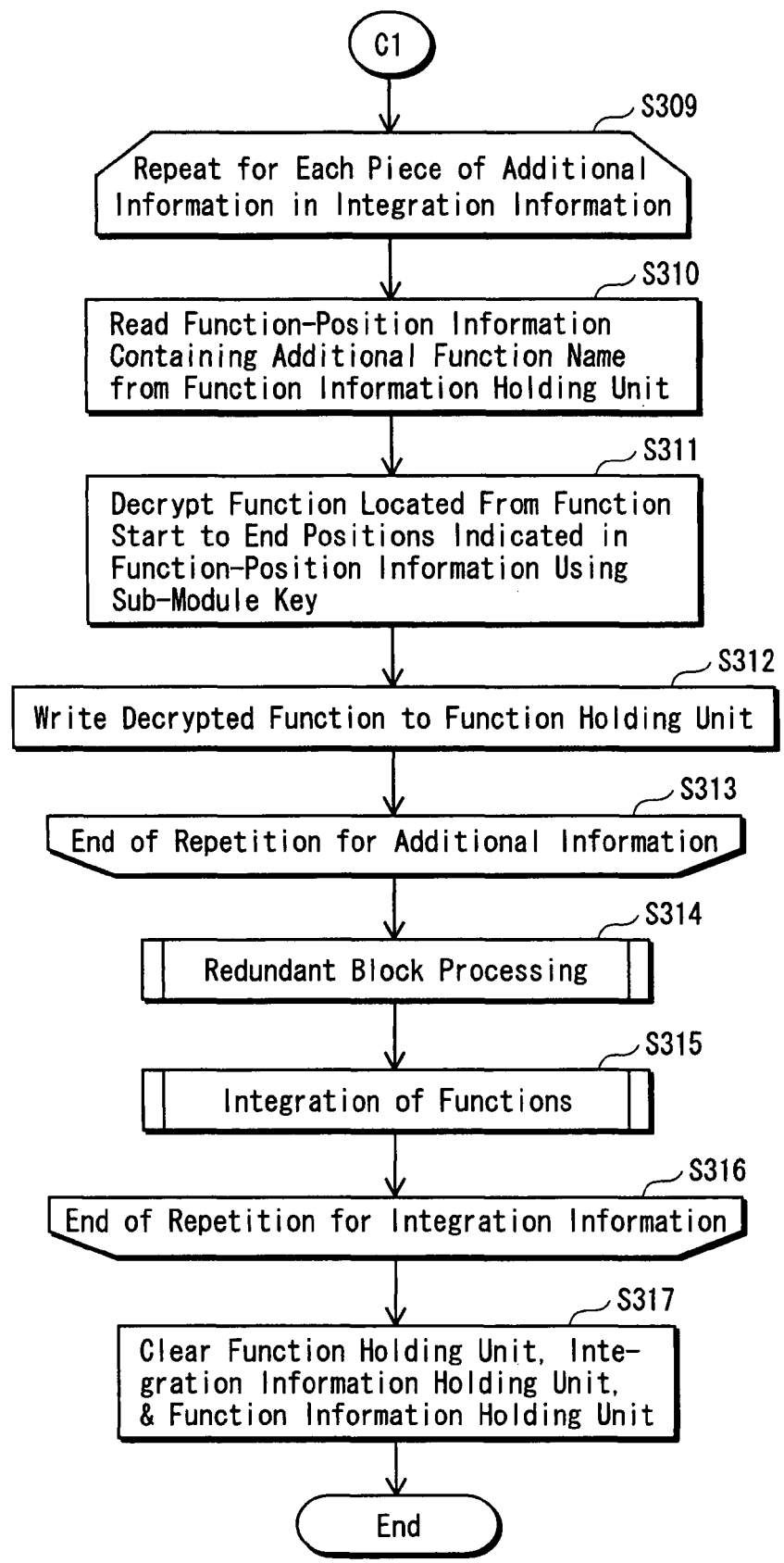
FIG. 33 is the flowchart of operation of the mobile phone 200*ab* performed for receiving the distribution program (contented from FIG. 32)

The following describes operation of the mobile phone 200ab performed for receiving a distribution program, with reference to a flowchart illustrated in FIGS. 32 and 33.

The communication control unit 227, the communication unit 228, and the antenna 229 cooperate to receive a distribution program from the program conversion device 100b that is connected via the mobile telephone network 30 and the Internet 20 (Step S301), and writes the received distribution program as the distribution program 250 into the information storage unit 211 (Step S302).

Next, in the same manner to Step S201, the pre-processing unit 204 decrypts encrypted function-position information and encrypted integration information of the distribution program 250 (Step S303).

Next, through Steps S304-S316, the pre-processing unit 204 repeats Step S305-S315 described below on each piece of integration information held by the integration information holding unit 208.

The pre-processing unit 204 reads the sub-module key 251 from the sub-module key holding unit 201 (Step S305). Next, the pre-processing unit 204 extracts a root function name from the piece of integration information currently processed, and retrieves a piece of function-position information containing the extracted root function name from the function information holding unit 209 (Step S306). The pre-processing unit 204 extracts the function start and end positions from the retrieved piece of function-position information, and outputs the read sub-module key to the decryption unit 205. The pre-processing unit 204 then givens a directive instructing the decryption unit 205 to decrypt the encrypted function contained in the distribution program 250 held by the information storage unit 211 at the storage location from the extracted function start to end positions. In response, the decryption unit 205 decrypts the specified function (Step S307) to generate a function in plaintext and writes the thus generated function to the function holding unit 203 (Step S308).

Next, through Steps S309-S313, the pre-processing unit 204 repeats Steps S310-S312 on each piece of additional information included in the current piece of integration information.

The pre-processing unit 204 extracts an additional function name from the currently processed piece of additional information and retrieves a piece of function-position information containing the extracted additional function name from the function information holding unit 209 (Step S310). The pre-processing unit 204 then extracts the function start and end positions from the retrieved piece of function-position information and outputs the read sub-module key to the decryption unit 205. In addition, the pre-processing unit 204 gives a directive instructing the decryption unit 205 to decrypt an encrypted function stored at a storage location from the extracted function start to end positions in the distribution program 250 held by the information storage unit 211. In response, the decryption unit 205 decrypts the specified function (Step S311) to generate a function in plaintext and writes the thus generated function to the function holding unit 203 (Step S312).

Next, the redundant processing unit 212 performs the redundant block processing illustrated in FIG. 27 (Step S314) and the pre-processing unit 204 integrates functions (Step S315).

Next, the pre-processing unit 204 erases all the stored contents of the function holding unit 203, the integration information holding unit 208, the function information holding unit 209 (Step S317).

In this way, a plurality of functions indicated by a piece of integration information are integrated into a single function.

Figure 34:
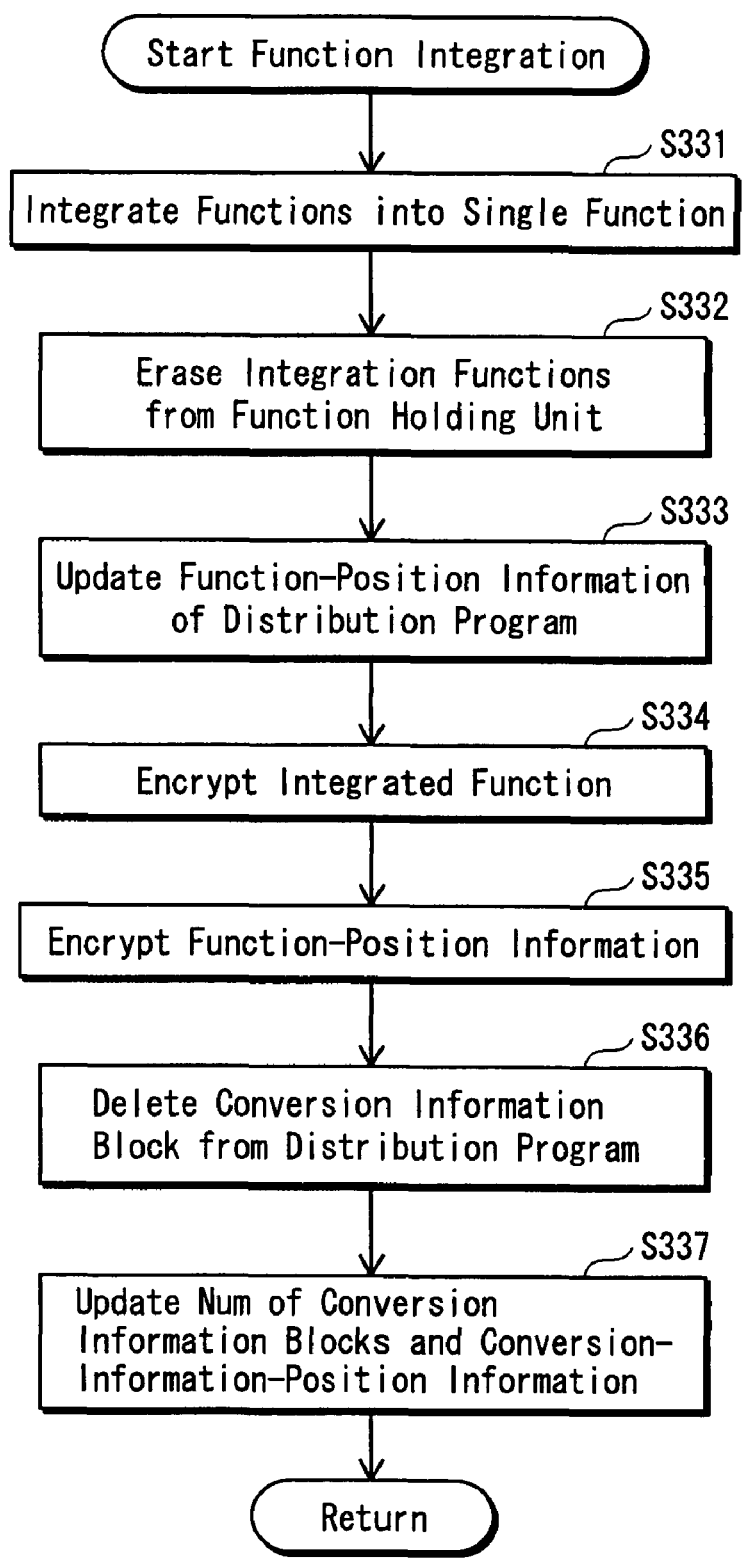
FIG. 34 is the flowchart of detailed operation of the pre-processing unit 204 performed for integrating functions.

The following describes the details of the function integration in Step S315 by the pre-processing unit 204, with reference to a flowchart illustrated in FIG. 34.

The pre-processing unit 204 integrates a plurality of functions held by the function holding unit 203 into a new single function, writes the thus generated new function into the program area of the distribution program 250 (Step S331), and erases all the functions from the function holding unit 203 (Step S332).

Next, the pre-processing unit 204 updates the header portion of the distribution program 250 so that each piece of function-position information reflect the current status of the functions stored in the program area (Step S333).

Next, the pre-processing unit 204 gives a directive instructing the decryption unit 205 to encrypt functions stored in the program area of the distribution program 250. In response, the decryption unit 205 encrypts the functions contained in the program area, by using the sub-module key (Step S334).

Next, the pre-processing unit 204 gives a directive instructing the decryption unit 205 to encrypt each piece of function-position information contained in the header portion of distribution program 250. In response, the decryption unit 205 encrypts each piece of function-position information contained in the header portion, by using the sub-module key (Step S335).

The pre-processing unit 204 then erases the currently processed conversion information block from the distribution program 250 (Step S336) and updates the conversion information block number and the conversion-information-position information of the distribution program 250 (Step S337).

(2) Execution of Distribution Program by Mobile Phone 200ab

Figure 35:
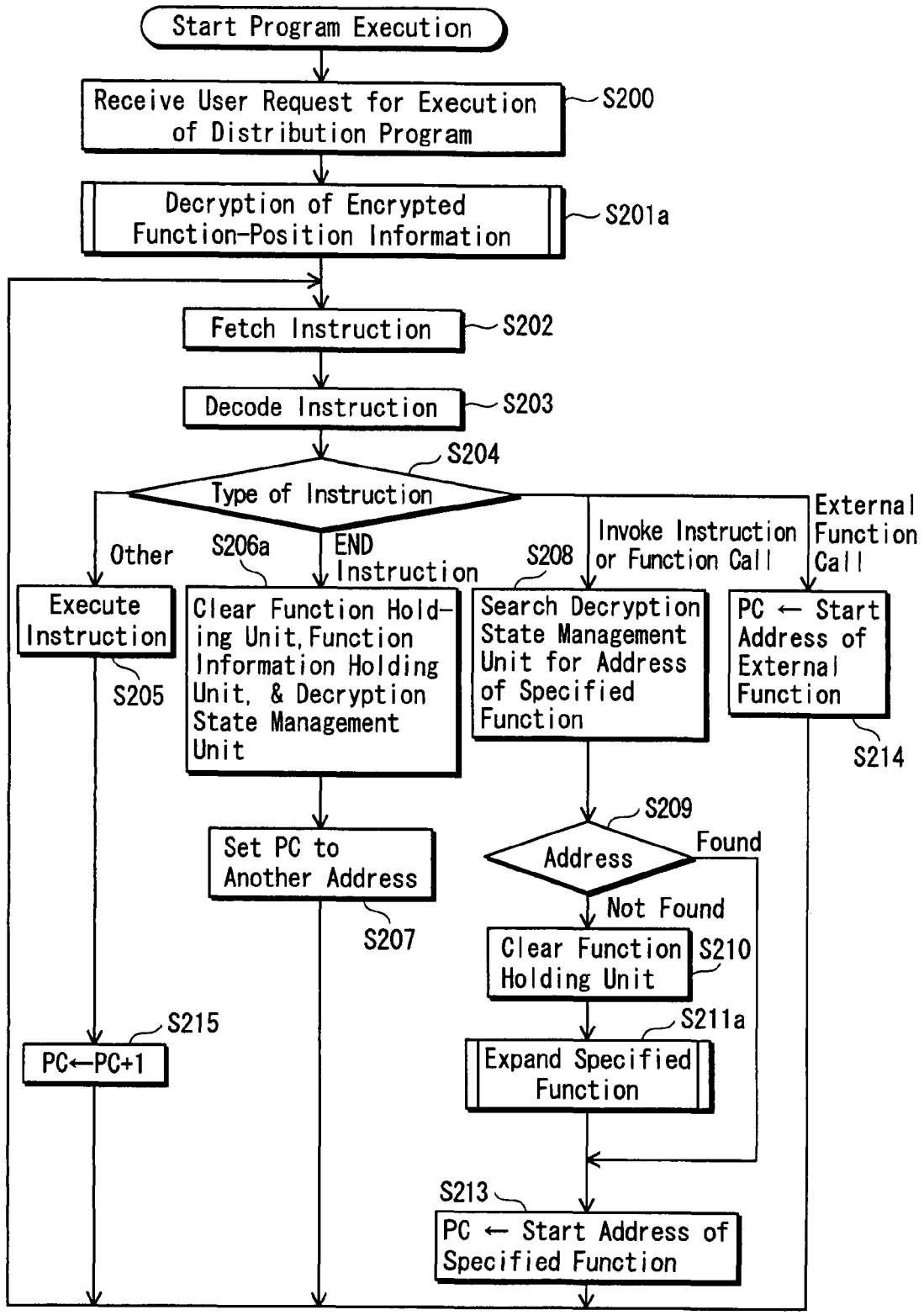
FIG. 35 is a flowchart of the mobile phone 200*ab* performed for executing the distribution program.

The following describes operation of the mobile phone 200ab for executing the distribution program, with reference to a flowchart illustrated in FIG. 35.

The control unit 226 receives a user request for execution of the distribution program 250, from a user of the mobile phone 200ab via the input unit 224 (Step S200). The pre-processing unit 204 decrypts encrypted function-position information of the distribution program 250, by performing Steps S231-S233 illustrated in FIG. 26 (Step S201a).

The program execution unit 207 fetches an instruction code from the storage location indicated by the value of the program counter PC (Step S202), decodes the fetched instruction code (Step S203), and judges whether the instruction code is an external function call, an invoke instruction or a function call, an END instruction, or none of the above (Step S204).

If the instruction is an external function call (Step S204), the program execution unit 207 sets the program counter PC to the value of the start address of the external function (Step S214) and goes back to Step S202 to repeat the above processing steps.

If the instruction is an invoke instruction or function call (Step S204), the program execution unit 207 searches the decryption state table 361 held by the decryption state management unit 210 for a function name specified by the invoke instruction or function call and retrieves, if such a function name is found, the start address of the specified function (Step S208). If the start address is successfully retrieved (Step S209), the program execution unit 207 sets the program counter PC to the value of the retrieved start address (Step S213) and goes back to Step S202 to repeat the above processing steps.

On the other hand, when failing to retrieved the start address (Step S209), the program execution unit 207 erases all the functions from the function holding unit 203 (Step S210). The expansion unit 206 then expands the specified function through Steps S281-S286 illustrated in FIG. 28 (Step S211a), sets the program counter PC to the value of the start address of the specified function (Step S213). Then, Step S202 is performed next to repeat the above processing steps.

If the instruction code is an END instruction (Step S204), the program execution unit 207 erases all the stored contents from the function holding unit 203, the function information holding unit 209, and the decryption state management unit 210 (Step S206a). The program execution unit 207 then sets the program counter PC to the value indicating the storage location of another instruction code of another program (Step S207) and goes back to Step S202 to repeat the above processing steps.

if the instruction code is none of the above (Step S204), the program execution unit 207 executes the instruction code in accordance with the result of decoding (Step S205), increments the program counter PC by "1" (Step S215), and goes back to Step S202 to repeat the above processing steps.

(3) Recapitulation

According to the above modification, upon receiving a distribution program, the device attempts to decrypt integration information included in the distribution program. According to each piece of integration information having been successfully decrypted, the device then integrates a plurality of functions into a new single function, encrypts the new function, and writes the encrypted new function into the distribution program.

At the time of executing the distribution program, it is no longer required to decrypt each of the plurality of functions indicated by the integration information. Instead, the device decrypts an encrypted integrated function and executes the decrypted function each time the function is called. With this arrangement, the load imposed on CPU for execution of the distribution program is reduced.

3. Modification (2)

The following describes a program distribution system 10c, which is a modification of the program distribution system 10. Similarly to the program distribution system 10, the program distribution system 10c is composed of a program conversion device 100c, a mobile phone 200ac, a DVD player 200bc, and a personal computer 200cc.

The program conversion device 100c is identical in structure to the program conversion device 100 of the program distribution system 10 consistent with the embodiment. In addition, the mobile phone 200ac, the DVD player 200bc, and the personal computer 200cc are identical in structure to the corresponding devices of the program distribution system 10, namely the mobile phone 200a, the DVD player 200b, and the personal computer 200c.

The description of the program conversion device 100c is given below, focusing on differences with the program conversion device 100. In addition, the description of the mobile phone 200ac is given below, focusing on differences with the mobile phone 200a. Note that no description is given of the DVD player 200bc and the personal computer 200cc, since they are identical to the mobile phone 200ac.

3.1 Structure of Program Conversion Device 100c (1) Information Storage Unit 101

Figure 36:
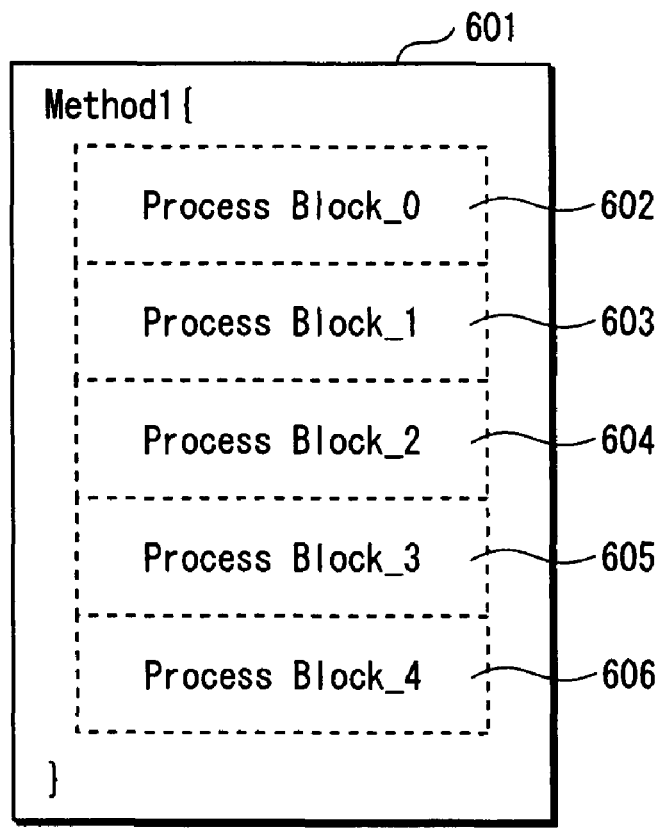
FIG. 36 illustrates an exemplary data structure of an original program 601.
Figure 37:
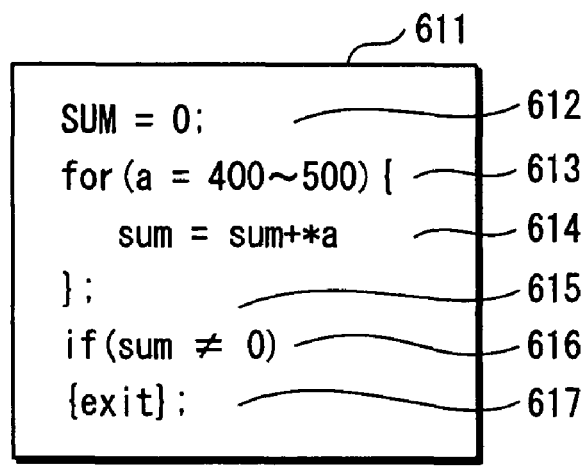
FIG. 37 illustrates an exemplary data structure of a check program 611.
Figure 39:
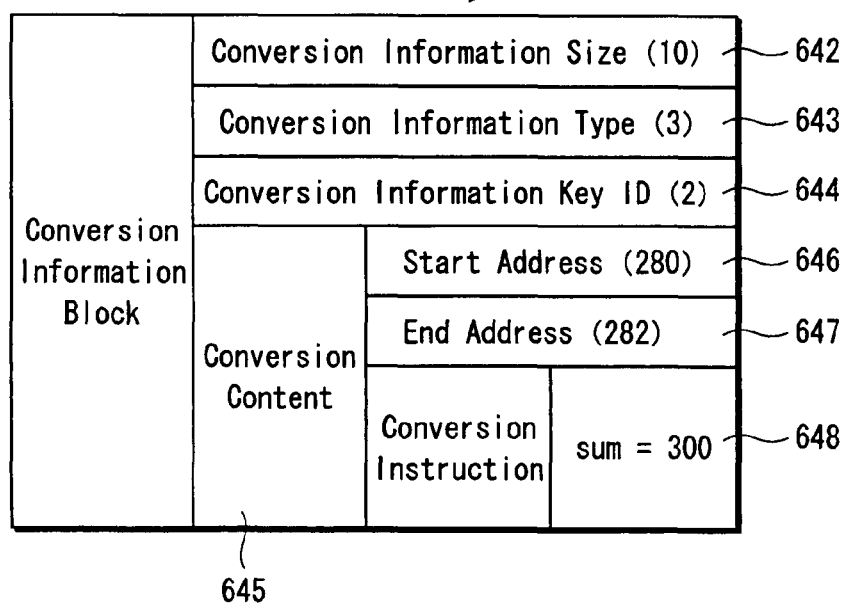
FIG. 39 illustrates an exemplary data structure of a conversion information block 641.

The information storage unit 101 of the program conversion device 100c stores in advance an original program 601, a check program 611, and a conversion information block 64 illustrated in FIGS. 36, 37, and 39, respectively.

(Original Program 601)

As illustrated in FIG. 36, the original program 601 includes process blocks 602, 603, 604, 605, and 606. In this example, it is supposed that when each instruction code contained in the process block 602 is treated as numerals, the sum of all the instruction codes equals to "300".

(Check Program 611)

As illustrated in FIG. 37, the check program 611 includes instruction codes 612, 613, 614, 615, 616, and 617.

The instruction code 612 is for causing "0" to be assigned to a variable sum.

The instruction code 613 is for causing a loop of instruction codes 613-615 to be repeated while incrementing a variable a by "1" for each iteration of the loop. The initial value of the variable a is "400" and the loop is repeated until the variable a becomes equal to "500".

The instruction code 614 is for causing data stored at a location specified by the value of the variable a to be added to the variable sum.

The instruction code 615 indicates the end position of the loop created by the instruction code 613.

The instruction code 616 is for causing a judgment is to be made as to whether variable sum is equal to "300". The instruction code 617 is executed on condition that the judgment is true.

The instruction code 617 indicates an END of the program. Upon detection of this instruction code, a program execution device terminates execution of the program.

Note that the check program 611 may or may not a component of the distribution program. For example, the functionality of a check program may be implemented by an execution environment. In such a case, the distribution program includes program instructions for implementing the functionality.

(Conversion Information Block 641)

As illustrated in FIG. 39, the conversion information block 641 is composed of a conversion information size 642, a conversion information type 643, a conversion information key ID 644, and a conversion content 645.

The conversion information size 642 indicates the length of the conversion information block 641 that contains the conversion information size 642.

The conversion information type 643 indicates that the conversion information block 641 containing the conversion information type 643 is of the type 3. As illustrated in FIG. 39, the conversion information type 643 is set to the value "3", which indicates that the conversion information block is of the type 3 that contains a conversion instruction for causing one or more instruction codes of the distribution program to be replaced.

The conversion information key ID 644 identifies a conversion information key for encrypting the conversion content of the conversion information block 641 that contains the conversion information key ID 644

The conversion content 645 is composed of a start address 646, an end address 647, and a conversion instruction 648 and represents information for invalidating the check program.

The start address 646 and the end address 647 each indicates a position in distribution program.

The conversion instruction 648 includes an instruction code with which the check program is to be replaced.

As above, the conversion content 645 indicates that part of the distribution program from the start address 646 to the end address 647 are to be replaced with the instruction code contained in the conversion instruction 648.

(2) Control Unit 104

The control unit 104 receives, from the input unit 105, an input requesting generation of the distribution program 500 by applying conversion to the original program 601. Upon receipt of the request, the control unit 104 reserves an area of the information storage unit 101 for storing the distribution program 500. Next, the control unit 104 reads the original program 601 from the information storage unit 101 and writes the read original program 601 into the program area 502 of the distribution program 500.

(3) Obfuscation Unit 103

The obfuscation unit 103 reads the check program 611 from the information storage unit 101 and inserts the read check program into the original program stored in the program area 502. More specifically, the check program is inserted between the process blocks 604 and 605.

Figure 38:
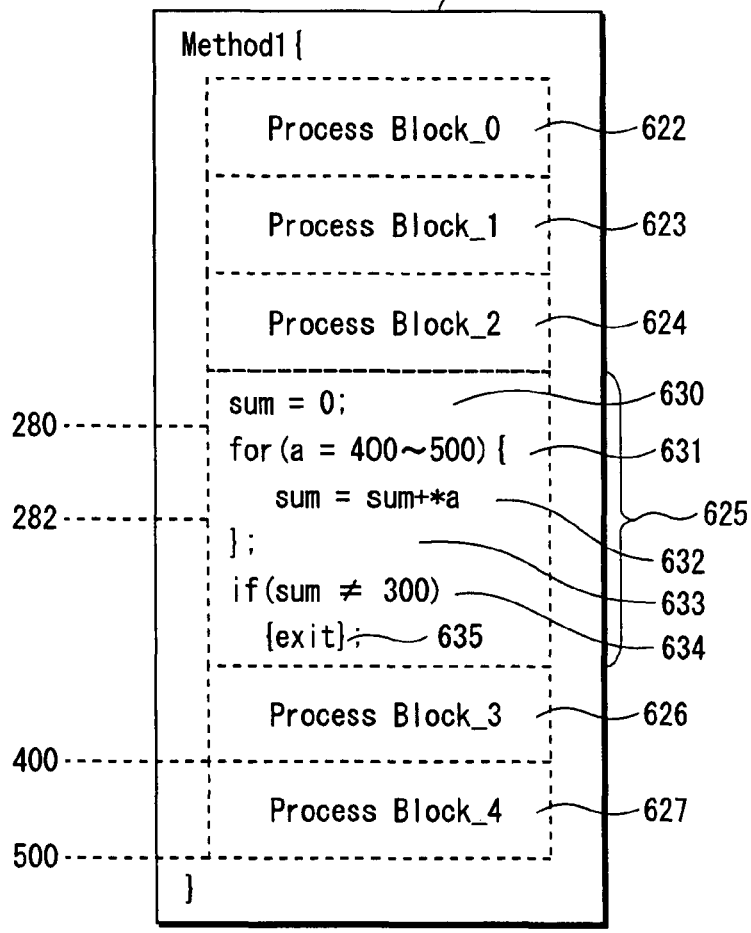
FIG. 38 illustrates an exemplary data structure of a program 621.

In the above manner, the program area 502 stores a program 621 illustrated in FIG. 38. The program 621 is composed of process blocks 622, 623, 624, 625, 626, and 627.

The process blocks 622, 623, 624, 626, and 627 are identical to the corresponding blocks of the original program 601, namely the process blocks 602, 603, 604, 605, and 606. In addition, the process block 625 is identical to the check program 611 and includes instruction codes 630-635. The instruction codes 630-635 are identical to the instruction codes 612-617 of the check program 611.

The distribution program 500 includes the instruction codes 625 and 633 at storage locations specified by the addresses "280" and "282". In addition, the storage location of the process block 627 starts at the address "400" and ends at the address "500".

Supposed that the distribution program 500 generated in the above manner is distributed and that a malicious party tampers with instruction codes of the process block 627. In such an event, it is not likely that the sum of all the instruction codes contained in the process block 627 remains equal to "300". Such tampering of the process block 627 is detected through execution of the instruction code 634 included in the process block 625. Upon detection of tampering, the instruction code 635 is immediately executed to terminate execution of the distribution program 500.

The process blocks 622-627 of the program 621 are encrypted by using the sub-module key and added into the distribution program 500.

Next, the obfuscation unit 103 reads the conversion information block 641 from the information storage unit 101 and additionally writes the read the conversion information block into the conversion information 550 stored in the conversion information area 503 of the distribution program 500. The conversion information block is encrypted by using the conversion information key and added to the conversion information 550.

(4) Communication Unit 112

The communication unit 112 transmits the distribution program 500 to the mobile phone 200ac, the DVD player 200bc, and the personal computer 200cc. The transmitted distribution program 500 at least includes an encrypted program generated by encrypting the program 621 illustrated in FIG. 38 and an encrypted conversion information block generated by encrypting the conversion information block 641 illustrated in FIG. 39.

3.2 Structure of Mobile Phone 200ac

The mobile phone 200ac receives the distribution program 500 from the program conversion device 100c and stores it into the information storage unit 211 as the distribution program 250. The received distribution program 500 at least includes the encrypted program generated by encrypting the program 621 and the encrypted conversion information block generated by encrypting the conversion information block 641.

Figure 41:
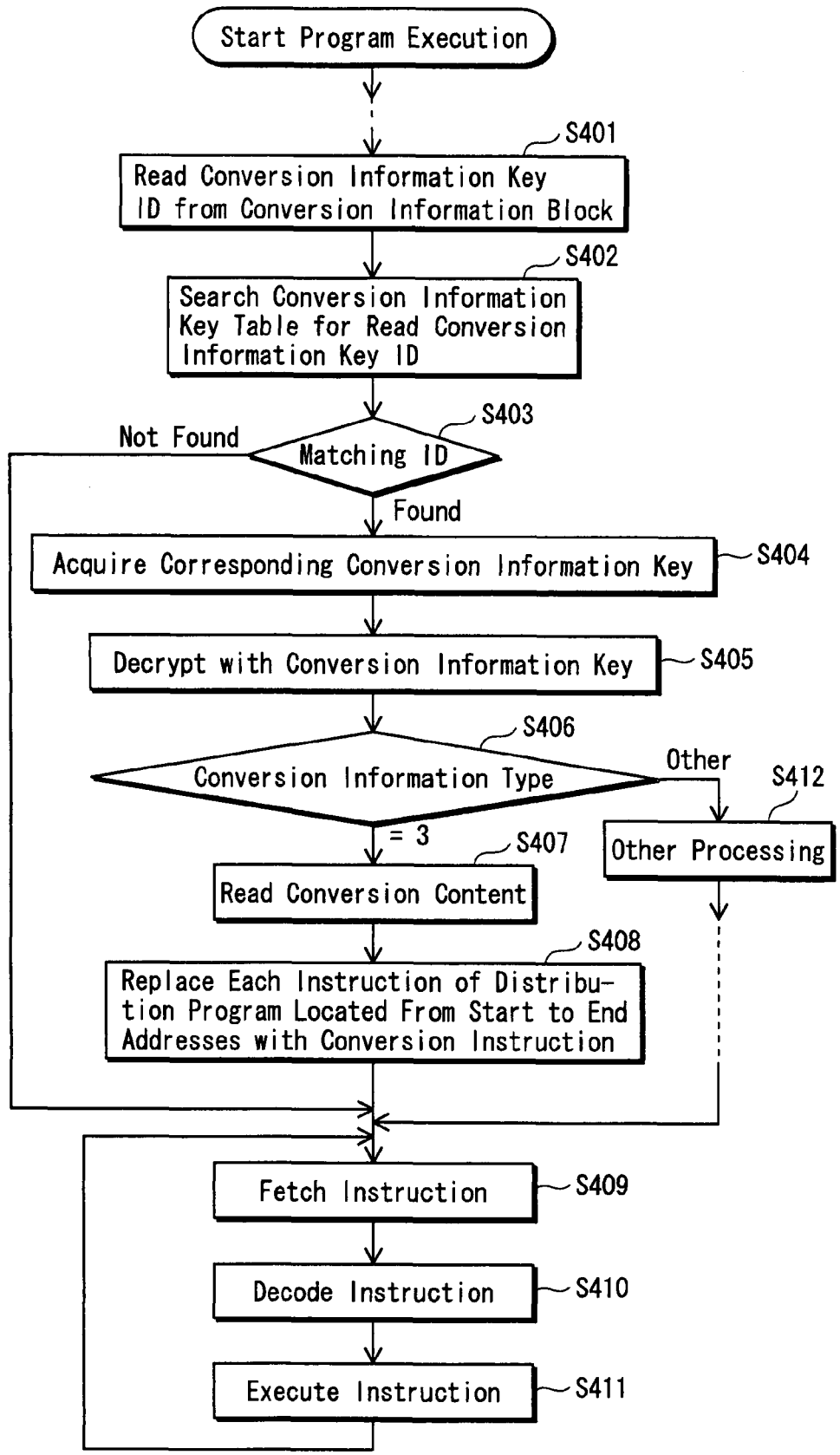
FIG. 41 is a flowchart of operation of a mobile phone 200*ac* performed for executing a distribution program 250.

The following describes operation of the mobile phone 200ac performed for executing distribution program 250, with reference to a flowchart illustrated in FIG. 41.

In response to a request for execution of the distribution program 250, the pre-processing unit 204 reads one conversion information block from the conversion information of the distribution program 250, and extracts a conversion information key ID from the read conversion information block (Step S401). Next, the pre-processing unit 204 searches the conversion information key table 261 held by the conversion information key holding unit 202 for a conversion information key ID that matches the extracted conversion information key ID (Step S402).

If none of the conversion information key IDs in the conversion information key table 261 matches the extracted conversion information key ID (Step S403), Step S409 is performed next.

On the other hand, if a matching conversion information key ID is found in the conversion information key table 261 (Step S403), the pre-processing unit 204 reads a conversion information key identified by the matching conversion information key ID from the conversion information key table 261 (Step S404) and outputs the read conversion information key to the decryption unit 205. The decryption unit 205 decrypts an encrypted portion of the conversion information block by using the received conversion information key (Step S405). Next, the decryption unit 205 judges whether the conversion information type included in the conversion information block indicates the type "3". If the conversion information block is of a type other than the type "3" (Step S406), other processing is performed accordingly.

Figure 40:
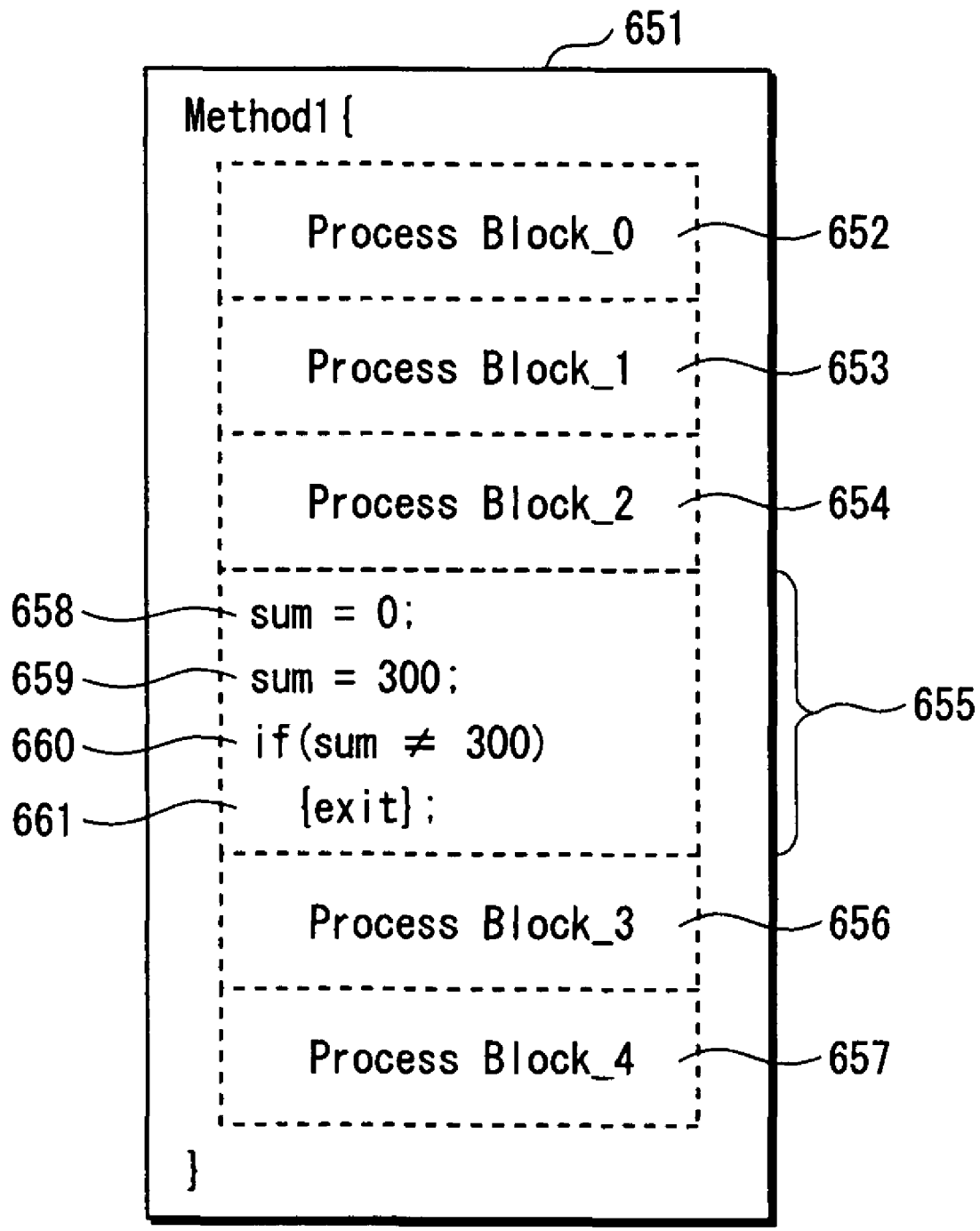
FIG. 40 illustrates an exemplary data structure of a program 651.

On the other hand, if the conversion information type is judged to be "3" (Step S406), the pre-processing unit 204 reads the conversion content 645 from the conversion information block (Step S407) and extracts the start and end addresses as well as the conversion instruction from the read conversion content. The pre-processing unit 204 then replaces the part of the distribution program 250 from the extracted start address to the extracted end address with the extracted conversion instruction (Step S408). Through the above processing steps, a program 651 illustrated in FIG. 40 is generated. The program 651 is composed of process blocks 652, 653, 654, 655, 656, and 657. In addition, the process block 655 includes instruction codes 658, 659, 660, and 661. Execution of the instruction code 659 causes "300" to be assigned to the variable sum. Thus, a judgment made by the instruction code 660 always results in false and thus the instruction code 661 is never executed.

Then, the program execution unit 207 fetches an instruction code located at the address indicated by the value of the program counter PC (Step S409), decodes the fetched instruction code (Step S410), executes a process according to the result of decoding, and increments the program counter PC by "1" (Step S411). Then, Step S409 is performed again to repeat the processing steps.

3.3 Recapitulation

As described above, the conversion information block of the type 3 includes an encrypted conversion content. Once the conversion content is decrypted, the check program contained in the distribution program is replaced with the conversion content as illustrated in FIG. 40. Thus, execution of the check program is omitted. On the other hand, if the conversion content included in the conversion information block of the type 3 remains in encrypted form, the check program remains unaltered. Thus, any malicious tampering is detected through execution of the check program and thus the distribution program will be terminated upon detection of term paring.

Whether the encrypted conversion content included in the conversion information block of the type 3 is decrypted or not depends upon whether the mobile phone 200ac holds a correct conversion information key that is identified by the conversion information key ID included in the conversion information block. If the mobile phone 200ac holds a conversion information key identified by the conversion information key ID contained in the conversion information block, the conversion content is decrypted. If not, the conversion content cannot be decrypted.

As above, whether or not the check program is caused to be executed is determined depending upon whether or not the mobile phone 200ac holds a correct conversion information key.

Thus, if the mobile phone 200ac has the information storage unit 211 that is provided with a protection mechanism against unauthorized use of the stored contents by a malicious party, it is acceptable to provide the mobile phone 200ac with the conversion information key.

On the other hand, as in the case of the personal computer 200cc, if the information storage unit is readily accessible from outside, it is desirable not to provide the personal computer 200cc with the conversion information key.

4. Modification (3)

The following describes a program distribution system 10d, which is a modification of the program distribution system 10. Similarly to the program distribution system 10, the program distribution system 10d is composed of a program conversion device 100d, a mobile phone 200ad, a DVD player 200bd, and a personal computer 200cd.

The program conversion device 100d is identical in structure to the program conversion device 100 of the program distribution system 10 consistent with the embodiment. In addition, the mobile phone 200ad, the DVD player 200bd, and the personal computer 200cd are identical in structure to the corresponding devices of the program distribution system 10, namely the mobile phone 200a, the DVD player 200b, and the personal computer 200c.

A description of the program conversion device 100d is given below, focusing on differences with the program conversion device 100. In addition, a description of the mobile phone 200ad is given below, focusing on differences with the mobile phone 200a. Note that no description is given of the DVD player 200bd and the personal computer 200cd, since they are identical to the mobile phone 200ad.

At the initial state of the program conversion device 10d, the sub-module key holding unit 109 stores no sub-module keys. In addition, the conversion information key table 121 held by the conversion information key holding unit 111 contains no conversion information keys.

The program conversion device 100d further includes a key generation unit, which will be described later.

4.1 Structure of Program Conversion Device 100d

(1) Key Generation Unit

The key generation unit generates a random number and writes the thus generated random number as a sub-module key into the sub-module key holding unit 109.

In addition, the key generation unit generates a conversion information key ID and a random number. The key generation unit then writes apiece of key information composed of the random number as a conversion information key along with a conversion information key ID into the conversion information key table 121. The key generation unit repeats the generation of a conversion information key ID and a random number as well as the writing of a piece of key information composed of the thus generated conversion information key ID and the random number as the conversion information key.

(2) Information Storage Unit 101

The program conversion device 100d stores in advance a device key table 701 and a key correspondence table 711 in the information storage unit 101. The device key table 701 is illustrated in FIG. 42, whereas the key correspondence table 711 is illustrated in FIG. 43.

(Device Key Table 701)

In an example illustrated in FIG. 42, the device key table 701 is composed of a plurality of pieces of device key information. The number of pieces of the device key information is equal to the number of devices to which a program generated by the program conversion device is to be distributed. The pieces of device key information are in a one-to-one correspondence with the devices.

Each piece of device key information includes a device key ID and a device key. A device key ID uniquely identifies a device corresponding to that piece of device key information, and a device key is key information assigned to that device.

(Device Key Correspondence Table 711)

As illustrated in FIG. 43, the device key correspondence table 711 stores a plurality of pieces of device key correspondence information. Each piece of device key correspondence information is composed of a device key ID and a conversion information key ID. A device key ID is information identifying a device as described above. The conversion information key ID is information identifying a conversion information key also as described above.

The pieces of device key information indicate which conversion information keys are assigned to which devices. More specifically, a pair of a device key ID and a conversion information key ID included in a piece of device key information indicates that a device identified by the device key ID is assigned with a conversion information key identified by the conversion information key ID.

(Distribution Program)

The distribution program further includes an encrypted sub-module key block 721 and an encrypted conversion information key block 722 both illustrated in FIG. 44.

The encrypted sub-module key block 721 includes a plurality of encrypted sub-module keys. Each encrypted sub-module key is generated by encrypting a sub-module key with a device key.

The encrypted conversion information key block 722 includes a plurality of conversion information key blocks. Each conversion information key block is composed of a conversion information key ID, a device key ID, and a piece of encrypted conversion information key. The description of the conversion information key ID and device key ID is already given above. The encrypted conversion information key is generated by encrypting a conversion information key with a device key.

(3) Obfuscation Unit 103

Figure 45:
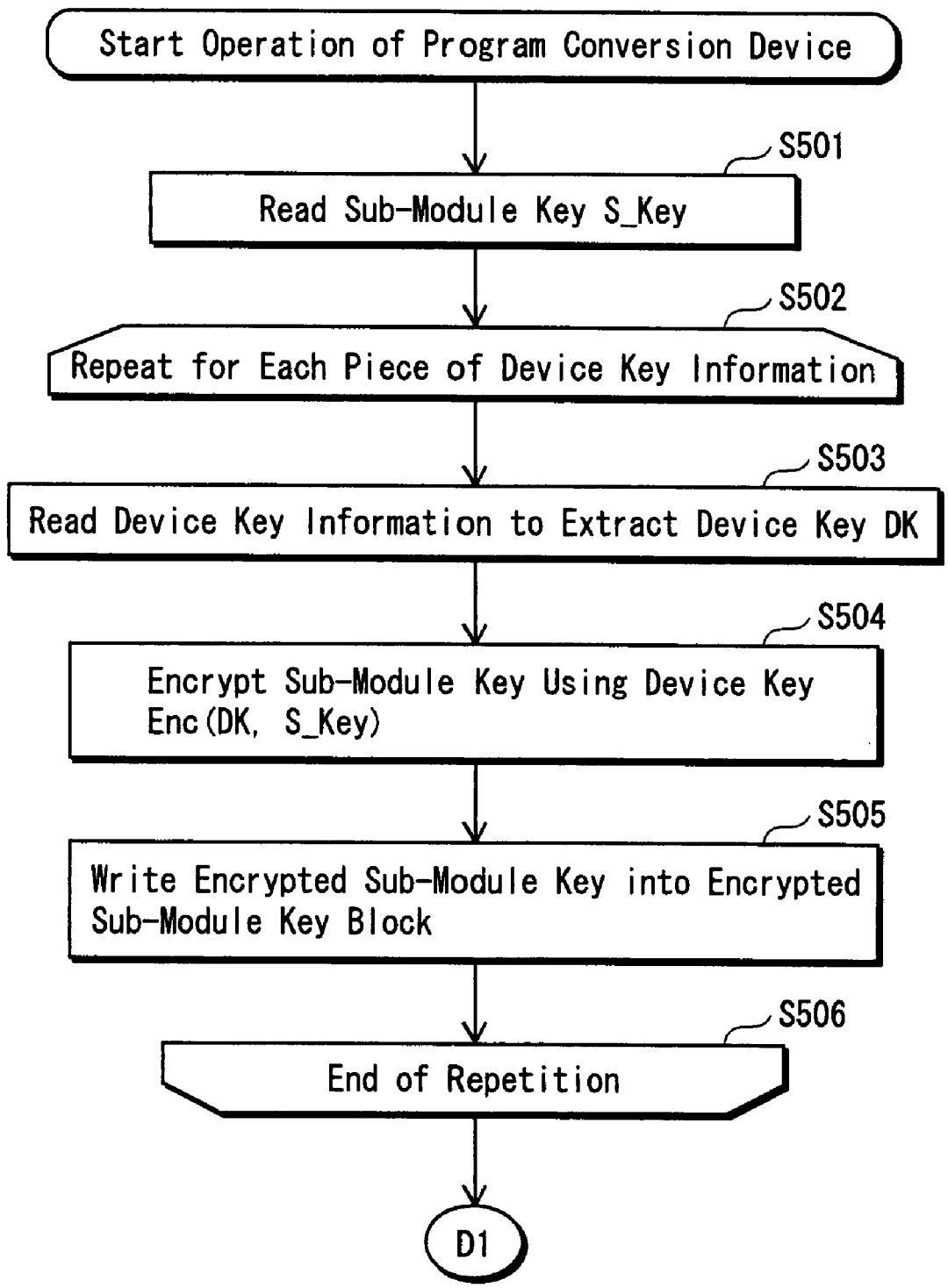
FIG. 45 is a flow chart of operation of a program conversion device 100*d* performed for generating an encrypted sub-module key block 721 and an encrypted conversion information key block 722 by an obfuscation unit 103 (continued to FIG. 46)
Figure 46:
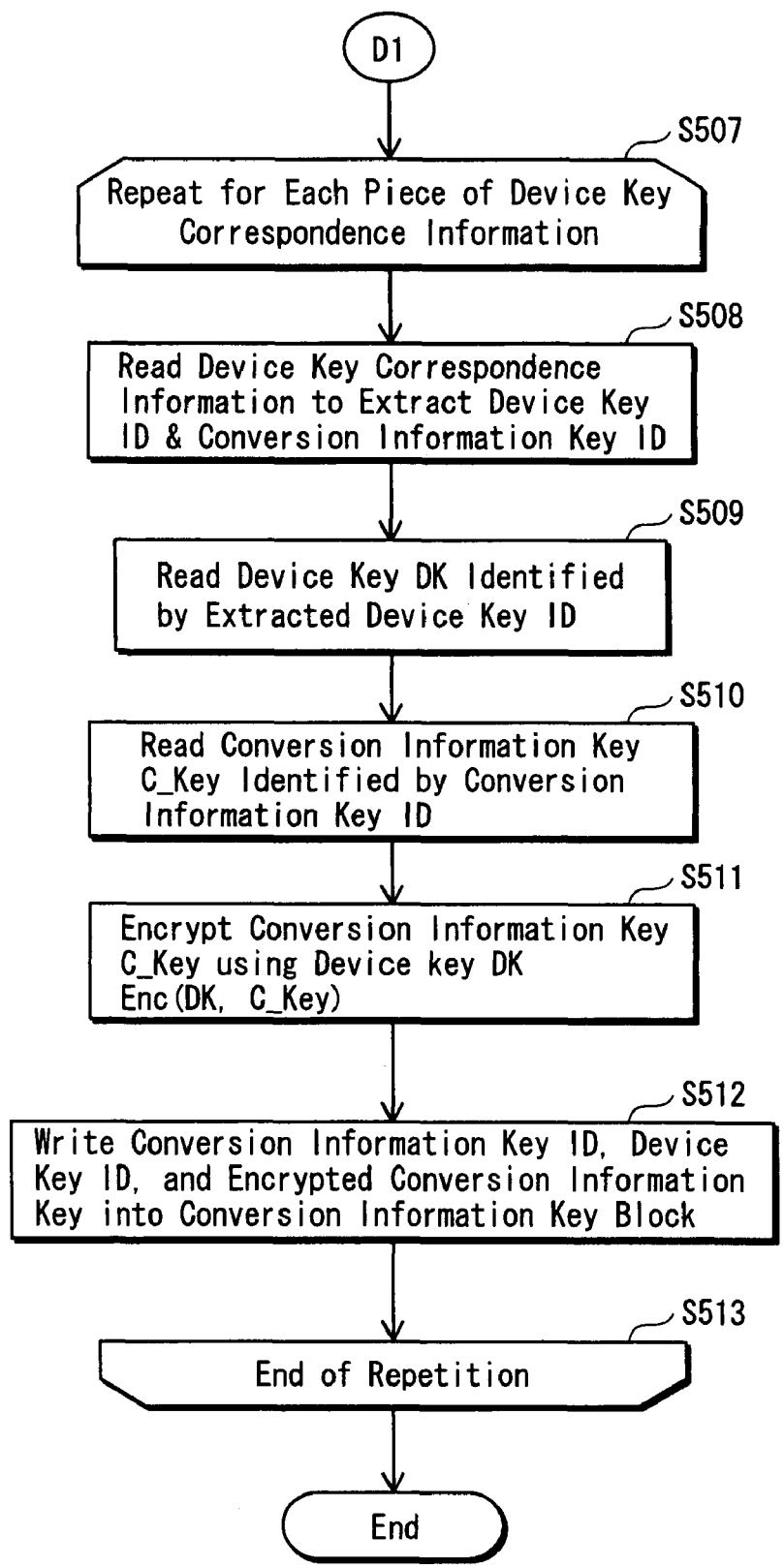
FIG. 46 is the flowchart of operation of the program conversion device 100*d* performed for generating the encrypted sub-module key block 721 and the encrypted conversion information key block 722 by the obfuscation unit 103 (continued from FIG. 45)

The following describes operation of the obfuscation unit 103, with reference to flowcharts illustrated in FIGS. 45-46.

The obfuscation unit 103 reads a sub-module key S_Key from the sub-module key holding unit 109 (Step S501).

Next, the obfuscation unit 103 performs Steps S502-S506 to create a loop in which Steps S503-S505 are repeated on each piece of device key information included in the device key table 701.

The obfuscation unit 103 reads one piece of device key information from the device key table 701 and extracts a device key DK form the read piece of device key information (Step S503). Next, the obfuscation unit 103 encrypts the sub-module key S_Key with the device key DK to generate an encrypted sub-module key Enc(DK, S_Key) (Step S504) and writes the thus generated encrypted sub-module key into the encrypted sub-module key block 721 (Step S505).

When the above steps are performed on each piece of device key information, the obfuscation unit 103 then performs Steps S507-S513 to create a loop in which Steps S508-S512 are repeated on each piece of device key correspondence information included in the device key correspondence table 711.

The obfuscation unit 103 reads a piece of device key correspondence information from the device key correspondence table 711 and extracts a device key. ID and a conversion information key ID from the read piece of device key correspondence information (Step S508). Next, the obfuscation unit 103 retrieves a device key DK identified by the extracted device key ID from the device key table 701 (Step S509), retrieves a conversion information key C_Key identified by the extracted conversion information key ID from the conversion information key table 121 (Step S510). The obfuscation unit 103 then encrypts the retrieved conversion information key C_Key by using the retried device key DK to generate an encrypted conversion information key Enc(DK, C_Key) (Step S511) and writes the conversion information key ID, the device key ID, and the encrypted conversion information key into the conversion information key block (Step S512).

In the above manner, the distribution program that includes, as illustrated in FIG. 44, the encrypted sub-module key block 721 and the encrypted conversion information key block 722 are generated.

(4) Communication Unit 112

The communication unit 112 transmits the distribution program that includes the encrypted sub-module key block 721 and the encrypted conversion information key block 722 to the mobile phone 200ad, the DVD player 200bd, and the personal computer 200cd.

4.2 Structure of Mobile Phone 200ad

The mobile phone 200ad stores in advance a device key DK and a device key ID that are unique to the mobile phone to 200ad. In the indicial state, the sub-module key holding unit 201 does not store any sub-module keys and the conversion information key table 261 held by the conversion information key holding unit 202 does not contain any key information.

The information storage unit 211 stores a distribution program that includes an encrypted sub-module key block and an encrypted conversion information key block.

The following describes operation of the mobile phone 200ad performed for decrypting the encrypted sub-module key and conversion information key block, with reference to flowcharts illustrated in FIG. 47.

The pre-processing unit 204 of the mobile phone 200ad reads the device key DK and the device key ID of the mobile phone 200ad (Step S521) and identifies, with the read device key ID, an encrypted sub-module key in the encrypted sub-module key block of the distribution program 250. More specifically, the pre-processing unit 204 specifies an encrypted sub-module key stored in the field corresponding to the read device key ID (Step S522). Next, the pre-processing unit 204 decrypts the encrypted sub-module key specified in Step 522, by using the device key to generate a sub-module key (Step S523) and writes the thus generated sub-module key into the sub-module key holding unit 201 (Step S524).

Next, the pre-processing unit 204 performs Steps S525-S531 to create a loop in which Steps S526-S530 are repeated on each conversion information key block contained in the encrypted conversion information key block of the distribution program.

The pre-processing unit 204 reads one conversion information key block from the encrypted conversion information key block of the distribution program (Step S526) and compares the device key ID included in the conversion information key block with the device key ID held by the mobile phone 200ad (Step S527). If the two IDs do not match (Step S528: NO), another iteration of the loop is performed. On the other hand, if the two IDs match (Step S528: YES), the pre-processing unit 204 decrypts the encrypted conversion information key block by using the device key to generate a conversion information key (Step S529), and writes the generated conversion information key into conversion information key table 261, in correspondence with the conversion information key ID included in the conversion information key block (Step S530).

Through the above steps, sub-module keys are generated and written one by one into the sub-module key holding unit 201. In addition, conversion information keys are generated and written one by one into the conversion information key table 261.

This arrangement prevents that unauthorized devices without a device key from acquiring a sub-module key and/or a conversion information key. Consequently, the risk of unauthorized decryption and weakening the obfuscation is reduced, and thus the program is protected against such malicious attacks.

4.3 Invalidation of Information Processing Device

The program conversion device 100d manages invalidation of the information processing deices, namely, the mobile phone 200ad, the DVD player 200bd, and the personal computer 200cd.

For purposes of illustration, it is supposed that an information processing device having a device key DK-t that is identified by a device key ID "t" is analyzed by an unauthorized party and either of the device key, sub-module key, and conversion information key has been exposed.

In this case, the program conversion device 100d deletes an entry containing the device key ID "t" from the device key table 701 and also from the device key correspondence table 711. As a result, the exposed device key is deleted from the device key correspondence table 711.

All the subsequent operations of the program conversion device 100d are performed by using the device key correspondence table that does not contain the exposed device key.

This ensures that any distribution program subsequently generated by the program conversion device 100d is not executable by a malicious information processing device having the device key DK-t. It is because neither the sub-module key nor the conversion information key can not be obtained with use of the device key DK-t. In this way, the information processing device having the device key DK-t is invalidated.

A sub-module key and a conversion information key are newly generated from a random number each time a distribution program is generated. Thus, even if a sub-module key is exposed, the exposed sub-module key is different from the sub-module key of the distribution program that is newly generated after the invalidation process. Thus, the new sub-module key is not known to the malicious third party.

5. Other Modifications

Up to this point, the present invention has been described by way of the above embodiment and modifications. It should be naturally appreciated, however, that the present invention is not limited to the specific embodiment and modifications above and various other modifications including the following still fall within the scope of the present invention.

(1) The program conversion device 100 may hold a plurality of security level keys that correspond to a plurality of security levels.

Suppose, for example, that the security levels of the mobile phone 200a, the DVD player 200b, and the personal computer 200c are "3", "2", and "1", respectively.

In addition, the program conversion device 100 holds security level keys SKEY3, SKEY2, and SKEY1 that correspond to the security levels "3", "2", and "1" in the stated order.

It is also supposed that the program conversion device 100 generates three pieces of integration information and encrypts each piece of integration information.

The program conversion device 100 encrypts the first, second, and third pieces of integration information by using the security level key SKEY3 to generate three pieces of encrypted integration information. Further, the program conversion device 100 encrypts the first and second pieces of integration information by using the security level key SKEY2 to generate two more pieces of encrypted integration information. Still further, the program conversion device 100 encrypts the first piece of integration information by using the security level key SKEY1 to generate one piece of encrypted integration information.

Then, the program conversion device 100 inserts the thus generated six pieces of encrypted integration information into the conversion information 550.

In the above manner, the distribution program that includes the conversion information 550 containing the six pieces of encrypted integration information is transmitted to the mobile phone 200a, the DVD player 200b, and the personal computer 200c.

The mobile phone 200a, the DVD player 200b, and the personal computer 200c store in advance the security levels key SKEY3, SKEY2, and SKEY1, respectively.

The mobile phone 200a decrypts the three pieces of encrypted integration information by using the security level key SKEY3 held therein, to generate three pieces of integration information. The mobile phone 200a is thus allowed to use the three pieces of integration information.

The DVD player 200b decrypts the two pieces of encrypted integration information by using the security level key SKEY2 held therein, to generate two pieces of integration information. The DVD player 200b is thus allowed to use the two pieces of integration information.

The personal computer 200c decrypts the piece of encrypted integration information by using the security level key SKEY1 held therein, to generate one piece of integration information. The personal computer 200c is thus allowed to use the one piece of integration information.

Here, it is applicable that the personal computer 200c holds no security level keys at all. In such a case, the personal computer 200c is not able to decrypt any pieces of encrypted integration information and thus not allowed to use integration information at all.

(2) The integration information illustrated in FIG. 11 identifies the functions with the function names. Yet, the integration information is not limited to such and may include, instead of a function name, an identifier for the function name or the address of the storage location of the function.

(3) The root function size may indicate the total size of the root function expanded in the function holding unit.

Suppose, for example, a root function Method1 is divided to generate new functions Method1, Method1_b0, Method1_b1, and Method1_b2. In this case, the root function size indicates the total size of the new functions, namely Method1, Method1_b0, Method1_b1, and Method1_b2.

Before encrypting integration information, the program conversion device may select a conversion information key based on the root function size and carries out the encryption by using the thus selected conversion information key.

For example, when the root function size is not smaller than 0K bytes and smaller than 4K bytes, a conversion information key A is selected, whereas a conversion information key B is selected when the root function size is not smaller than 4K bytes and smaller than 40K bytes.

Suppose that Device 1 has a function holding unit implemented on memory having a high security level (e.g. memory in LSI and not readily accessible by users) and the function holding unit has a storage area of 40K bytes or more. In this case, Device 1 is provided with both the conversion information keys A and B in advance.

Device 2, on the other hand, has a function holding unit implemented on memory having a high security level and the function holding unit has a memory area of 4K-40K bytes. In this case, Device 2 is provided with the conversion information key A only.

If a device is without high-level security memory, such a device is provided with neither the conversion information key A nor the conversion information key B.

With the above configuration, a device having high-level security memory is allowed to write the program on the memory and execute the written program.

(4) According to the above embodiment, encryption and decryption are carried out by using common key cryptography, such as DES and AES, but without limitation. So-called public key cryptography, such as RSA may be used instead.

In addition, different cryptography schemes may be used. For example, a device having a low security level may use public key cryptography, whereas a device having a high security level may use common key cryptography.

(5) As described above, the mobile phone 200a is allowed to acquire a distribution program from the program conversion device 100 and store it within the mobile phone 200a. Next, the mobile phone 200a may save the distribution program into a memory card. In addition, other devices having different security levels, such as the DVD player 200b and the personal computer 200c, are allowed to read the distribution program from the memory card into their internal storages and execute the stored distribution program.

That is to say, one and the same distribution program is suitably executable on a plurality of devices having different security levels.

(6) In the above described embodiment, the redundant information includes the start and end positions specifying the storage location of a redundant block. Yet, it is also applicable that the redundant information does not include any information directly indicating the storage location of a redundant block, such as the address of the redundant block.

Instead of such information, the redundant information may include information indicating that all redundant blocks inserted in the program commonly include a specific variable.

(7) In the above embodiment, the program conversion device generates information, typically to reduce the obfuscation level of the program based on information having been used for obfuscation.

Here, the information for reducing the obfuscation level may be conversion information for applying inverse conversion of the obfuscation.

With the above configuration, the information having been used for obfuscation indicates the locations of the obfuscated instruction codes as well as the types of obfuscation conversion applied to those instruction codes. Thus, the inversion to reduce the obfuscation level may be readily defined based on the information. More specifically, the conversion information may be generated to define replacements of redundant instructions with NOP instructions or inversion of the obfuscation conversion having been applied.

(8) As described above, the present invention may be embodied as a program conversion and execution device having a program execution unit that executes an obfuscated program, by adjusting the obfuscation level with use of conversion information having been used for the obfuscation.

The conversion information may be encrypted partially or entirely. The program conversion and execution device may have a decryption unit for decrypting the encrypted conversion information and the execution unit may execute the program by using the conversion information decrypted by the decryption unit.

The program conversion and execution device may also have a program storage unit for storing the program decrypted by the decryption unit.

The conversion information may be for reducing the obfuscation level of the program.

Further, the present invention may be embodied as a conversion information generation device that has a program analyzing unit that analyzes the program structure and a conversion information generating unit that generates, based on the analysis by the program analyzing unit, conversion information for converting the program.

Still further, the present invention may be embodied as a program generation device having an program obfuscating unit that obfuscates the program, and a conversion information generating unit that generates conversion information for adjusting the obfuscation level of the program obfuscated by the program obfuscating unit.

The conversion information may be for reducing the obfuscation level.

The conversion information may be conversion information for converting the program to optimize the obfuscation level for each device that executes the program.

Still further, the present invention may be a program distribution method for distributing a program, along with conversion information for converting the program.

The conversion information may be for use by a terminal device for converting the program distributed according to the distribution method.

The conversion information may be for reducing the obfuscation level of the program.

The conversion information may be for optimizing the obfuscation level of the program for each of a plurality of devices executing the program.

Still further, the present invention may be embodied as a program conversion method having a conversion step of converting a program by using conversion information.

The program conversion method may further have a decrypting step of decrypting the encrypted conversion information and a conversion step of converting the program by using the conversion information decrypted in the decrypting step.

(9) Physically, each of the devise mentioned above is a computer system composed generally of a microprocessor, ROM, RAM, hard disk unit, display unit, keyboard, and mouse. The RAM or hard disk unit stores a computer program. The computer program is composed of a plurality of sets of computer instruction codes to achieve predetermined functionalities. The microprocessor operates in accordance with the computer program, so that each device achieves their respective functionalities. That is, the microprocessor fetches, decodes, and executes instructions of the computer program one by one.

(10) Some or all of the units of each device described above may be implemented in a single system LSI (Large Scale Integration) circuit. The system LSI is a large scale integrated circuit by fabricating multiple modules on a single chip. Physically, the system LSI is a computer system composed of a microprocessor, ROM, RAM, and possibly other components. The RAM stores a computer program. The microprocessor operates in accordance with the computer program, so that the system LSI carries out the functionality.

Some or all of the functional units of each device described above may be implemented in separate chips or in a single chip. Although an LSI is specifically mentioned above, the circuit may be referred to as IC, system LSI, super LSI, or ultra LSI, depending on the packaging density.

In addition, an integrated circuit may be fabricated not only by way of LSI. For example, it is applicable to use an FPGA (Field Programmable Gate Array) that enables post-manufacturing programming of an LSI circuit. It is also applicable to use a reconfigurable processor that allows reconfiguration of connection between circuit cells within an LSI circuit and their settings.

When any new circuit integration technology becomes available or derived as the semiconductor technology advances, such new technology may be employed to integrate the functional units of the present invention. One possible candidate of such new technology may be achieved by adapting biotechnology.

(11) Some or all of the functional units of each device described above may be implemented in an IC card detachable to the respective device or in a single module. The IC card or module is a computer system composed of a microprocessor, ROM, RAM, and possibly other components. The IC card or module may include the LSI circuit mentioned above. The RAM stores a computer program. The microprocessor operates in accordance with the computer program, so that the IC card or module carries out its functionality. In addition, the IC card or module may be made tamper-resistant.

(12) The present invention may be embodied as any of the methods described above or a computer program for causing a computer to execute such a method. Furthermore, the present invention may be embodies as a digital signal representing such a computer program.

Still further, the present invention may be embodied as a computer-readable recording medium storing the computer program or digital signal mentioned above. Examples of compute-readable recording media include a flexible disk, hard disk, CD-ROM, MO, DVD, DVD-ROM, DVD-RAM, BD (Blu-ray Disc), and semiconductor memory. Still further, the present invention may be embodied as the computer program or digital signal per se stored on such a recording medium.

Still further, the present invention may be embodied as the computer program or digital signal that is transmitted via a telecommunication network, wireless or wired communication network, a network typified by the Internet, or data broadcasting.

Still further, the present invention may be embodied as a computer system composed of a microprocessor and memory. The memory stores the computer program mentioned above and the microprocessor operates in accordance with the computer program.

Still further, the program or digital signal mentioned above may be transferred in form of a recording medium mentioned above or via a network mentioned above, so that the program or digital signal may be executed by another independent computer system.

(13) The present invention may be embodied as any combination of the above-described embodiments and modifications.

Devices embodying the present invention are usable in the industrial field of manufacturing and distributing computer programs on a commercial/institutional, continuous and repetitive basis. In addition, the devices of the present invention are promising for manufacturing and sold in the industrial field of manufacturing electric appliances on a commercial, continuous and repetitive basis.

The invention claimed is:

1. A system comprising a program conversion device for generating, from one original program, one distribution program that is executable on a plurality of program execution devices having different security levels, and a program execution device that operates in accordance with the distribution program, wherein the program conversion device comprises:
   a storage unit for storing an original program composed of a plurality of computer instructions;
   an obfuscation unit for obfuscating the original program to generate an obfuscated program;
   a generating unit for generating conversion information that indicates conversion to be applied to the obfuscated program so as to alter an obfuscation level correspondingly to one of the security levels; and
   an output unit for outputting a distribution program that is composed of the obfuscated program and the conversion information, and wherein the program execution device comprises:
   a storage unit for storing the distribution program generated by the program conversion device for generating, from one original program, the one distribution program that is executable on the plurality of program execution devices having different security levels;
   an acquiring unit for searching the distribution program to acquire conversion information corresponding to a security level of the program execution device from the distribution program;

a converting unit, if the conversion information is successfully acquired, for converting the obfuscated program that is included in the distribution program to alter the obfuscation level in accordance with the conversion information, so that a unique program that corresponds to the security level of the program execution device is generated; and a processor for executing the unique program, wherein the generating unit generates the conversion information that indicates conversion to be applied to the obfuscated program to lower the obfuscation level, the converting unit converts the obfuscated program to lower the obfuscation level, and the original program stored in the storage unit includes a sub-program composed of one or more instructions, and the obfuscation unit includes:

a dividing sub-unit for dividing the sub-program into a plurality of partial programs; and an obfuscating sub-unit for obfuscating the plurality of partial programs to generate a plurality of obfuscated partial programs that together constitute the obfuscated program, wherein the generating unit encrypts integration information so that the encrypted integration information is generated, the integration information indicating which of the partial programs are to be integrated, and the output unit outputs the distribution program that includes the plurality of obfuscated partial programs and the encrypted integration information, and wherein the acquiring unit decrypts the encrypted integration information acquired as the conversion information, the converting unit, if the encrypted integration information is successfully decrypted, decrypts a plurality of encrypted programs indicated by the decrypted integration information, so that a plurality of partial programs of the unique program are generated, and the processor executes the plurality of partial programs generated, and wherein the generating unit encrypts the integration information by using a conversion information key, and the acquiring unit decrypts the encrypted integration information by using the conversion information key.

2. A system comprising a program conversion device for generating, from one original program, one distribution program that is executable on a plurality of program execution devices having different security levels, and a program execution device that operates in accordance with the distribution program, wherein the program conversion device comprises:

a storage unit for storing an original program composed of a plurality of computer instructions;

an obfuscation unit for obfuscating the original program to generate an obfuscated program;

a generating unit for generating conversion information that indicates conversion to be applied to the obfuscated program so as to alter an obfuscation level correspondingly to one of the security levels; and an output unit for outputting a distribution program that is composed of the obfuscated program and the conversion information, and wherein the program execution device comprises:

a storage unit for storing the distribution program generated by the program conversion device for generating, from one original program, the one distribution program that is executable on the plurality of program execution devices having different security levels;

an acquiring unit for searching the distribution program to acquire conversion information corresponding to a security level of the program execution device from the distribution program;

a converting unit, if the conversion information is successfully acquired, for converting the obfuscated program that is included in the distribution program to alter the obfuscation level in accordance with the conversion information, so that a unique program that corresponds to the security level of the program execution device is generated; and a processor for executing the unique program, wherein the generating unit generates the conversion information that indicates conversion to be applied to the obfuscated program to lower the obfuscation level, the converting unit converts the obfuscated program to lower the obfuscation level, and the original program stored in the storage unit includes a sub-program composed of one or more instructions, and the obfuscation unit includes:

a dividing sub-unit for dividing the sub-program into a plurality of partial programs and an obfuscating sub-unit for obfuscating the plurality of partial programs to generate a plurality of obfuscated partial programs that together constitute the obfuscated program, wherein the generating unit encrypts integration information so that the encrypted integration information is generated, the integration information indicating which of the partial programs are to be integrated, and the output unit outputs the distribution program that includes the plurality of obfuscated partial programs and the encrypted integration information, and wherein the acquiring unit decrypts the encrypted integration information acquired as the conversion information, the converting unit, if the encrypted integration information is successfully decrypted, decrypts a plurality of encrypted programs indicated by the decrypted integration information, so that a plurality of partial programs of the unique program are generated, and the processor executes the plurality of partial programs generated, and wherein the generating unit encrypts the integration information by using a conversion information key, the acquiring unit decrypts the encrypted integration information by using the conversion information key, the obfuscating sub-unit encrypts each partial program by using a program key, and the converting unit decrypts the encrypted program by using the program key.

3. A system comprising a program conversion device for generating, from one original program, one distribution program that is executable on a plurality of program execution devices having different security levels, and a program execution device that operates in accordance with a distribution program, wherein the program conversion device comprises:

a storage unit for storing an original program composed of a plurality of computer instructions;

an obfuscation unit for obfuscating the original program to generate an obfuscated program;

a generating unit for generating conversion information that indicates conversion to be applied to the obfuscated program so as to alter an obfuscation level correspondingly to one of the security levels; and an output unit for outputting a distribution program that is composed of the obfuscated program and the conversion information, and wherein the program execution device comprises:
a storage unit for storing the distribution program generated by the program conversion device for generating, from one original program, the one distribution program that is executable on the plurality of program execution devices having different security levels;
an acquiring unit for searching the distribution program to acquire conversion information corresponding to a security level of the program execution device from the distribution program;
a converting unit, if the conversion information is successfully acquired, for converting the obfuscated program that is included in the distribution program to alter the obfuscation level in accordance with the conversion information, so that a unique program that corresponds to the security level of the program execution device is generated; and
a processor for executing the unique program, wherein
the generating unit generates the conversion information that indicates conversion to be applied to the obfuscated program to lower the obfuscation level, the converting unit converts the obfuscated program to lower the obfuscation level, and the original program stored in the storage unit includes a sub-program composed of one or more instructions, and
the obfuscation unit includes:
a dividing sub-unit for dividing the sub-program into a plurality of partial programs; and
an encrypting sub-unit for encrypting the plurality of partial programs to generate a plurality of encrypted partial programs that together constitute the obfuscated program, wherein
the generating unit generates the conversion information by encrypting one or more pieces of integration information by using a security level key that corresponds to a security level, each piece of integration information indicating which of the partial programs are to be integrated, and the output unit outputs the distribution program that includes the plurality of encrypted partial programs and the encrypted integration information, and wherein
the acquiring unit decrypts the encrypted integration information by using a security level key held by the program execution device, the converting unit, if the encrypted integration information is successfully decrypted, decrypts the plurality of encrypted partial programs indicated by the decrypted integration information, so that a plurality of partial programs are generated as parts of the unique program, and the processor executes the unique program that includes the plurality of partial programs generated.

4. A system comprising a program conversion device for generating, from one original program, one distribution program that is executable on a plurality of program execution devices having different security levels, and a program execution device that operates in accordance with a distribution program, wherein
the program conversion device comprises:
a storage unit for storing an original program composed of a plurality of computer instructions;
an obfuscation unit for obfuscating the original program to generate an obfuscated program;
a generating unit for generating conversion information that indicates conversion to be applied to the obfuscated program so as to alter an obfuscation level correspondingly to one of the security levels; and
an output unit for outputting a distribution program that is composed of the obfuscated program and the conversion information, and wherein
the program execution device comprises:
a storage unit for storing the distribution program generated by the program conversion device for generating, from one original program, the one distribution program that is executable on the plurality of program execution devices having different security levels;
an acquiring unit for searching the distribution program to acquire conversion information corresponding to a security level of the program execution device from the distribution program;
a converting unit, if the conversion information is successfully acquired, for converting the obfuscated program that is included in the distribution program to alter the obfuscation level in accordance with the conversion information, so that a unique program that corresponds to the security level of the program execution device is generated; and
a processor for executing the unique program, wherein
the generating unit generates the conversion information that indicates conversion to be applied to the obfuscated program to lower the obfuscation level, the converting unit converts the obfuscated program to lower the obfuscation level, and the obfuscation unit inserts a redundant block composed of one or more redundant instructions into the original program, so that the obfuscated program is generated, and wherein
the generating unit encrypts position information so that encrypted position information is generated as the conversion information, the position information indicating a position in the original program at which the redundant block is inserted, and the output unit outputs the distribution program that includes the encrypted position information and the obfuscated program into which the redundant block is inserted, and wherein
the acquiring unit decrypts the encrypted position information acquired as the conversion information, the converting unit, if the encrypted position information is successfully decrypted, invalidates one or more instructions of the distribution program stored at a storage location indicated by the decrypted position information, and the processor executes the unique program that includes the one or more invalidated instructions.

5. The program execution device of claim 4, wherein
the acquiring unit decrypts the encrypted position information by using the conversion information key.

6. A system comprising a program conversion device for generating, from one original program, one distribution program that is executable on a plurality of program execution devices having different security levels, and a program execution device that operates in accordance with a distribution program, wherein
the program conversion device comprises:
a storage unit for storing an original program composed of a plurality of computer instructions;
an obfuscation unit for obfuscating the original program to generate an obfuscated program;
a generating unit for generating conversion information that indicates conversion to be applied to the obfuscated program so as to alter an obfuscation level correspondingly to one of the security levels; and
an output unit for outputting a distribution program that is composed of the obfuscated program and the conversion information, and wherein the program execution device comprises:
a storage unit for storing the distribution program generated by the program conversion device for generating, from one original program, the one distribution program that is executable on the plurality of program execution devices having different security levels;
an acquiring unit for searching the distribution program to acquire conversion information corresponding to a security level of the program execution device from the distribution program;
a converting unit, if the conversion information is successfully acquired, for converting the obfuscated program that is included in the distribution program to alter the obfuscation level in accordance with the conversion information, so that a unique program that corresponds to the security level of the program execution device is generated; and
a processor for executing the unique program, wherein
the generating unit generates the conversion information that indicates conversion to be applied to the obfuscated program to lower the obfuscation level, the converting unit converts the obfuscated program to lower the obfuscation level, and the obfuscation unit inserts a check program for detecting any tampering with the original program into the original program, so that the obfuscated program is generated, and wherein
the generating unit encrypts check information that includes position information and an invalidated program, so that the conversion information is generated, the position information indicating a position in the original program at which the check program is inserted, and the invalidated program being an invalidated version of the check program causing no checking operation to be performed, and the output unit outputs the distribution program that includes the encrypted check information and the obfuscated program into which the check program is inserted, and wherein
the acquiring unit decrypts the encrypted check information acquired as the conversion information, the generating unit, if the encrypted check information is successfully decrypted, replaces one or more instructions of the distribution program stored at a storage location indicated by the decrypted position information with the invalidated program included in the generated check information, and the processor executes the unique program that includes the invalidated program.

7. The program execution device of claim 6, wherein
the generating unit encrypts the check information by using a conversion information key, and
the acquiring unit decrypts the encrypted check information by using the conversion information key.

8. A program execution method for use by a program execution device that operates in accordance with a distribution program generated by a program conversion device that generates, from one original program, one distribution program that is executable on a plurality of program execution devices having different security levels, wherein
the program conversion device comprises:
a storage unit for storing an original program composed of a plurality of computer instructions;
an obfuscation unit for obfuscating the original program to generate an obfuscated program;
a generating unit for generating conversion information that indicates a conversion to be applied to the obfuscated program so as to alter an obfuscation level correspondingly to one of the security levels; and
an output unit for outputting a distribution program that is composed of the obfuscated program and the conversion information, wherein the conversion information indicates that the alteration to be applied to the obfuscation level of the obfuscated program is to lower the obfuscation level, and wherein
the program execution method comprises:
an acquiring step of searching using an acquiring unit the distribution program to acquire conversion information corresponding to a security level of the program execution device from the distribution program;
a converting step of converting using a converting unit, if the conversion information is successfully acquired, the obfuscated program that is included in the distribution program to alter the obfuscation level in accordance with the conversion information, so that a unique program that corresponds to the security level of the program execution device is generated; and
a processing step of executing using a processor the unique program, wherein
the generating unit generates the conversion information that indicates conversion to be applied to the obfuscated program to lower the obfuscation level, the converting unit converts the obfuscated program to lower the obfuscation level, and the original program stored in the storage unit includes a sub-program composed of one or more instructions, and
the obfuscation unit includes:
a dividing sub-unit for dividing the sub-program into a plurality of partial programs and
an obfuscating sub-unit for obfuscating the plurality of partial programs to generate a plurality of obfuscated partial programs that together constitute the obfuscated program, and wherein
the generating unit encrypts integration information so that encrypted integration information is generated, the integration information indicating which of the partial programs are to be integrated, and the output unit outputs the distribution program that includes the plurality of obfuscated partial programs and the encrypted integration information, and wherein
the acquiring unit decrypts the encrypted integration information acquired as the conversion information, the converting unit, if the encrypted integration information is successfully decrypted, decrypts a plurality of encrypted programs indicated by the decrypted integration information, so that a plurality of partial programs of the unique program are generated, and the processor executes the plurality of partial programs generated, and wherein
the generating unit encrypts the integration information by using a conversion information key, the acquiring unit decrypts the encrypted integration information by using the conversion information key, the obfuscating sub-unit encrypts each partial program by using a program key, and the converting unit decrypts the encrypted program by using the program key.

9. A non-transitory computer-readable storage medium storing a program-execution program for use by a program execution device that operates in accordance with a distribution program generated by a program conversion device that generates, from one original program, one distribution program that is executable on a plurality of program execution devices having different security levels, wherein
the program conversion device comprises:
a storage unit for storing an original program composed of a plurality of computer instructions;

an obfuscation unit for obfuscating the original program to generate an obfuscated program;

a generating unit for generating conversion information that indicates a conversion to be applied to the obfuscated program so as to alter an obfuscation level correspondingly to one of the security levels; and an output unit for outputting a distribution program that is composed of the obfuscated program and the conversion information, wherein the conversion information indicates that the alteration to be applied to the obfuscation level of the obfuscated program is to lower the obfuscation level, and wherein the program-execution program comprises code that causes the program execution device to perform:

an acquiring step of searching using an acquiring unit the distribution program to acquire conversion information corresponding to a security level of the program execution device from the distribution program;

a converting step of converting using a converting unit, if the conversion information is successfully acquired, the obfuscated program that is included in the distribution program to alter the obfuscation level in accordance with the conversion information, so that a unique program that corresponds to the security level of the program execution device is generated; and a processing step of executing using a processor the unique program, wherein the generating unit generates the conversion information that indicates conversion to be applied to the obfuscated program to lower the obfuscation level, the converting unit converts the obfuscated program to lower the obfuscation level, and the original program stored in the storage unit includes a sub-program composed of one or more instructions, and the obfuscation unit includes:

a dividing sub-unit for dividing the sub-program into a plurality of partial programs and an obfuscating sub-unit for obfuscating the plurality of partial programs to generate a plurality of obfuscated partial programs that together constitute the obfuscated program, and wherein the generating unit encrypts integration information so that encrypted integration information is generated, the integration information indicating which of the partial programs are to be integrated, and the output unit outputs the distribution program that includes the plurality of obfuscated partial programs and the encrypted integration information, and wherein the acquiring unit decrypts the encrypted integration information acquired as the conversion information, the converting unit, if the encrypted integration information is successfully decrypted, decrypts a plurality of encrypted programs indicated by the decrypted integration information, so that a plurality of partial programs of the unique program are generated, and the processor executes the plurality of partial programs generated, and wherein the generating unit encrypts the integration information by using a conversion information key, the acquiring unit decrypts the encrypted integration information by using the conversion information key, the obfuscating sub-unit encrypts each partial program by using a program key, and the converting unit decrypts the encrypted program by using the program key.

10. An integrated circuit that operates in accordance with a distribution program generated by a program conversion device that generates, from one original program, one distribution program that is executable on a plurality of program execution devices having different security levels, wherein the program conversion device comprises:

a storage unit for storing an original program composed of a plurality of computer instructions;

an obfuscation unit for obfuscating the original program to generate an obfuscated program;

a generating unit for generating conversion information that indicates a conversion to be applied to the obfuscated program so as to alter an obfuscation level correspondingly to one of the security levels; and an output unit for outputting a distribution program that is composed of the obfuscated program and the conversion information, wherein the conversion information indicates that the alteration to be applied to the obfuscation level of the obfuscated program is to lower the obfuscation level, and wherein the integrated circuit comprises:

a storage unit for storing the distribution program generated by the program conversion device;

an acquiring unit for searching the distribution program to acquire conversion information corresponding to a security level of the program execution device from the distribution program;

a converting unit, if the conversion information is successfully acquired, for converting the obfuscated program that is included in the distribution program to alter the obfuscation level in accordance with the conversion information, so that a unique program that corresponds to the security level of the program execution device is generated; and a processor for executing the unique program, wherein the generating unit generates the conversion information that indicates conversion to be applied to the obfuscated program to lower the obfuscation level, the converting unit converts the obfuscated program to lower the obfuscation level, and the original program stored in the storage unit includes a sub-program composed of one or more instructions, and the obfuscation unit includes:

a dividing sub-unit for dividing the sub-program into a plurality of partial programs and an obfuscating sub-unit for obfuscating the plurality of partial programs to generate a plurality of obfuscated partial programs that together constitute the obfuscated program, and wherein the generating unit encrypts integration information so that encrypted integration information is generated, the integration information indicating which of the partial programs are to be integrated, and the output unit outputs the distribution program that includes the plurality of obfuscated partial programs and the encrypted integration information, and wherein the acquiring unit decrypts the encrypted integration information acquired as the conversion information, the converting unit, if the encrypted integration information is successfully decrypted, decrypts a plurality of encrypted programs indicated by the decrypted integration information, so that a plurality of partial programs of the unique program are generated, and the processor executes the plurality of partial programs generated, and wherein the generating unit encrypts the integration information by using a conversion information key, the acquiring unit decrypts the encrypted integration information by using the conversion information key, the obfuscating sub-unit encrypts each partial program by using a program key, and the converting unit decrypts the encrypted program by using the program key.

11. A system having (i) a program conversion device for generating, from one original program, one distribution program that is executable on a plurality of program execution devices having different security levels and (ii) a program execution device that operates in accordance with a distribution program, the program conversion device comprising:
a storage unit for storing an original program composed of a plurality of computer instructions;
an obfuscation unit for obfuscating the original program to generate an obfuscated program;
a generating unit for generating conversion information that indicates conversion to be applied to the obfuscated program so as to alter an obfuscation level correspondingly to one of the security levels; and
an output unit for outputting a distribution program that is composed of the obfuscated program and the conversion information, and the program execution device comprising:
a storage unit for storing the distribution program generated by the program conversion device;
an acquiring unit for searching the distribution program to acquire conversion information corresponding to a security level of the program execution device from the distribution program;
a converting unit operable, if the conversion information is successfully acquired, to convert the obfuscated program that is included in the distribution program to alter the obfuscation level in accordance with the conversion information, so that a unique program that corresponds to the security level of the program execution device is generated; and
a processor for executing the unique program.

12. A system having (i) a program conversion device for generating, from one original program, one distribution program that is executable on a plurality of program execution devices having different security levels and (ii) a program execution device that operates in accordance with a distribution program, the program conversion device comprising:
a storage unit for storing an original program composed of a plurality of computer instructions;
an obfuscation unit for obfuscating the original program to generate an obfuscated program;
a generating unit for generating conversion information that indicates conversion to be applied to the obfuscated program so as to alter an obfuscation level correspondingly to one of the security levels; and
an output unit for outputting a distribution program that is composed of the obfuscated program and the conversion information, and the program execution device comprising:
a storage unit for storing the distribution program generated by the program conversion device;
an acquiring unit for searching the distribution program to acquire conversion information corresponding to a security level of the program execution device from the distribution program;
a converting unit operable, if the conversion information is successfully acquired, to convert the obfuscated program that is included in the distribution program to alter the obfuscation level in accordance with the conversion information, so that a unique program that corresponds to the security level of the program execution device is generated; and
a processor for executing the unique program, wherein the generating unit generates the conversion information that indicates conversion to be applied to the obfuscated program to lower the obfuscation level, the converting unit converts the obfuscated program to lower the obfuscation level, and the original program stored in the storage unit includes a sub-program composed of one or more instructions, and the obfuscation unit includes:
a dividing sub-unit for dividing the sub-program into a plurality of partial programs and
an obfuscating sub-unit for obfuscating the plurality of partial programs to generate a plurality of obfuscated partial programs that together constitute the obfuscated program, and wherein the generating unit encrypts integration information so that encrypted integration information is generated, the integration information indicating which of the partial programs are to be integrated, and the output unit outputs the distribution program that includes the plurality of obfuscated partial programs and the encrypted integration information, and wherein the acquiring unit decrypts the encrypted integration information acquired as the conversion information, the converting unit, if the encrypted integration information is successfully decrypted, decrypts a plurality of encrypted programs indicated by the decrypted integration information, so that a plurality of partial programs of the unique program are generated, and the processor executes the plurality of partial programs generated, and wherein the generating unit encrypts the integration information by using a conversion information key, the acquiring unit decrypts the encrypted integration information by using the conversion information key, the obfuscating sub-unit encrypts each partial program by using a program key, and the converting unit decrypts the encrypted program by using the program key.

* * * * *